United States Patent
Stitt et al.

(10) Patent No.: US 9,495,139 B2
(45) Date of Patent: Nov. 15, 2016

(54) ELASTIC COMPUTING

(75) Inventors: Gregory Michael Stitt, Gainesville, FL (US); John Robert Wernsing, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 13/981,164

(22) PCT Filed: Apr. 11, 2012

(86) PCT No.: PCT/US2012/032981
§ 371 (c)(1),
(2), (4) Date: Jul. 23, 2013

(87) PCT Pub. No.: WO2012/142069
PCT Pub. Date: Oct. 18, 2012

(65) Prior Publication Data
US 2014/0026111 A1    Jan. 23, 2014

Related U.S. Application Data

(60) Provisional application No. 61/474,020, filed on Apr. 11, 2011.

(51) Int. Cl.
*G06F 9/45* (2006.01)
*G06F 11/34* (2006.01)
*G06F 9/44* (2006.01)
*G06F 17/17* (2006.01)
*G06F 9/50* (2006.01)

(52) U.S. Cl.
CPC ........... *G06F 8/4441* (2013.01); *G06F 9/4425* (2013.01); *G06F 11/3452* (2013.01); *G06F 17/17* (2013.01); *G06F 9/505* (2013.01); *G06F 9/5027* (2013.01); *G06F 9/5094* (2013.01); *Y02B 60/142* (2013.01)

(58) Field of Classification Search
None
See application file for complete search history.

(56) References Cited

U.S. PATENT DOCUMENTS

| 5,903,730 | A  | * | 5/1999 | Asai et al. ................... 709/224 |
| 6,085,035 | A  | * | 7/2000 | Ungar ........................... 717/116 |
| 6,618,742 | B1 | * | 9/2003 | Krum ..................... G06F 9/505 702/186 |
| 6,999,958 | B2 |   | 2/2006 | Carlson et al. |

(Continued)

OTHER PUBLICATIONS

Lee, B. D., et al., "Run-time Prediction of Parallel Applications on Shared Environment", Argonne National Laboratory [online], 2003 [retrieved Nov. 26, 2014], Retrieved from Internet: <URL: http://www.mcs.anl.gov/papers/P1088.pdf>, pp. 1-19.*

(Continued)

*Primary Examiner* — Todd Aguilera
(74) *Attorney, Agent, or Firm* — Thomas Horstemeyer, LLP

(57) ABSTRACT

Elastic computing is an optimization framework that combines standard application code with specialized elastic functions and corresponding optimization tools. The elastic functions provide a knowledge-base of implementation alternatives and parallelization strategies for a given function. When an application calls an elastic function, the elastic computing tools analyze available devices and resources (e.g., cores, GPUs, FPGAs, etc.) and current run-time parameters, and then transparently select from numerous pre-analyzed implementation possibilities to optimize for performance, power, energy, size, or any combination of these goals.

21 Claims, 37 Drawing Sheets

(56) References Cited

U.S. PATENT DOCUMENTS

| | | | |
|---|---|---|---|
| 7,007,270 B2* | 2/2006 | Martin | G06F 11/3447 |
| | | | 714/E11.197 |
| 7,225,309 B2* | 5/2007 | DeWitt et al. | 711/165 |
| 7,356,672 B2 | 4/2008 | Vahid et al. | |
| 7,580,905 B2* | 8/2009 | Lopez-Estrada | 706/14 |
| 7,634,386 B2* | 12/2009 | Naono | G06F 11/3409 |
| | | | 702/179 |
| 7,954,095 B2* | 5/2011 | Archer et al. | 717/149 |
| 8,099,487 B1* | 1/2012 | Smirnov et al. | 709/223 |
| 8,117,604 B2* | 2/2012 | Archambault et al. | 717/147 |
| 8,296,743 B2* | 10/2012 | Linderman et al. | 717/140 |
| 8,818,922 B2* | 8/2014 | Chen | G06F 11/3452 |
| | | | 706/14 |
| 2002/0154551 A1 | 10/2002 | Kimelman et al. | |
| 2005/0081010 A1* | 4/2005 | DeWitt et al. | 711/165 |
| 2005/0132371 A1* | 6/2005 | Lopez-Estrada | 718/100 |
| 2006/0020934 A1* | 1/2006 | Naono | G06F 11/3409 |
| | | | 717/154 |
| 2008/0028383 A1* | 1/2008 | Archambault et al. | 717/157 |
| 2008/0101232 A1* | 5/2008 | Archer et al. | 370/235 |
| 2009/0158248 A1* | 6/2009 | Linderman et al. | 717/106 |

OTHER PUBLICATIONS

An, P., et al., "STAPL: A Standard Template Adaptive Parallel C++ Library", Int. Wkshp. on Adv. Compiler Technology for High Perf. and Embedded Controllers [online], 2001 [retrieved Nov. 26, 2014], Retrieved from Internet: <URL: http://citeseerx.ist.psu.edu/viewdoc/download?doi=10.1.1.162.1030&rep=rep1&type=pdf>, pp. 1-10.*

Anonymous, Proceedings of the ACM SIGPLAN/SIGBED 2010 Conference on Languages Compilers, & Tools for Embedded Systems, Association for Computing Machinery, Inc. (AMC) [online], 2010 [retrieved Jul. 21, 2016], pp. i-x.*

The International Preliminary Report on Patentability dated Oct. 24, 2013.

Wernsing, et al., "Elastic Computing: A Portable Optimization Framework for Hybrid Computers", Manuscript Draft, pp. 1-44, submitted for publication in Parallel Computing, Aug. 1, 2012.

Wernsing, et al., "A Scalable Performance Prediction Heuristic for Implementation Planning on Heterogeneous Systems", In Proceedings for the 8th IEEE Workshop on Embedded Systems for Real-Time Multimedia (ESTIMedia '10), IEEE, Oct. 28, 2010, pp. 71-80.

Luk, et al., "Qilin: Exploiting Parallelism on Heterogeneous Multiprocessors with Adaptive Mapping", Proceedings of the IEEE/ACM International Symposium on Microarchitecture (MICRO), Dec. 12-16, 2009, New York, NY, USA, pp. 45-55.

Whaley, et al., "Automatically Tuned Linear Algebra Software", Proceedings of ACM/IEEE Conference on Supercomputing (SC), 1998, pp. 1-27.

Frigo, et al., "FFTW: An Adaptive Software Architecture for the FFT", Acoustics, Speech and Signal Processing. Proceedings of the IEEE International Conference on Acoustics, Speech, and Signal Processing, 1998, pp. 1381-1384.

Vuduc, et al., "OSKI: A Library of Automatically Tuned Sparse Matrix Kernels", Institute of Physics Publishing Ltd, 2005, Journal of Physics: Conference Series 16, SciDAC, Jun. 2005, pp. 521-530.

Grattan, et al., "Codesign-Extended Applications", IEEE/ACM International Symposium on Hardware/Software Codesign (CODES) '02, May 6-8, 2002, Estes Park, Colorado, USA, pp. 1-6.

Ansel, et al., "PetaBricks: A Language and Complier for Algorithmic Choice", Proceedings of the ACM SIGPLAN Conference on Programming Language Design and Implementation (PLDI) '09, Jun. 15-20, 2009, Dublin, Ireland, pp. 38-49.

Wernsing, et al., "RACECAR: A Heuristic for Automatic Function Specialization on Multi-Core Heterogeneous Systems," PPoPP '12 Proceedings of the 17th ACM SIGPLAN symposium on Principles and Practice of Parallel Programming, Aug. 1, 2012, pp. 321-322.

The International Search Report and Written Opinion dated Oct. 30, 2012.

Wernsing, et al., "Elastic Computing: A Framework for Transparent, Portable, and Adaptive Multi-Core Heterogeneous Computing," ACM SIGPLAN/SOGBED 2010 Conference on Languages, Compilers and Tools for Embedded System, Apr. 2010, pp. 115-124.

* cited by examiner

```
float GetWorkMetricFromInput(Matrix input1, Matrix input2, Matrix output) {
    // Determine work metric from input parameters
    int m = input1.rows;
    int n = input1.cols;
    int p = input2.rows;
    return (float) m * n * p;
}
InputParameters GetInputFromWorkMetric(float work_metric) {
    // Create input parameters from work metric (for random usage case)
    int m = 16;
    int n = 16;
    int p = (int) work_metric / (m * n);
    Matrix input1 = new Matrix(m, n);
    Matrix input2 = new Matrix(n, p);
    Matrix output = new Matrix(m, p);
    PopulateWithRandomNumbers(input1, m, n);
    PopulateWithRandomNumbers(input2, n, p);
    return InputParameters(input1, input2, output);
}
```

FIG. 3

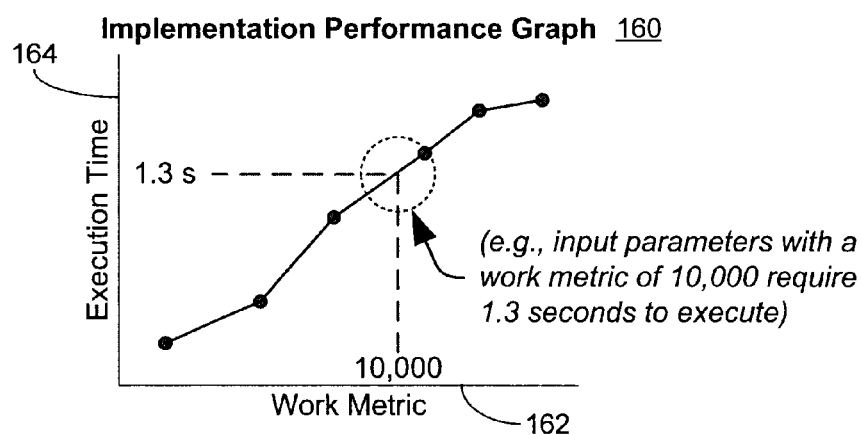

FIG. 4

```
-- Information from previous iteration
Let count = previous iteration's # of samples
Let ioi = interval of interest
-- Create new sample data-point
sample.x = RandomInputSizeInRange(ioi)
sample.y = MeasureExecutionTime(sample.x)
-- Insert into sample matrix
Let i = DetermineSortedIndex(sample.x)
For row = count-1 to i step -1
    For col = row to count-1
        Move (row, col) to (row+1, col+1)
    End for
End for
count = count + 1
-- Regenerate changed cells
PopulateDiagonalCell (i, i) with sample
For row = i to 0 step -1
    For col = i to count-1
        GenerateSegment(row, col)
    End for
End for
```

FIG. 7

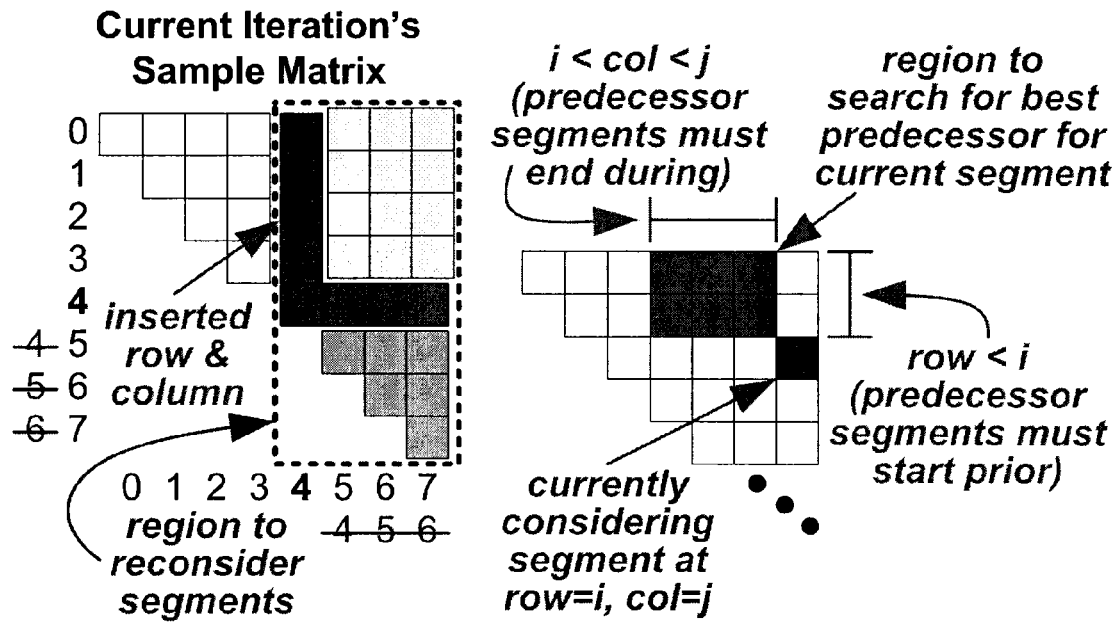

FIG. 8

```
-- Information from sample generation
Let count = current iteration's # of samples
Let i = index of newly inserted sample
-- Reconsider segments in sample matrix
For row = 0 to count-1
    For col = Max(i, row) to count-1
        -- Find best predecessor for current cell
        pred = NULL
        For row2 = 0 to row-1
            For col2 = row+1 to col-1
                pred2 = cell(row2, col2)
                If (pred2 better than pred)
                    pred = pred2
                End if
            End for
        End for
        cell(row, col).pred = pred
    End for
End for
-- Find best chain with largest column (omitted)
```

FIG. 9

```
InsertionSortAdapter(work_metric : integer) {
    // Create array of 'work_metric' size
    // and populate with random values
    values[1..work_metric] = rand();

// Start execution timer
    Timer.Start();

// Use insertion-sort algorithm to sort values
    InsertionSort(values);

// Stop execution timer
    Timer.Stop();

// Return elapsed execution time to planner
    return Timer.Elapsed();
}
```

```
CircConvolutionAdapter(work_metric : integer) {
    // Create array of 'work_metric' size
    // and populate with random values
    x_operand[1..work_metric] = rand();

// Create array of fixed size and populate
    constant FIXED_H_LENGTH = 16;
    h_operand[1..FIXED_H_LENGTH] = rand();

// Start execution timer
    Timer.Start();

// Perform discrete circular convolution
    CircularConvolution(x_operand, h_operand);

// Stop execution timer
    Timer.Stop();

// Return elapsed execution time to planner
    return Timer.Elapsed();
}
```

FIG. 24

ELASTIC COMPUTING

CROSS-REFERENCE TO RELATED APPLICATION(S)

This application is the 35 U.S.C. §371 national stage of PCT application PCT/US2012/32981, filed Apr. 11, 2012 which claims priority to and the benefit of U.S. Provisional Application Ser. No. 61/474,020, filed Apr. 11, 2011, both of which are hereby incorporated by reference herein in their entirety.

STATEMENT AS TO FEDERALLY SPONSORED RESEARCH

The invention was made with government support agreement CNS-0914474 awarded by the National Science Foundation. The government has certain rights in the invention.

BACKGROUND

For the past several decades, the high-performance computing (HPC) community has relied on rapidly increasing clock frequencies and increasingly large systems to meet the escalating performance demands of applications. However, such an approach is becoming less feasible due to power bottlenecks. Clock frequencies have slowed due to power and cooling limits of integrated circuits, and it is becoming economically infeasible to increase system sizes due to energy and cooling costs, which are becoming the dominant factor in the total cost of ownership.

To deal with power bottlenecks, HPC systems have started on a trend towards increased heterogeneity, with existing systems integrating specialized microprocessor cores, graphics processing units (GPUs), and field-programmable gate arrays (FPGAs). Such hybrid systems tend to provide improved energy efficiency compared to general-purpose microprocessors by using specialization to significantly reduce power requirements while also improving performance. As a motivating example, the NOVO-G supercomputer, which uses 192 FPGAs in 24 nodes, has achieved speedups of more than 100,000× compared to a 2.4 GHz Opteron for computational biology applications. Such speedup provides performances similar to Roadrunner and Jaguar—two of the top supercomputers—even when assuming perfect linear scaling of performance for additional cores on those machines. Furthermore, traditional supercomputers typically require between 2 and 7 megawatts of power, whereas NOVO-G consumes a maximum of 8 kilowatts.

Although hybrid systems provide significant advantages compared to traditional HPC systems, effective usage of such systems is currently limited by significantly increased application design complexity that results in unacceptably low productivity. While parallel programming has received much recent attention, the inclusion of heterogeneous resources adds additional complexity that limits usage to device experts. For example, with an FPGA system, application designers often must be experts in digital design, hardware description languages, and synthesis tools. GPU systems, despite commonly being programmed with high-level languages, share similar challenges due to architecture-specific considerations that have significant effects on performance.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 3 depicts one example of an adapter for matrix multiply according to one embodiment.

FIG. 4 is a drawing of one example of an implementation performance graph according to one embodiment.

FIG. 7 depicts one example of code implementing the iterations in sample generation according to FIG. 6.

FIG. 8 illustrates one example of iterations of profile generation according to one embodiment.

FIG. 9 depicts one example of code implementing the iterations in profile generation according to FIG. 8.

FIG. 24 depicts one example of code for an adapter for a circular convolution implementation according to one embodiment.

DETAILED DESCRIPTION

Different implementations of the same application often have widely varying performances on different architectures. For example, a designer implementing a sorting function may use a merge-sort or bitonic-sort algorithm for an FPGA but a quick-sort algorithm for a microprocessor. Furthermore, this algorithmic problem extends beyond devices; different algorithms operate more efficiently for different input sizes, different amounts of resources, and potentially any other run-time parameter.

Elastic computing enables transparent and portable application design for hybrid systems, while also enabling adaptation to different run-time conditions. Elastic computing is an optimization framework that combines standard application code—potentially written in any language—with specialized elastic functions and corresponding optimization tools. The elastic functions provide a knowledge-base of implementation alternatives and parallelization strategies for a given function. When an application calls an elastic function, the elastic computing tools analyze available devices and resources (e.g., cores, GPUs, FPGAs, etc.) and current run-time parameters (e.g., input size, battery life, etc.), and then transparently select from numerous pre-analyzed implementation possibilities to optimize for performance, power, energy, size, or any combination of these goals.

For the sorting example, an application designer using elastic computing calls an elastic sorting function without specifying how that sort is implemented, which the elastic computing tools would parallelize across available resources while selecting appropriate implementations for each resource. Thus, without knowledge of the architecture, the application designer in this example is able to execute a sorting implementation that effectively takes advantage of all heterogeneous resources. Elastic computing enables transparent optimization of arbitrary functions for any run-time condition on any hybrid system.

Figure 1:
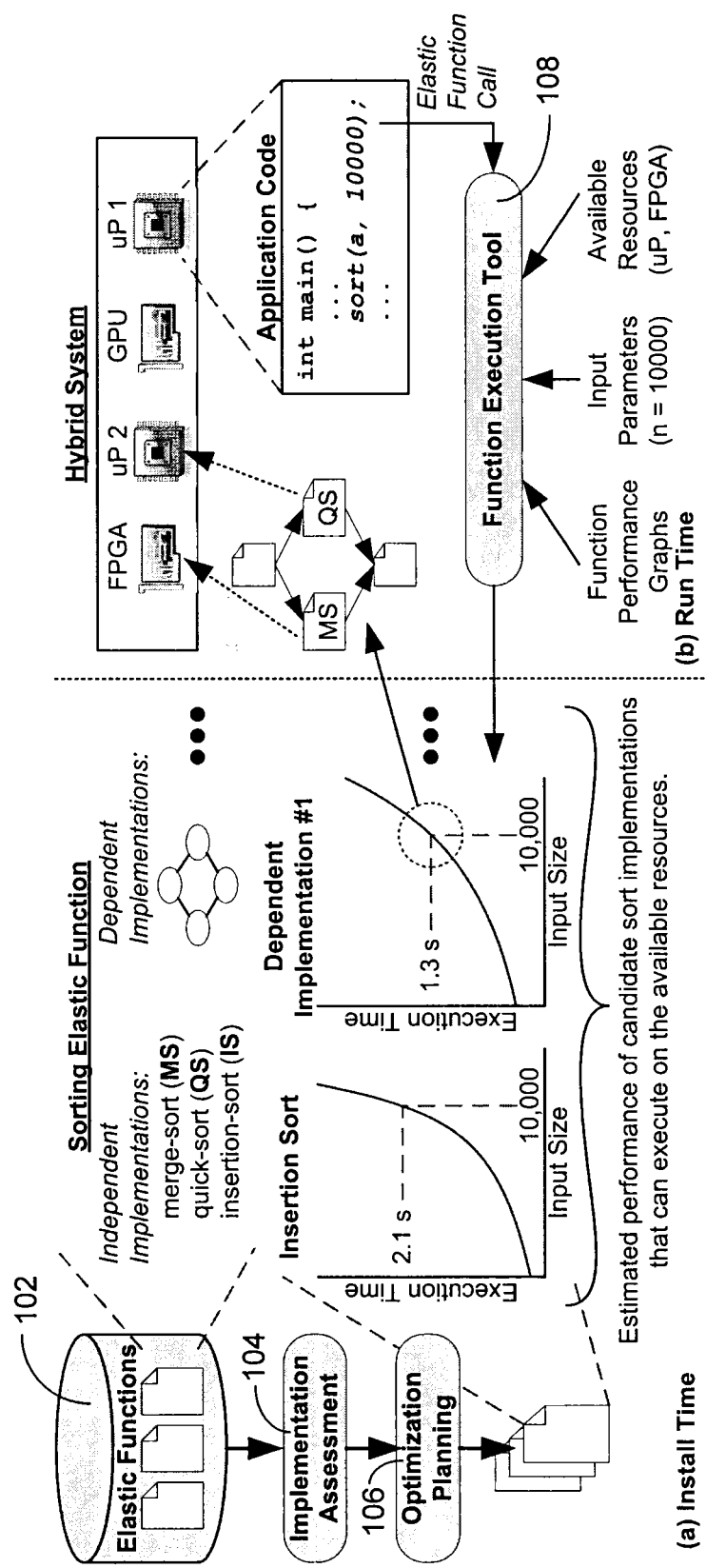
FIG. 1 illustrates an overview of an elastic computing system according to various embodiments.

Elastic computing, as depicted with reference to FIG. 1, is an optimization framework that combines specialized elastic functions 102 with an implementation assessment tool 104, an optimization planning tool 106, and a function execution tool 108. To invoke elastic computing, application designers include calls to elastic functions 102 from normal application code. Elastic functions 102 are the fundamental enabling technology of elastic computing, which consist of a knowledge-base of alternative implementations of the corresponding functionality (e.g., merge-sort, quick-sort, bitonic-sort) in addition to strategies for how to parallelize operations under different conditions (e.g., partition a large sort into multiple sub-sorts). By integrating this additional knowledge of a function, elastic functions 102 enable the elastic computing tools 104, 106, and 108 to explore numerous implementation possibilities that are not possible from a single high-level specification (e.g., normal application code), while also enabling automatic adaptation for different run-time conditions such as available resources and input size. Although the non-limiting examples presented herein focus on performance, the principles of elastic computing may be employed to optimize according to power, energy, size, and/or other goals as well.

Although elastic computing could potentially determine the most effective (e.g., fastest, lowest power, lowest energy, smallest, etc.) implementation of each elastic function call completely at run-time, such an approach may have prohibitive overhead. To reduce this overhead, elastic computing instead may perform implementation assessment to pre-determine efficient implementations for numerous situations. As shown in FIG. 1 for the sorting example, the implementation assessment tool 104 may analyze the performance of each sorting implementation on each device for different input sizes. The implementation assessment tool 104 may repeatedly execute each implementation to empirically determine the execution time, although other performance estimation techniques could be used.

After assessing the performance of each elastic function implementation, the optimization planning tool 106 may create a plan for which implementations should be used for different inputs, sizes, and available resources. The optimization planning tool 106 may analyze the collected performance information and stores optimization decisions in a specialized data structure for fast retrieval.

At run-time, when an application calls an elastic function 102, the function execution tool 108 selects and executes an efficient implementation of the elastic function 102 for the current situation. Because many of the possible optimizations were explored by the optimization planning tool 106, the function execution tool 108 simply analyzes the run-time parameters and available resources, selects the most efficient implementation from the planning results, and then executes that implementation while also providing run-time resource management services. During execution, the parallelization strategies of the elastic function 102 also use the optimization planning results to transparently distribute and balance work across all available resources. For the non-limiting example in FIG. 1, the application simply calls an elastic function 102 for sorting, which the function execution tool 108 then transparently partitions into a quick-sort algorithm running on the microprocessor and a merge-sort algorithm running on the FPGA, with additional post-processing to combine the results from each device.

To take advantage of elastic computing, applications call elastic functions 102, which raises the question of how those elastic functions 102 are created or provided. One target for elastic computing is mainstream, non-device-expert application designers who are concerned with specifying functionality and often lack the expertise required to design efficient functions for hybrid systems. Examples may include domain scientists, such as computational biologists/chemists, who commonly write applications in languages such as C and Fortran, and would like to use hybrid systems without becoming experts in FPGAs, GPUs, etc. Because creating implementations for an elastic function 102 often uses the same skills as creating device-specific implementations, such designers may not be able to create their own elastic functions 102.

To support these designers, a library usage model may be provided, where application designers call elastic functions 102 in the same way as existing, widely-used function libraries. Elastic function libraries could potentially be created for different application domains, where implementations of each elastic function 102 are provided by several potential sources. Device vendors are one likely source, because by enabling transparent usage of their corresponding devices via elastic functions, those devices could potentially become useable by new markets. For example, an FPGA manufacturer could attract software designers by enabling transparent usage of their FPGAs via elastic function implementations for functionality common to digital signal processing. Third-party library designers who already target specialized devices could also provide implementations of elastic functions for different devices. Further, open-source projects may establish a standardized elastic function library that could be extended with implementations from all participants. In this situation, experts from different domains may provide implementations optimized for different situations and devices. With the ability of elastic computing to automatically identify fast implementations, mainstream application designers could transparently exploit an implementation specialized for any given situation without knowledge of the actual implementation or situation.

Of course, there may be applications where designers create new implementations, for example, to target new hardware or provide new functionality. Although this usage model does often use device-specific knowledge, elastic computing aids the development of new implementations by allowing an implementation to be defined using existing elastic functions 102 and by providing services to balance work across resources. For example, if a new elastic function 102 requires sorting functionality (e.g., convex hull, etc.), an implementation of that function could call an elastic sort function, which already has an optimization plan. In addition, the function execution tool 108 may provide communication and resource management features, which may simplify the implementation.

Elastic functions 102 define multiple implementations of a given functionality, which enables the elastic computing tools 104, 106, and 108 to perform a detailed exploration of potential optimizations for different systems. Elastic functions 102 may be specified using alternate algorithms that are appropriate for different devices and input sizes, with some of those algorithms including parallelization strategies for multiple resources. Elastic functions 102 may be defined at any granularity, ranging from simple operations, such as, for example, sorting an array or performing inner-product on two vectors, to more complicated operations, such as, for example, frequency-domain convolution or matrix multiply. Elastic functions 102 may even define an entire application using nested elastic function calls (e.g., one elastic function 102 relying partially on the functionality of another elastic function 102), which enables optimization that can provide increased performance benefits and applicability on a wide range of systems.

Figure 2:
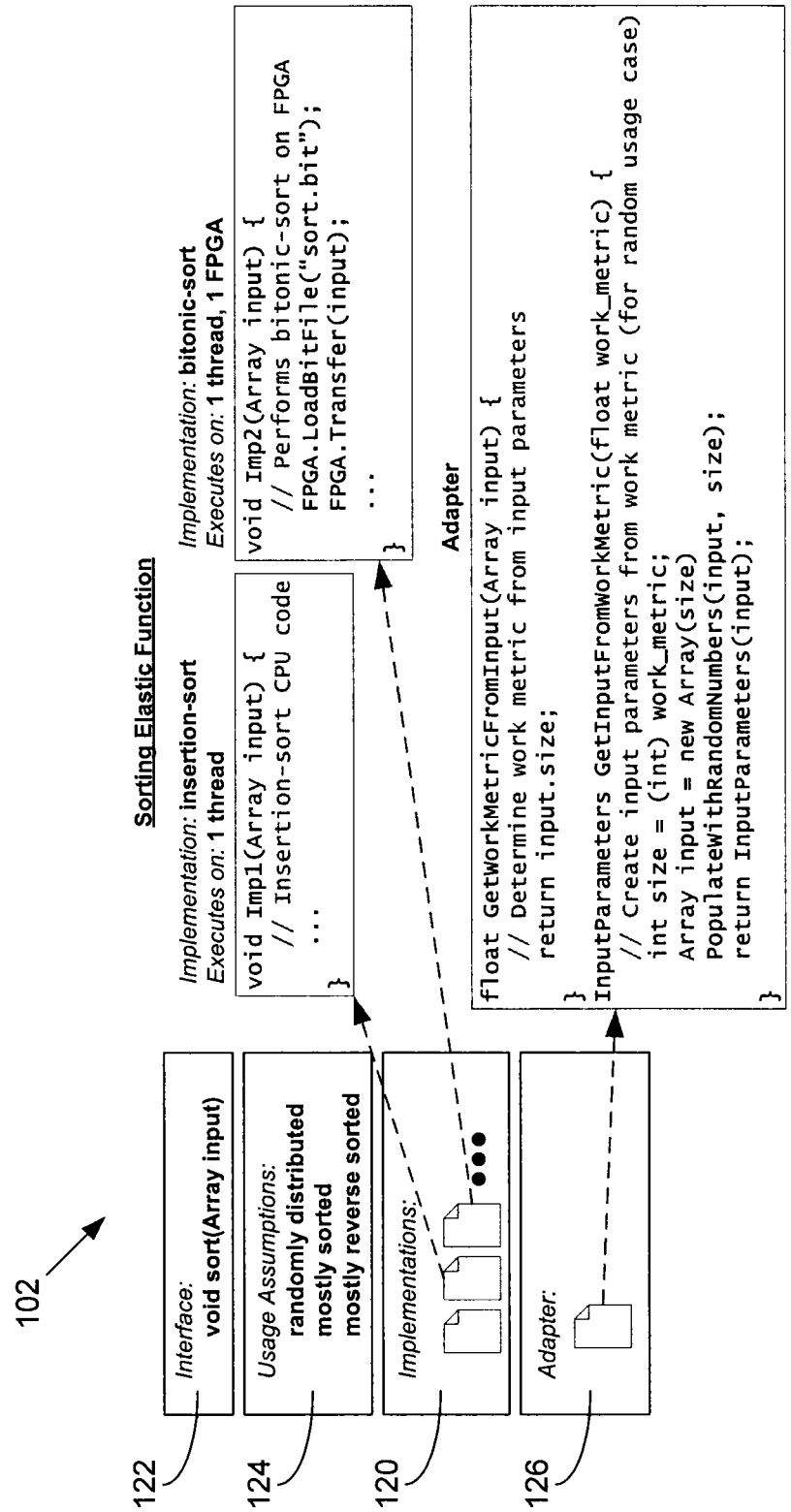
FIG. 2 depicts the components of an elastic function according to one embodiment.

Referring next to FIG. 2, each elastic function 102 consists of a set of implementations 120, an interface 122, a set of usage assumptions 124, and an adapter 126. The implementations 120 provide the alternate ways elastic computing may perform the functionality of the elastic function 102.

The interface 122 specifies how an application invokes the elastic function 102, which the application developer uses in conjunction with the usage assumptions 124 to specify greater detail about the invocation. The adapter 126 enables the elastic computing tool to assess the implementations and determine optimization decisions.

Each elastic function 102 specifies a knowledge-base of implementations 120 to perform the functionality of the elastic function 102. Each implementation 120 may be functionally identical (e.g., has the same inputs and outputs), and may rely on different algorithms and/or use different amounts and types of hardware resources. As a non-limiting example, a sorting elastic function 102 may have one implementation 120 that uses an insertion-sort algorithm executing on a single central processing unit (CPU) thread, while a second implementation 120 uses a multi-threaded version of a merge-sort algorithm, while a third implementation 120 uses a bitonic-sort algorithm executing on an FPGA. At run-time, the function execution tool 108 (FIG. 1) will select the implementation that it estimates will provide the best performance for a given invocation.

The implementations can be written in any language that can be compiled and linked with the framework (e.g., C/C++, assembly, Fortran, etc.). The implementation code can access files, sockets, interface with drivers, and perform other operations. The implementations 120 may be thread-safe, as the function execution tool 108 may spawn multiple instances of the same implementation across different threads.

In addition to the code that defines functionality, the implementations 120 also may specify what resources the code uses for execution. When the function execution tool 108 (FIG. 1) executes an implementation 120, the function execution tool 108 verifies that resources are available and may prevent multiple implementations 120 from simultaneously using the same resources. An implementation 120 may also specify that it uses a variable number of resources. As a non-limiting example, many multi-threaded implementations 120 evenly distribute work across any number of threads, allowing the same implementation code to be equally valid, and exhibit difference performance, for any number of threads allocated to it. In these cases, the implementations 120 specify the minimum number of resources required. Note that although implementations 120 may have resource requirements, the specification of those implementations 120 could potentially be done in a resource-independent way. As a non-limiting example, some of the implementations 120 could be defined using ANSI-C, which could then be converted to a specific FPGA implementation 120 using high-level synthesis.

Elastic computing, which may be independent of specific heterogeneous resources, may directly control the thread execution of software implementations 120 for a system. However, the implementation code may configure and make use of any heterogeneous resources on the system (e.g., through a corresponding driver interface, etc.). Therefore, thread implementations may reference supplementary device-specific code such as, for example, very-high-speed integrated circuits hardware description language (VHDL), compute unified device architecture (CUDA), open computing language (OpenCL), etc., or alternatively pre-compiled binaries for specific devices. The implementation 120 may specify heterogeneous devices as required resources so that the function execution tool 108 will prevent simultaneously executing implementations 120 from using the same resource. Native support for heterogeneous resources may be enabled by automating the creation of the corresponding thread function to configure and use the heterogeneous resource on behalf of the heterogeneous implementation 120.

Elastic computing fully supports multi-threaded implementations 120 and provides facilities for multi-threaded cooperation, which may be similar to message passing interface (MPI). When the function execution tool 108 selects multiple threads to execute a multi-threaded implementation 120, the function execution tool 108 may automatically spawn instances of the implementation 120 on each of the threads. Within each thread, the implementation 120 may be aware of the number of fellow instances as well as its relative index (e.g., an MPI rank). The function execution tool 108 may additionally provide functions to communicate and synchronize individually or collectively with the fellow instances. The implementation 120 instances execute in the same address space, allowing for the efficient passing of data between threads as pointers, as opposed to having to transfer the entire data structures. Elastic computing also supports multi-threaded heterogeneous implementations 120, with the function execution tool 108 similarly only spawning instances of the implementation 120 on the threads and relying internally on the implementation code to make use of the heterogeneous resources.

Elastic computing may include support for implementations 120 that make internal elastic function calls. This special type of implementation 120, called a dependent implementation 120 (e.g., the implementation 120 is dependent on other elastic functions 102), creates a larger optimization exploration space. Identical to how traditional complex functions are often defined using numerous simpler functions, dependent implementations 120 of complex elastic functions 102 can be defined using more basic elastic functions 102. As a non-limiting example, one implementation 120 of convex hull internally relies on a sorting step. As opposed to statically defining the code for the sort (or even calling a sort function from a standard library), a dependent implementation 120 can internally invoke a sort elastic function 102, enabling the implementation 120 to take advantage of the detailed optimization plan for the sort. Additionally, when multiple internal elastic function calls can occur simultaneously (e.g., multiple sorts), the function execution tool 108 may enable the elastic function calls to execute in parallel on different subsets of resources, each using an appropriate implementation 120 for its input size.

Although dependent implementations 120 may be used for any purpose, they are especially useful for divide-and-conquer algorithms. Essentially, a divide-and-conquer algorithm solves a big instance of a problem by first breaking it up into several smaller instances of the same problem. For an elastic function 102, this may translate to a dependent implementation 120 that first partitions its input, processes each individual input as multiple recursive elastic function calls, and lastly recombines the individual outputs to form the actual output of the implementation 120. As a non-limiting example, the merge-sort algorithm sorts a large set of elements by first partitioning the set, sorting the subsets individually (which the function execution tool 108 may implement using other sorting algorithms), and then merging the sorted subsets to form the overall result. In general, the partitioning of the input and recombining of the outputs may be specific to the particular algorithm used by the dependent implementation 120 and may be specified in the code of the implementation 120 itself.

Elastic computing may provide a feature called work parallelization planning, where dependent implementations 120 only supply a function to calculate the "sum" of two elastic functions 102 executing in parallel, and elastic computing will automatically determine the most efficient way to partition and parallelize the internal elastic function calls of the implementation 120. In addition, a generic dependent implementation 120 could be provided to automatically partition work across resources for data-parallel elastic functions 102.

The elastic function interface 122 is the mechanism that applications use to invoke the elastic function 102, which may internally invoke the function execution tool 108. From an application designer's point of view, the interface 122 may be identical to a normal function call, and may be defined by a function prototype that contains the parameters needed by the elastic function 102. In some embodiments, the interface 122 does not directly perform any of the functionality of the elastic function 102, but instead simply launches the function execution tool 108 to execute the elastic function 102. Once the elastic function 102 is complete, control returns to the interface 122, which correctly populates any output parameters, and returns control to the application.

The interface 122 may also specify a list of usage assumptions 124 to allow the application designer to provide extra information about the input parameters. For many elastic functions 102, some specific instances of input parameters form corner cases that require different optimization decisions. As a non-limiting example, a sorting elastic function 102 may provide usage assumptions 124 allowing for the specification of data characteristics (e.g., randomly distributed, mostly sorted, reverse sorted, etc.) that generally cannot be determined automatically. This extra information helps elastic computing tools make better optimization decisions, perhaps choosing an algorithm such as quick-sort for randomly distributed input data or insertion-sort for mostly sorted input data. Internally, the interface 122 may handle each usage assumption 124 independently, allowing for completely different optimization decisions for different usage assumptions 124. In one embodiment, the application specifies the usage assumption 124 by passing an optional parameter in the elastic function call.

To enable optimization planning for different situations, the implementation assessment tool 104 (FIG. 1) may predict performance for all combinations of input parameters. Such prediction is challenging due to the wide variety of types and numbers of parameters (e.g., function prototypes) used by different functions. To allow for elastic computing to support any elastic function, the implementation assessment tool 104 may support any function prototype. To enable this support, in various embodiments the elastic computing tools use an abstract internal representation called the work metric, which may be a floating-point quantity that generically represents the amount of work (e.g., execution time) required to perform an elastic function 102 on a corresponding set of input parameters.

Elastic functions 102 may provide an adapter 126 that is responsible for mapping a set of input parameters to the work metric. To create an effective adapter, the work metric is not necessarily proportional to execution time, but may be related such that a larger work metric generally requires a longer execution time. Additionally, in order to minimize run-time overhead, an adapter 126 may use a mapping that is not computationally intensive and avoids any complex analysis of the input parameters. For many implementations the mapping is simple. For example, FIG. 2 illustrates an adapter for a sorting elastic function that maps the input size (e.g., number of elements to sort) to the work metric. In this example, sorting 10 elements would have a work metric of 10, while sorting 100 elements would have a work metric of 100. As should be evident, the mapping may be calculable efficiently and a greater work metric may generally equate to a longer execution time.

For some implementations 120, adapters 126 employ a more complicated mapping between input parameters and execution time, where the relationship involves not just analyzing a single input parameter but several input parameters. As a non-limiting example, the execution time of multiplying matrices may be highly dependent on the size of both input matrices. However, even in these cases, an adapter 126 can provide a reasonable mapping by taking advantage of knowledge of the underlying algorithm and its asymptotic performance. In the matrix multiply case, the asymptotic analysis of matrix multiply is $\Theta(m*n*p)$, where m is the number of rows in the first matrix, n is the number of columns in the first matrix, and p is the number of rows in the second matrix. Therefore, execution time is approximately proportional to $m*n*p$, so an adapter 126 can be created for matrix multiply, as illustrated in FIG. 3, by setting the work metric equal to $m*n*p$. Note again that the adapter 126 may efficiently calculate the work metric from the input parameters and larger work metrics may generally equate to longer execution times.

In addition to the mapping of input parameters to work metric, the adapter 126 may also provide a reverse mapping to map the work metric to an instance of corresponding input parameters. For many implementations 120, the reverse mapping is just as simple as the forward mapping. For example, FIG. 2 illustrates a reverse mapping for the sorting elastic function 102, where the adapter 126 uses the work metric as the number of elements to sort. As the mapping from input parameters to work metric is likely not one-to-one, the reverse mapping typically makes assumptions to create the input parameters. In cases where these assumptions may themselves significantly alter the execution time of the elastic function 102 (e.g., populating the input array to sort with randomly distributed values versus mostly increasing values), the adapter 126 may utilize the usage assumptions to separate out cases to use different adapters 126. FIG. 3 illustrates a reverse mapping for the matrix multiply elastic function 102, where the adapter fixes the m and n dimensions to 16 and uses the work metric to determine the p dimension. Note that the product of m, n, and p is approximately equal to the work metric, which is consistent with the mapping of input parameters to work metric.

The implementation assessment tool 104 (FIG. 1) estimates performance of each elastic function implementation 120 (FIG. 2), for each execution resource of a system, and for all input sizes, which is represented as an implementation performance graph (IPG) 160, as illustrated in FIG. 4. Each IPG 160 allows for the estimation of execution time of a single implementation 120 (FIG. 2) from its work metric (e.g., input parameters). The implementation assessment tool creates a separate IPG 160 for different numbers of resources (e.g., a multi-threaded implementation 120 that supports any number of threads) and different usage assumptions (e.g., sorting randomly distributed versus mostly sorted data), as both these issues can affect the performance of an implementation. The optimization planning tool 106 (FIG. 1) uses the IPGs 160 to make optimization decisions by comparing the relative performances of different implementations 120.

The implementation assessment tool 104 may create the IPGs 160 by repeatedly executing each implementation 120 with a variety of work metrics and measuring the resulting execution time, which we refer to as sampling. Because the sampling process measures the actual performance of the implementation on the system, the samples may include all of the architecture's effects on the performance of the implementation 120 (e.g., memory bottleneck, pipelining characteristics, cache configuration, etc.). As each implementation 120 may execute numerous times to create all the IPGs 160, implementation assessment can be a time-consuming process. However, implementation assessment occurs independently of any applications that use the elastic function 102 and may occur once per system, likely when the elastic computing tools or an elastic function library is installed.

Implementation assessment and optimization planning are dependent upon each other as the implementation assessment tool 104 may collect samples from dependent implementations 120 after the optimization planning tool 106 has completed execution, which in turn may rely on the IPGs 160 created from implementation assessment. This interdependency may result in the implementation assessment tool 104 and the optimization planning tool 106 executing in a valid order that satisfies their dependency upon each other's information.

Due to the large number of work metrics for an implementation, an exhaustive solution may not be feasible. To create the IPG 160 in a reasonable amount of time, the implementation assessment tool 104 may use performance prediction to estimate a large percentage of the exploration space. One possibility would involve, for example, selecting random work metrics, collecting the execution time, and interpolating the results to create the IPG 160. Another approach would be to select work metrics at fixed intervals (e.g., every 100th work metric) and use interpolation in between. Because every collected sampled involves executing the implementation 120, it is important to minimize the total number of samples while not significantly reducing accuracy. In various embodiments, the implementation assessment tool 104 uses an adaptive heuristic whose goal is to minimize IPG 160 generation time by collecting as few as samples as possible while still meeting requested accuracy levels.

As shown in FIG. 4, the implementation performance graph (IPG) 160 is a 2-dimensional piecewise linear function with the work metric of the implementation 120 (FIG. 2) on the x-axis 162 and execution time on the y-axis 164. The y-value of the IPG 160 at any point is the estimated execution time for the corresponding x-value (e.g., work metric). The IPG 160 may be stored as the ordered set of endpoints describing each piecewise linear segment, allowing for the other elastic computing tools to estimate execution time for any work metric, for example, by using interpolation between the nearest endpoints.

The implementation assessment tool 104 (FIG. 1) may generate the IPG 160 in two iterative steps: segment generation and profile generation. The goal of segment generation is to identify groups of samples that can be accurately approximated by a segment, for example, from a linear regression analysis. Segment generation works by picking a work metric within the current sampling region, called the interval of interest, collecting a sample of the execution time of the implementation at that work metric, and then statistically analyzing intervals of samples to find linear relationships that meet specified accuracy requirements. The goal of profile generation is to intelligently select the best subset of these segments to create the IPG 160. Profile generation works by starting at the smallest work metric and connecting segments that "grow" towards larger work metrics, all the while attempting to minimize the prediction error from the samples and the total number of segments. The IPG 160 is complete once the segments span the entire work metric range for the implementation 120.

Segment generation is responsible for sampling the relationship between work metric and execution time, and then inferring the most-likely linear trends, represented as segments, from these samples. For each iteration of implementation assessment, segment generation starts by randomly selecting a work metric within the current interval of interest, and then measuring the execution time of the implementation 120 at that work metric to form a new sample data point. Although segment generation could potentially use any form of time measurement, time-stamp counters on the processor make be used to ensure high-precision timing measurements. Segment generation then generates new segments, and corrects previously generated segments, by considering the new sample collectively with all the samples from previous iterations.

Segment generation may infer the linear trends from the samples by performing a linear regression analysis. Linear regression analysis is a statistical tool that calculates the line that minimizes the mean-squared distance between the line and the samples. Segment generation then shortens the line to a segment by bounding its work metric to have the same range as the samples used for the analysis. In addition to the segment, the regression analysis also allows determination of the confidence in the linear trend by calculating the corresponding confidence interval. A confidence interval is another standard statistical tool that specifies how accurately the segment can specify the execution time at any particular work metric. As a non-limiting example, the confidence interval might specify that at a work metric of 100, the generated segment is 95% confident that the average execution time is within 95-105 ms.

Figure 5:
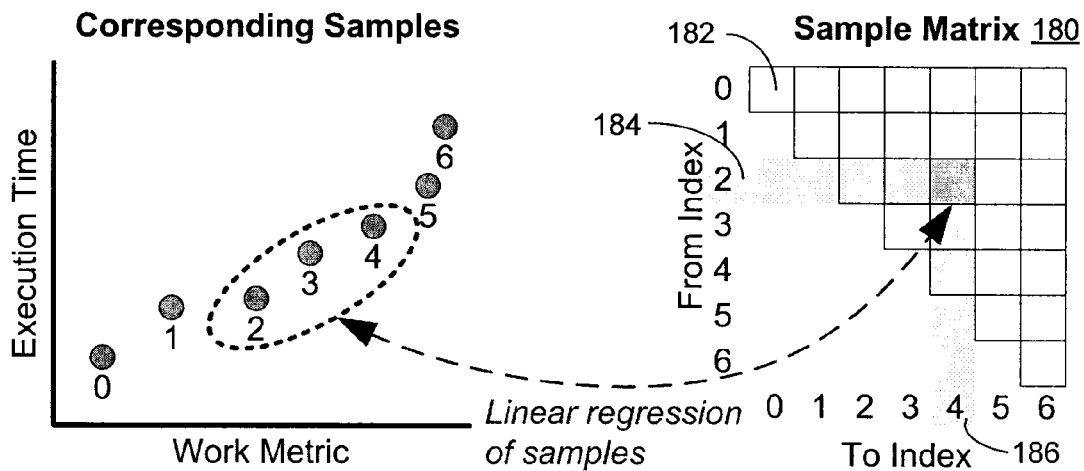
FIG. 5 illustrates one example of storing samples and the results of linear regression analyses in a sample matrix according to one embodiment.

With reference to FIG. 5, the results of the linear regression analyses, and the samples themselves, may be stored within a data structure referred to as the sample matrix 180. Segment generation may perform a linear regression analysis on all possible intervals of sequential samples, and store the corresponding results as cells 182 within the sample matrix 180 data structure. As illustrated in FIG. 5, the sample matrix 180 is an upper-right triangular matrix with the number of rows and columns equal to the number of collected samples that have unique work metrics (segment generation combines samples with identical work metrics). Each cell 182 within the sample matrix 180 stores the output of a single linear regression analysis (in addition to other information) performed on a subset of all the samples collected. The coordinates of each cell 182 specify the interval of samples used for the analysis, with the row index 184 equaling the index of the starting sample and the column index 186 equaling the index of the ending sample.

As sample generation indexes all of the samples in ascending work metric order, an interval of samples corresponds to all of the samples collected within a range of work metrics. For example, the linear regression analysis of the samples indexed between 2 and 4 would be found in the matrix in the cell 182 located at row 2, column 4. If the work metric of the sample at index 2 was 35 and the work metric of the sample at index 4 was 110, the linear regression analysis would then similarly correspond to any linear trend inferred for the work metric range of 35 through 110. As a linear regression analysis uses the accumulation of data-point statistics for its calculations, sample generation significantly reduces the processing time required to populate the sample matrix 180, for example, by using a dynamic programming algorithm that calculates the linear regression of larger segments from the intermediate results saved from smaller sub-segments.

As a result, sample generation can perform the linear regression analysis on one interval of samples by partitioning the interval into two sub-intervals and simply accumulating the intermediate results stored in the corresponding cells of the two sub-intervals. Lastly, the cells 182 located along the diagonal of the sample matrix 180 represent intervals of only a single sample (or multiple samples that all have the same work metric). Segment generation populates the diagonal cells 182 with the statistics of the collected samples directly, which in turn form the base cases for generating segments of larger intervals using the dynamic programming algorithm.

When populating each cell 182 of the sample matrix 180, segment generation performs several checks to gauge the appropriateness of the segment approximation. The first check is to verify that the current interval contains, for example, at least three samples so that the linear regression result is non-trivial. The second check is to see if the segment approximation is sufficiently accurate by excluding segments with too wide of a confidence interval. The variance and spread of the samples determines the width of the confidence interval. Likewise, the wider the confidence interval, the less accurately the segment predicts the execution time. A prediction parameter, referred to as the segment error threshold, specifies the maximum percent width (e.g., the width of the confidence interval relative to its execution time) allowed by a segment's confidence interval.

If any of these checks fail, segment generation flags the corresponding cell 182 as not containing a valid segment. If the segment does pass all the checks, segment generation calculates one last metric, referred to as the sample out-of-range count, to use for the profile generation step. Sample generation calculates the sample out-of-range count by counting the number of samples within the interval that have a "large" percent error when compared to the value estimated by the segment. A prediction parameter, referred to as the sample error threshold, determines the threshold of what constitutes a "large" percent error. The sample out-of-range count provides a fair comparison between alternate segments in the sample matrix 180 as it lessens the impact of any anomalous samples. Profile generation will then attempt to minimize this count when finding the best set of connected segments to use to form the resulting IPG 160.

Figure 6:
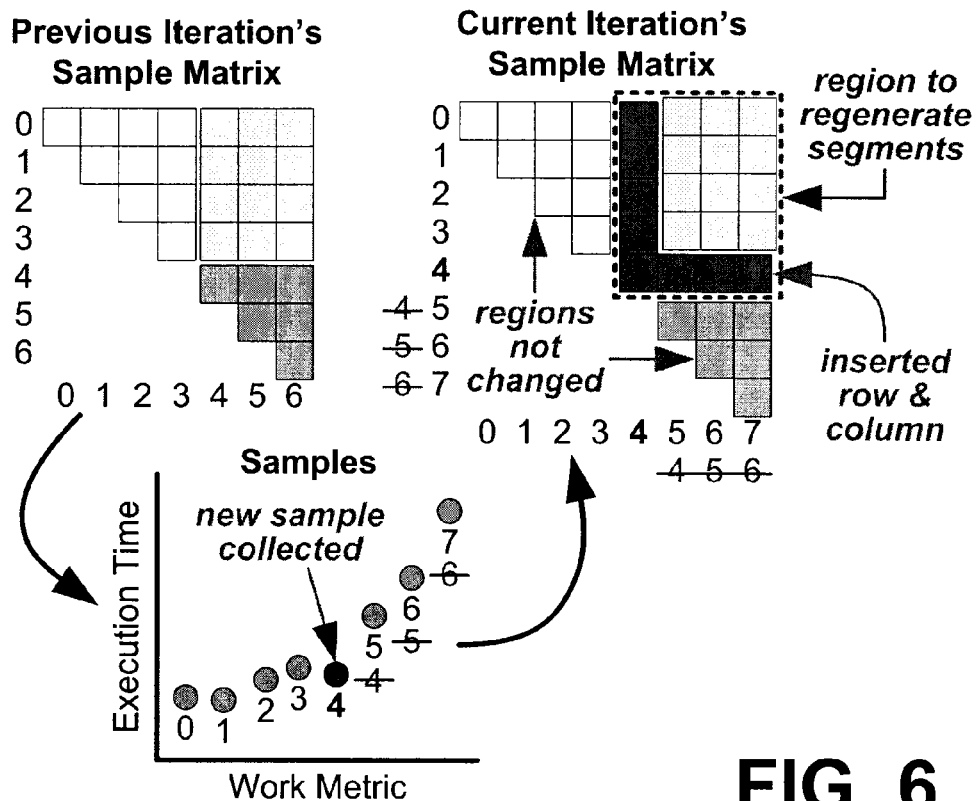
FIG. 6 illustrates one example of iterations in sample generation according to one embodiment.

As illustrated in FIG. 6 (and described in pseudo-code in FIG. 7), each iteration of sample generation collects a new sample, finds the sorted index of the new sample, inserts a new row and column into the sample matrix 180 (FIG. 5) (assuming the sample has a unique work metric), and then reprocesses the cells whose results may change as a result of the new sample. Any cells 182 (FIG. 5) located at a column less than the newly inserted column or with a row greater than the newly inserted row, correspond to intervals of samples located entirely before or after the newly inserted sample, and therefore do not need regeneration. The remaining cells 182 are located in a rectangular region bordered by the newly inserted row and column inclusively. Segment generation then populates the newly created diagonal cell 182 with the statistics of the new sample and then processes the remaining cells 182 in decreasing row and increasing column order. Processing the cells 182 in this order allows for the reuse of intermediate calculations for the linear regression analysis, as discussed previously.

Profile generation determines the best set of segments from the sample matrix 180 that can be connected together to form the IPG 160 (FIG. 4) that minimizes the total sample out-of-range count. Profile generation may use a dynamic programming algorithm that "grows" the IPG 160 from the smallest work metric towards the largest. The algorithm operates by traversing the sample matrix 180 in increasing row and increasing column order. As the algorithm reaches each cell 182, it determines and saves in the cell 182 the best candidate segment to precede the current segment, such that the resulting connected set of segments, referred to as a chain, has the lowest sample out-of-range count (or the least number of total segments in the event of a tie). A candidate segment is any segment which starts prior and ends during the interval of the current segment (e.g., the segments overlap and the endpoint is progressing forward).

After the algorithm completes, the best chain of segments is the one that ends at the largest work metric, with the lowest sample out-of-range count, and with the fewest number of segments (evaluated in that order). The endpoint of the best chain corresponds to how much of the IPG implementation assessment has sufficiently determined so far. The IPG 160 is complete when the best chain extends all the way to the last valid work metric. Upon completion, the IPG 160 is created as the intersection points between the segments as well as the endpoints for the first and last valid work metric values.

Profile generation is also responsible for locating the interval of interest to encourage the picking of samples that will promote the growth of the best chain in the subsequent iteration. In the first few iterations when the sample matrix 180 contains no segments, the interval of interest is located at the lower bound of the work metric to pick samples that will help establish the first segments. In later iterations, profile generation centers the interval of interest at the work metric of the last endpoint of the best chain. Centering the interval of interest at the last endpoint extends the interval beyond the end of the chain, promoting the generation of new segments that will further lengthen the chain. Additionally, the interval extends prior to the last endpoint to allow for the reinforcement or correction of segments recently generated. The width of the interval of interest is adaptive and set proportionally to the product of execution time and the inverse of the slope of the last endpoint. A prediction parameter, referred to as the interval growth factor, specifies the proportionality factor.

As illustrated in FIG. 8 (and described in pseudo-code in FIG. 9), each iteration of profile generation requires the reconsideration of some of the cells 182 (FIG. 5) in the sample matrix 180 (FIG. 5) as segments in the best possible chain. Any cell 182 with a column less than the index of the newly inserted sample (for the current iteration), would not have any of its predecessors affected by the sample insertion, and therefore would still be valid. However, any cells 182 with a column greater-than or equal to the newly inserted sample could either itself have changed and/or might have a different selection of predecessors, invalidating any previous predecessor decisions. Profile generation loops through the cells that require reconsideration in increasing row and increasing column order, so that all of the possible predecessors are already valid. To reduce the time complexity, the algorithm may keep track of the best predecessor segment as it traverses the cells, as opposed to searching for the best predecessor candidate for each cell individually. The algorithm searches the sample matrix 182 and returns the best chain. Implementation assessment is complete if the chain extends to the last valid work metric value, or alternatively uses the chain to determine the next iteration's interval of interest.

The optimization planning tool 106 (FIG. 1) analyzes the implementation performance graphs (IPGs) 160 (FIG. 4) created from implementation assessment and plans for optimization decisions that elastic computing will perform at run-time when executing the elastic functions 102 (FIG. 1). In some embodiments, elastic computing performs analyses for two different optimizations: fastest implementation planning and work parallelization planning. Fastest implementation planning reduces run-time overhead of the function execution tool 108 (FIG. 1) by creating a plan that specifies which implementations to use in different situations. Work parallelization planning then combines the fastest implementation plans to determine effective parallelizations (e.g., balanced workloads) for different input sizes and resources, which the dependent implementations 120 (FIG. 2) use to determine how to parallelize their work efficiently at run-time. In both cases, the optimizations analyze performance graphs and do not execute the implementations 120. Additionally, the optimizations are independent of any applications that use elastic computing and occur once per system, likely when the elastic computing tools or an elastic function library is installed.

Fastest Implementation Planning (FIP) analyzes the IPGs 160 corresponding to the alternate implementations of an elastic function 102 and creates an execution plan that reduces run-time overhead of the function execution tool 108, which selects the implementation 120 that it estimates to have the fastest execution time based on current run-time parameters. Without such planning, the function execution tool 108 may evaluate the IPG 160 of all candidate implementations 120 individually to compare the relative performances and determine which is the fastest. Such an approach may result in overhead as some elastic functions may have numerous implementations 120. To avoid this overhead, FIP combines the IPGs 160 into a single function performance graph (FPG) 200 (FIG. 10) that specifies the fastest implementation 120 for different regions of the work metric. With the FPG 200, the function execution tool 108 may perform a single lookup to determine both the best implementation 120 to use for the elastic function and its estimated execution time, resulting in a significant reduction in run-time overhead.

Figure 10:
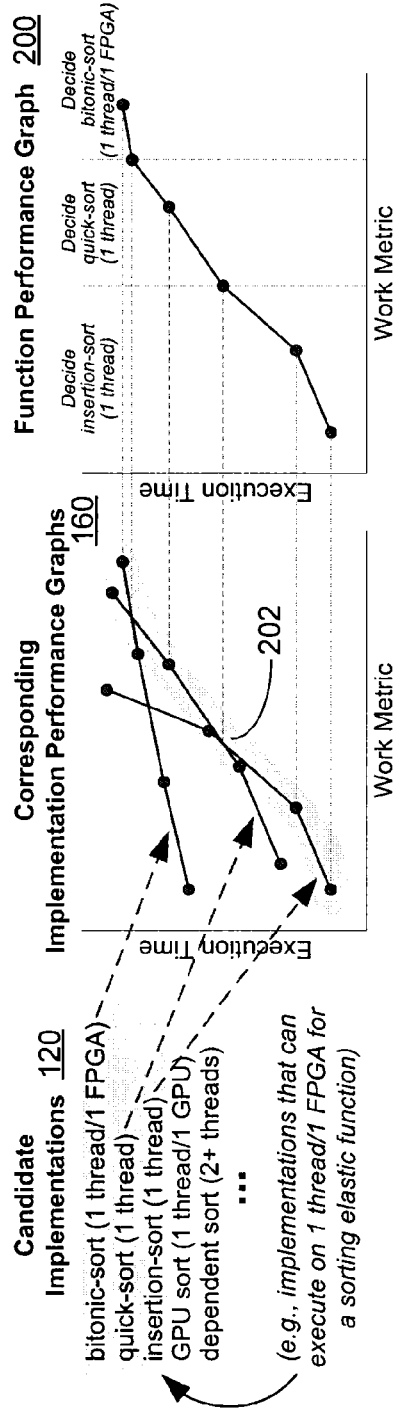
FIG. 10 depicts function performance graph creation according to one embodiment.

With reference to FIG. 10, FIP creates a separate FPG 200 for each elastic function 102 (FIG. 1), usage assumption 124 (FIG. 2), and subset of resources on the system. For each FPG 200, the candidate implementations 120 comprise of any implementation 120 of the current elastic function 102 that can execute on the available resources, or within a subset of the available resources. For example, creating the FPG 200 for the sort elastic function 102 executing on 4 threads will consider any implementation 120 of the sort elastic function 102 that can execute on 1, 2, 3, or 4 threads. For each candidate implementation 120, FIP uses the IPG 160 corresponding to the implementation 120 executing with the current usage assumption 124 to estimate the performance of the implementation 120.

Calculating the FPG 120 may employ computational geometry techniques to determine the fastest implementation 120 for different regions of work metric. As illustrated graphically in FIG. 10, this process is identical to overlaying the candidate IPGs 160 and identifying the portion of the graph corresponding to the fastest IPG 160 at each work metric (e.g., region 202 of the graph). As each IPG 160 is a piece-wise linear function, the region 202 is also piece-wise linear consisting of segments of the IPGs 160 and intersection points between IPGs 160. The region 202 may be saved as the FPG 202 is concerned about the fastest implementation 120 at each work metric value. To implement this function, FIP may use, for example, a modified version of the Bentley-Ottmann algorithm, which may be used to find intersection points between line segments.

In the Bentley-Ottmann approach, a sweep-line algorithm starts from the left-most endpoint of the segments and proceeds to the right while tracking the vertical order of the segments (e.g., the order in which it intersects the sweep-line). The only places where the vertical order of the segments can change are at the event points, which occur wherever a segment ends, a new segment begins, or two neighboring segments intersect. The modified solution acts similarly but takes advantage of the fact that only one segment of each IPG 160 intersects the sweep-line at any moment (e.g., the segments of an IPG 160 do not vertically overlap) and that the points describing the fastest implementation 120 are of interest (e.g., the lowest segment vertically). The modified solution runs efficiently in $\Theta((k+m)*\log n)$ time, where k is the accumulated number of segment intersections for all candidate IPGs 160, m is the accumulated number of segments for all candidate IPGs 160, and n is the number of candidate IPGs 160. FIP saves the FPG 200 as the ordered set of points that describe the piece-wise linear segments of the fastest IPG 160 for every work metric.

The FPG 200 data structure may be similar to the IPG 160 data structure in that it stores an estimated execution time, but may provide additional information about the implementation 120 and execution resources that produced that execution time. As a result, a single lookup in the FPG 200 from a work metric value may return all of the information required to determine the best implementation 120 to use to execute an elastic function 102 at that work metric value, including a reference to the best implementation 120, the subset of resources to use to execute that implementation 120, the estimated execution time to expect from the execution, and/or other data.

Work parallelization planning (WPP) analyzes the FPGs 200 corresponding to multiple instances of an elastic function 102 executing on parallel resources and combines them into a work parallelization graph (WPG), which requires only a single lookup by a dependent implementation 120 to determine how to most efficiently parallelize its work across parallel resources. WPP is best used by dependent implementations 120 that implement divide-and-conquer algorithms, which partition large instances of a problem into multiple smaller instances of the same problem and have their results combined in the end. For example, an elastic sort function may partition data into subsets that can be sorted in parallel.

Determination of how to partition the problem and combine the smaller outputs are generally specific to the algorithm used by a dependent implementation 120, but WPP supports these dependent implementations 120 by providing information regarding appropriate input sizes for each partitioned instance and resources where each instance should execute. For example, if an FPGA is available that can sort 10× faster than a CPU, then WPP would likely suggest that the FPGA implementation should be assigned 10× more data than the CPU so that the execution times between both implementations are balanced. While many different types of dependent implementations 120 could benefit from WPP, the non-limiting examples herein assume that the dependent implementation 120 implements a divide-and-conquer algorithm.

Each dependent implementation 120 that uses WPP provides a work summing function (WSF) that specifies how to sum the work metrics of two parallel instances of an elastic function 102 into a single work metric that represents the larger, combined instance. For example, the merge-sort algorithm sorts a large set of elements by first partitioning the set, sorting the subsets individually, and then merging the sorted subsets to form the overall result. Therefore, if a merge-sort implementation had an input size of 100 elements and partitioned the inputs into two sets, the implementation 120 would rely internally on any two nested sorts whose subset lengths sum to 100. For example, sorting 1 element in parallel with sorting 99 elements, sorting 2 elements in parallel with sorting 98 elements, etc. are all valid ways to perform the nested sorts.

The WSF provides the equation to map the work metrics of the two smaller problems to the work metric of the larger problem. In the sorting example, if it assumed that the adapter for the sorting elastic function 102 sets the work metric equal to the length of the array to sort, then the WSF would simply sum the two work metrics of the smaller sub problems. As a result, sorting 1 element in parallel with sorting 99 elements would have work metrics of 1 and 99, respectively, which the WSF would sum to 100. Similarly for any two nested sorts that sorted a total of 100 elements, the WSF would also sum to 100, effectively creating a lookup for the larger problem (e.g., sorting 100 elements) to find all the different options for performing the smaller problems. In addition to considering different partitions of the work, WPP also considers the resources on which to perform the two nested elastic functions, leaving a large exploration space of work parallelization options from which WPP must determine the most efficient.

WPP considers partitioning work across two parallel resources to handle all resource partitioning cases. As the dependent implementation 120 performs the sub-problems as internal elastic function calls, the function execution tool 108 can select dependent implementations 120 for these calls (assuming these dependent implementations 120 are the fastest option), which enables partitioning across an arbitrary number of resources. For example, work may be partitioned across three elastic functions 102 by having one dependent implementation 120 parallelize its work across two elastic function calls, from which the function execution tool 108 selects another dependent implementation 120 for one of them, which results in three elastic functions 102 executing in parallel.

WPP creates a separate WPG for each dependent implementation 120, usage assumption 124, and subset of resources on the system. For each WPG, WPP uses the FPGs 200 to estimate the execution time of the two sub-problems for the dependent implementation 120, with the goal being to find the partitioning of work and resources which results in the least overall execution time (e.g., minimizing the maximum execution time). WPP may create the WPG in two steps. The first step considers all partitions of resources and combines the performance estimated by the FPGs 200 to create a set of fixed-partitioning parallelization graphs (FPPGs), which can be used to determine the best partitioning of work when the partitioning of resources for the two sub-problems is static. The second step then combines the FPPGs to determine the best partitioning of resources among all resource partitions to create the WPG.

Figure 11:
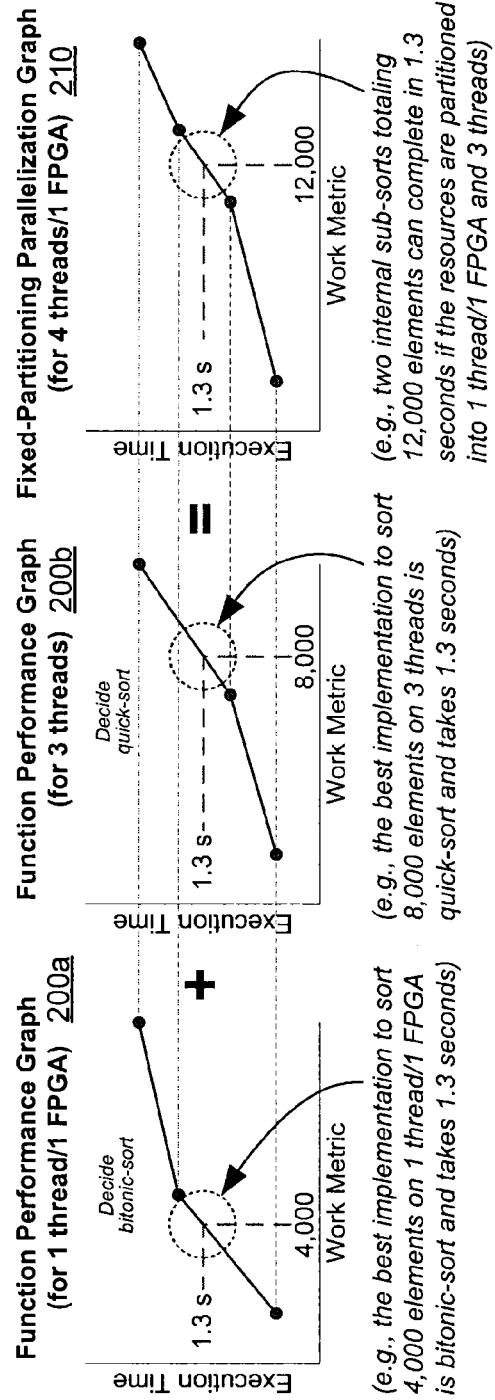
FIG. 11 depicts fixed-partitioning parallelization graph creation according to one embodiment.

WPP creates separate FPPGs for every pair of FPGs 200 whose sum of resources is not greater than the resources available on the system. Because each FPG depicts the best performance of the elastic function on a specific subset of resources, a pair of FPGs provides an estimate of the performance of two instances of an elastic function executing in parallel on their corresponding resources. As illustrated in FIG. 11, WPP creates an FPPG 210 by using a sweep-line algorithm. The sweep-line is horizontal and starts at the smallest execution time that would result in the sweep-line intersecting both FPGs 200a and 200b, and then moves in an increasing execution time direction, stopping at the next point in either FPG 200a, 200b that comes next in ascending execution time order. For every iteration, the sweep-line intersects a single point of one or both FPGs 200a, 200b, which corresponds to the maximum amount of work each parallel instance of the elastic function can execute in that amount of execution time. If the sweep-line moves to an execution time beyond the end of one of the FPGs 200a, 200b, then WPP will use the last point of that FPG 200a or 200b, which corresponds to the maximum amount of work that those resources can perform.

WPP combines the points from the two FPGs 200a, 200b to create a new point in the FPPG 210 graph, with a work metric equal to the "sum" of the two work metrics, calculated by the WSF, and an execution time equal to the current execution time position of the sweep-line. Additionally, WPP saves the two points themselves in the FPPG 210, so that the dependent implementation can determine how to partition its work. Once the sweep-line traverses all points of both FPGs 200a, 200b, the creation of the FPPG 210 is complete. The algorithm executes efficiently in $\Theta(m)$ time, where m is the sum of the number of segments in both FPGs 200a, 200b.

In one embodiment, WPP assume that an elastic function 102 will exhibit identical performance regardless of any other simultaneously executing elastic functions 102. In reality, contention for RAM and other resources may result in a performance slowdown. Resource contention factors may be added to reflect the performance change.

Figure 12:
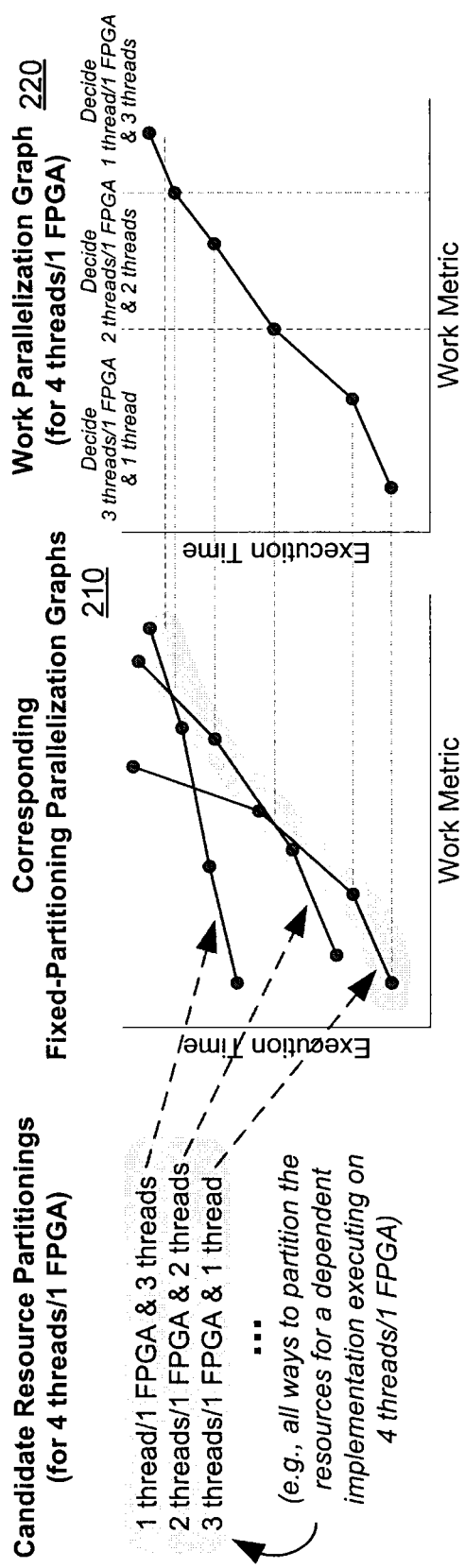
FIG. 12 depicts work parallelization graph creation according to one embodiment.

As illustrated in FIG. 12, WPP combines all of the FPPGs 210 and saves the best partitioning of resources for each work metric region to create the WPG 220. This process operates may operate similarly to the modified version of the Bentley-Ottmann algorithm used in FIP, but with different information saved about each point. In the end, a single lookup in the WPG by the dependent implementation will return the work metric, implementation 120 (FIG. 2), and resource combination to use for each of the parallel executions in addition to the overall parallel execution time. The dependent implementation 120 can then use the resource combination to determine how to partition its resources and the work metric to determine how to partition its work.

Elastic function execution occurs whenever an executing application or dependent implementation invokes the elastic function interface. For both cases, the elastic function call may operate identically to a normal function call, with invoking code that first calls the interface 122 (FIG. 2) with input parameters and then waits for the call to return any output parameters. Unlike a normal function call, the elastic function 102 does not have a static implementation 120, so the call instead invokes the function execution tool 108 (FIG. 1) to automatically select the best implementation 120 for the current combination of input parameters, usage assumption 124 (FIG. 2), and availability of resources. The only difference between an elastic function 102 invoked from an application and from a dependent implementation 120 is in the specification of the resources on which an elastic function 102 may execute. An application invoking an elastic function 102 may utilize up to all of the resources available on the system. On the other hand, a dependent implementation 120 is already executing on certain resources, and therefore may use a subset of those resources for its internal elastic function calls.

In various embodiments, the function execution tool 108 operates as follows. First, the function execution tool 108 uses the elastic function 102, usage assumption 124, and resources specified by the invocation to locate the corresponding FPG 200. Second, the elastic function's adapter 126 (FIG. 2) converts the input parameters to the corresponding work metric. Third, the function execution tool 108 uses the work metric to perform a lookup in the FPG 200, which returns the most efficient implementation 120 and the subset of resources to use. Note that it is not always beneficial to use all available resources because more resources typically require more overhead, which the additional processing power can overcome if the computation is large enough. Fourth, the function execution tool 108 allocates the subset of resources specified by the FPG 200 from the set of available system resources, so that no other implementation 120 may execute on the same resources before the elastic function completes. Fifth, the function execution tool 108 starts instances of the implementation 120 specified by the FPG 200 on all thread resources allocated to the implementation 120. The subset of resources specified by the FPG 200 may also include heterogeneous resources, but the function execution tool 108 will allocate the resources to the implementation 120 and rely on the implementation code to actually interface with those resources.

The elastic function 102 is complete once all thread instances terminate, at which point the function execution tool 108 returns control to the invoking code. The most computationally intensive part of the function execution tool is the lookup in the FPG 200, which executes efficiently in $\Theta(\log m)$ time, where m is the number of segments in the FPG 200. Although the number of segments can vary for different functions, the convolution case study discussed in the results comprised of 20 segments on the Elastic system and 19 segments on the NOVO-G node resulting in a negligible lookup time.

If the function execution tool 108 selects a dependent implementation 120, then the code of the implementation 120 may internally invoke additional elastic functions 102. Because the elastic function execution tool 108 has already allocated a subset of system resources for the implementation 120, any internal elastic function calls may execute on a subset of resources within that allocation. The implementation 120 may invoke any elastic function 102 and specify that the function can use up to all of the corresponding resources. Alternatively, the implementation may specify to the function execution tool 108 to first partition its allocated resources so that multiple internal elastic functions 102 may execute in parallel. Each internal elastic function call executes independently, allowing for the selection of different implementations 120 for each parallel instance. The dependent implementation 120 may also take advantage of the work parallelization planning feature to inform its decision of how to partition its resources and work.

Figure 13A:
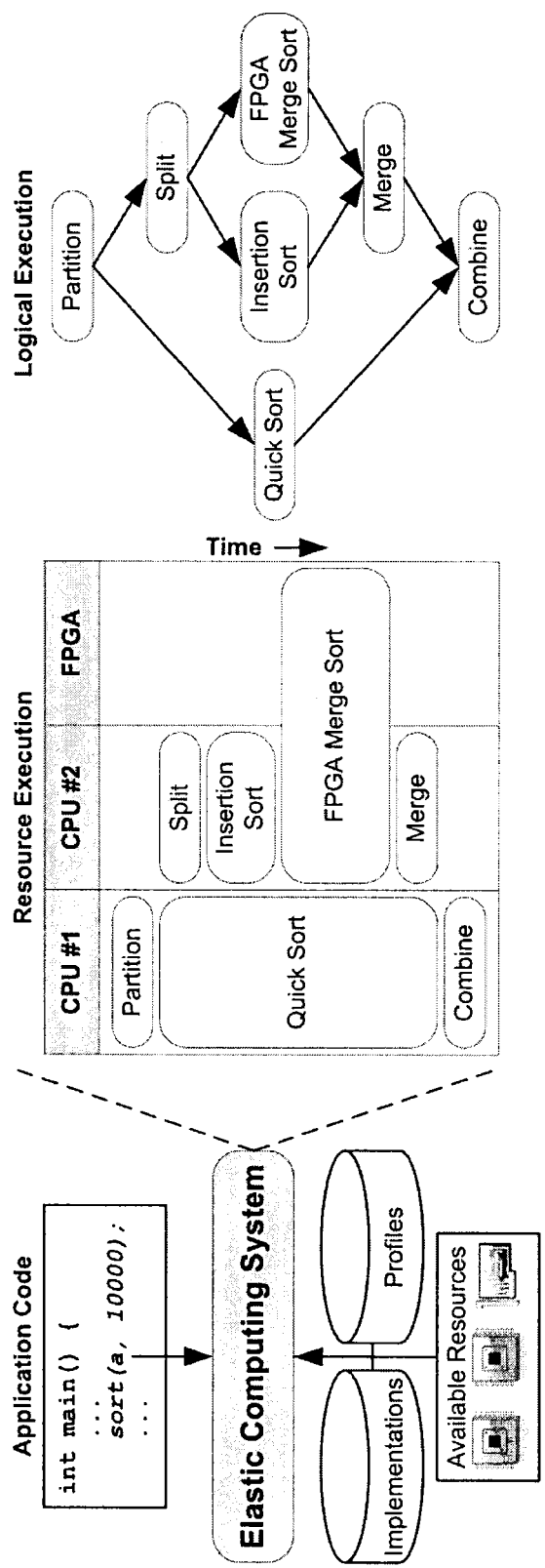
FIG. 13A illustrates one example of the elastic computing system according to one embodiment.

FIG. 13A illustrates an example of the elastic computing system, showing the independent implementations selected for a sorting elastic function 102 (FIG. 1). When the application executes the sort( ) interface function, the interface invokes the elastic computing system, which searches for the fastest implementation 120 (FIG. 2) for an input size of 10,000 and available resources consisting of two CPU's and one FPGA. The elastic computing system uses the performance profiles of the candidate implementations 120 and determines that the fastest implementation 120 is a dependent implementation 120.

The dependent implementation 120 first partitions the input using a CPU and then invokes two additional elastic sorting functions, executing in parallel, to sort the partitioned data. For one of those functions, the elastic computing system determines the fastest implementation 120 is a Quick Sort implementation 120. For the other function, the elastic computing system selects another dependent implementation 120 that first splits the data and then uses Insertion Sort running on a CPU and Merge Sort running on an FPGA to sort the split data. The elastic computing system then selects a Merge implementation 120 to merge the results from the Insertion Sort and FPGA Merge Sort. Finally, the outer-most dependent implementation 120 executes a Combine implementation 120 to combine the results into the final sorted output. The logical execution, ignoring timing, is shown on the right side of FIG. 13A. Note that all of the information used to determine the fastest implementation 120 is saved in the performance profiles from the implementation planning step.

Figure 13B:
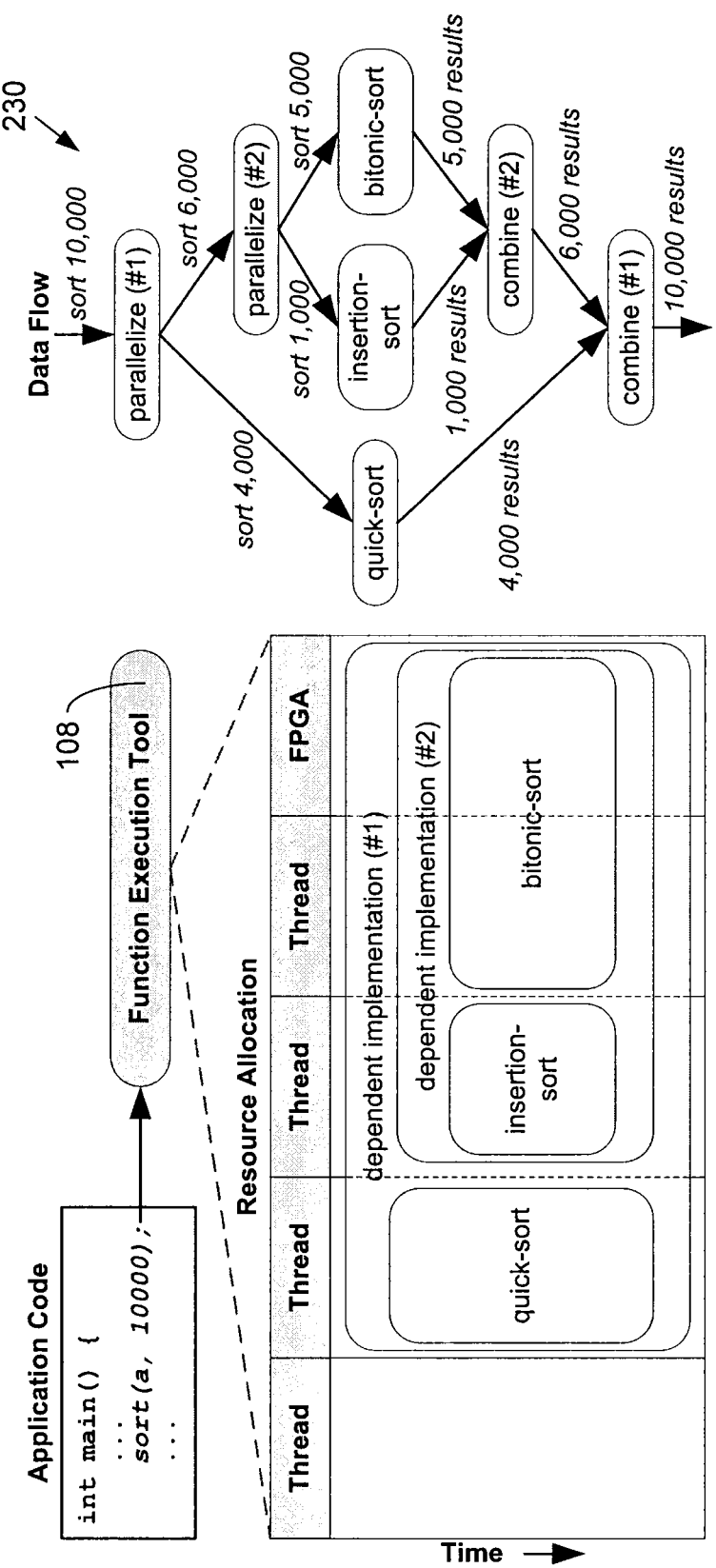
FIG. 13B illustrates one example of the execution of a sorting elastic function according to one embodiment.

FIG. 13B demonstrates the execution of a sorting elastic function on a system with four threads (e.g., cores) and an FPGA. The figure demonstrates the function execution tool 108 allocating resources and selecting implementations 120 (FIG. 2) to perform the sorting elastic function 102 (FIG. 1), which uses internal calls to the same elastic function 102. The figure also illustrates the data flow 230 between the internal implementations 120. Implementations 120 contained within other implementations 120 illustrate a dependent implementation 120 invoking internal implementations 120.

In the non-limiting example of FIG. 13B, the application invokes a sort with an input of 10,000 elements. The function execution tool 108 determines (based on the FPG 200 (FIG. 10) to implement the sort using a dependent sorting implementation 120 executing on three threads and an FPGA. The dependent implementation 120 refers to its WPG 210 (FIG. 12) for the current situation, which specifies that the implementation 120 should have one of its sub-sorts sort 4,000 elements, using the quick-sort implementation 120 executing on a single thread, and have the second sub-sort sort 6,000 elements, using another dependent implementation 120 executing on two threads and the FPGA.

The second dependent implementation 120 operates similarly and determines to parallelize its work with the insertion-sort implementation 120, executing on one thread, executing in parallel with a bitonic-sort implementation 120, executing on one thread and the FPGA. Once the insertion-sort and bitonic-sort complete, the second dependent implementation 120 combines the results. Once the quick-sort implementation 120 and the second dependent implementation 120 complete, the first dependent implementation combines the results, which is returned to the application and completes the elastic function 102.

To assess elastic computing, the previously described elastic computing tool flow was implemented. Fourteen elastic functions 102 were manually designed, which are described in more detail in the following discussion. For each elastic function 102, the implementation knowledge-base was populated with at least two implementations 120. All software implementations 120 were written in C++ and compiled using g++. All GPU implementations 120 were written in CUDA (compute-capability of 1.3) and compiled using nvcc. All FPGA implementations were written in VHDL and compiled using ALTERA QUARTUS II version 9.1 or XILINX ISE 9.1, depending on the targeted system. All code was compiled using highest-level optimizations.

Elastic computing was evaluated on four systems, three of which are hybrid systems. The first hybrid system, referred to as Elastic, consists of a 2.8 GHz quad-core INTEL XEON W3520 with hyper-threading (8 threads executing simultaneously), 12 GB of RAM, an ALTERA STRATIX-III L340 FPGA located on a GIDEL PROCE III board with PCIe x4, and two NVIDIA GTX-295 graphics cards (each GTX-295 has 2 GPUs totaling 4 GPUs). The second hybrid system is the NOVO-G supercomputer, which is a cluster of 24 nodes, each of which consists of a quad-core INTEL XEON E5520 with hyper-threading (8 threads executing simultaneously), 6 GB of RAM, and four ALTERA Stratix-III E260 FPGAs located on a GIDEL PROCSTAR III board with PCIe x8. For the NOVO-G cluster, performance results were collected executing on a single node and collectively across several nodes using MPI. The third hybrid system, referred to as Delta, consists of a 3.2 GHz INTEL XEON single-core with hyper-threading (2 threads executing simultaneously), 2 GB of RAM, and a XILINX VIRTEX IV LX100 FPGA located on a NALLATECH H101-PCIXM board with PCI-X. The fourth system, referred to as Alpha, consists of a 2.4 GHz quad-core INTEL XEON 3220 (4 threads executing simultaneously) and 2 GB of RAM.

A case study is now described. Time-domain convolution, referred to simply as convolution, performs discrete convolution on two input vectors without converting the vectors to the frequency-domain. Convolution is widely used by the scientific and engineering community, with numerous applications in digital signal processing, differential equations, electrical engineering, among others. An elastic function 102 for convolution is described and then evaluated on the Elastic machine and on NOVO-G. Note that although time-domain convolution is evaluated, elastic computing may be able to choose between time-domain and frequency-domains implementations 120 based on input size at run-time.

To evaluate convolution, an elastic function 102 consisting of seven independent implementations 120 was created. All implementations 120 were based on an $\Theta(n*m)$ algorithm, where n and m are the lengths of the two arrays to convolve. The first implementation 120 is a single-threaded version of convolution. The second implementation 120 is a multi-threaded version of convolution that evenly divides its work across the number of threads on which it is executing. The third implementation is a GPU implementation 120 of convolution designed in CUDA and optimized to parallelize its work across the entire GPU, which consists of 512 threads per block and 30 blocks per GPU. As the Elastic system has four GPUs, elastic computing can execute up to four instances of the GPU implementation 120 simultaneously. The fourth through seventh implementations are FPGA implementations 120 designed to use between one and four FPGAs, respectively, which enables usage of all NOVO-G FPGAs. Four separate implementations use NOVO-G's FPGAs as the FPGAs driver interface may require all four FPGAs to be configured simultaneously, preventing multiple implementations 120 from using the FPGA independently. The FPGA implementations configure the FPGAs with a custom-circuit designed in VHDL that is capable of executing 256 floating-point multiplies and 256 floating-point additions every cycle, which can be synthesized to the targeted GIDEL FPGA boards.

The elastic function 102 in this non-limiting example also comprises one dependent implementation 120 used to parallelize work across resources. The dependent implementation 120 provides a work summing function that sums the two work metrics to create the result and relies on work parallelization planning to pre-determine the partitioning of work and resources. When the function execution tool 108 executes the dependent implementation 120, the implementation 120 first determines where to partition its input, based on the current list of resources and input parameters, and then executes two nested convolution elastic function calls. After both nested calls complete, the implementation 120 combines the outputs, accumulating where necessary, and returns the result. For example, the dependent implementation 120 may convolve a vector of length 1000 with a second vector of length 100 by partitioning the first vector into two sub-vectors of length 500, and then convolving the sub-vectors with the unmodified second vector as two nested convolutions. When both internal convolutions complete, the dependent implementation 120 would combine the results by concatenating the first 500 elements of the first result with the last 500 elements of the second result, and then accumulating between the two to create the middle 99 elements.

In addition to the implementations 120, the elastic function 102 also employed adapters 126 to map the input parameter space of convolution to the work metric. The mapping was not trivial as convolution has two input parameters whose values significantly affect the execution time. The methodology used was to base the mapping off of the asymptotic analysis of the convolution algorithm. The normal convolution algorithm exhibits an asymptotic performance of $\Theta(|a|*|b|)$, where $|a|$ and $|b|$ are the lengths of the two input vectors. That is, the execution time of the algorithm is proportional to the product of the lengths of the two input vectors. As a result, the mapping chosen mapped the work metric to the product of the lengths of the two input vectors. The reverse mapping was more of a challenge as the single work metric value needed to produce two input vectors.

One solution is to fix the first vector to a length of 1,024 and set the length of the second vector to the work metric value divided by 1,024. Notice that the product of the two input lengths still equals the work metric (within 1,024), keeping the forward and reverse mappings consistent. The value of 1,024 was chosen as it is large enough to not make the resulting input parameters a corner case (e.g., fixing the input parameter to a length of 1 would have atypically large overhead due to excessive control overhead) and small enough to retain significant precision (e.g., fixing the input parameter to a length of 1,000,000 would equate to a work metric within 1,000,000). Once the lengths are calculated, the adapter 126 allocates the two input vectors with the correct lengths and populates them with random input data. To improve the prediction accuracy of the adapter, different usage assumptions 124 may be provided for cases that would benefit from having different fixed vector lengths. Multi-dimensional adapters may simplify mappings in many similar cases.

The elastic function 102 in this non-limiting example did not employ multiple usage assumptions 124 as none of the implementations 120 exhibited data-dependent performances. For example, it would not affect the execution time of any of the implementations 120 if the input parameters were populated with identical, as opposed to randomly-distributed, data.

The convolution elastic function 102 was installed into the tool framework on both the Elastic system and a single node of the NOVO-G cluster. The installation process automatically performed the implementation assessment and optimization planning steps, which took 34 minutes on the Elastic system and 22 minutes on a node of the NOVO-G cluster. The extra time taken on the Elastic system was due to the larger number of resource combinations. Note that although the installation time may seem large, it may only occur once per system.

TABLE I

| Work Metric Range | # of Threads | # of FPGA's | # of GPU's |
| --- | --- | --- | --- |
| 0-2,048 | 1 | 0 | 0 |
| 2,048-303,104 | 8 | 0 | 0 |
| 303,104-311,296 | 7 | 0 | 0 |
| 311,296-9,137,152 | 8 | 0 | 0 |
| 9,137,152-35,636,224 | 2 | 1 | 2 |
| 35,636,224-119,868,416 | 5 | 1 | 3 |
| 119,868,416-1,112,883,200 | 4 | 0 | 4 |
| 1,112,883,200-1,619,883,200 | 5 | 0 | 4 |
| 1,619,609,600-2,859,417,600 | 4 | 1 | 4 |
| 2,859,417,600-5,522,677,760 | 5 | 0 | 4 |
| 5,522,677,760-10,240,000,000 | 4 | 0 | 4 |

On the Elastic system, the optimization planning determined transitions between resource selections, as listed in Table I. The table lists which resources the function execution tool 108 will select for different work metric ranges. For example, if an application invoked convolution with input vector lengths of 500 and 10,000, the adapter 126 would calculate that the corresponding work metric is 5,000,000, and the function execution tool 108 would use 8 threads for performing the elastic function 102. As demonstrated in the table, at lower work metric ranges, which correspond to less computation, elastic computing does not select the GPUs or FPGA. As the work metric gets larger, elastic computing selects more and more resources until it ends up using all of the GPU's once the work metric gets larger than 120 million. The selection of execution resources is a balancing act between the improved computational performance and the extra overhead of using the additional resource (e.g., configuring the resource, transferring data to/from the resource, and controlling the resource). As a result, it is beneficial to use more resources only when the problem is large enough to justify the additional overhead.

Note that there are some anomalies in Table I. For example, the number of thread decreases from 5 to 4 in the last two rows, and the FPGA is not used at the maximum work metric. Such anomalies have several causes. First, multiple competing resource combinations often have very similar performances that are within the prediction error of implementation assessment. In addition, different devices often exhibit fluctuations in performance for different input sizes. For example, FPGA boards often provide bandwidth that does not monotonically increase with input size.

Figure 14:
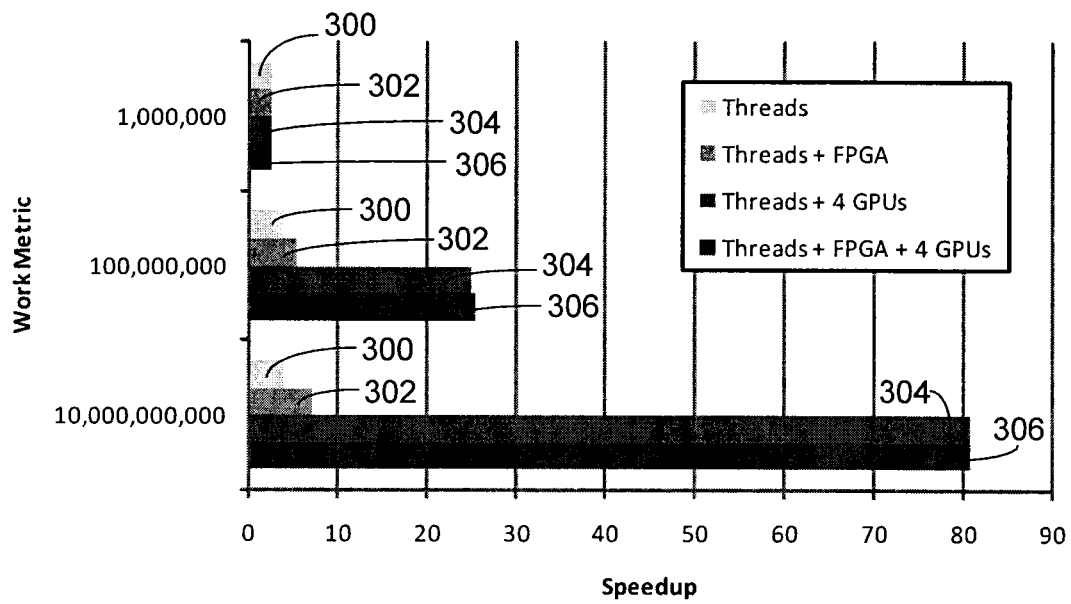
FIG. 14 is a bar graph illustrating one example of the speedups related to using additional resources for fixed work metrics according to one embodiment.

FIG. 14 illustrates the speedups of using additional resources for fixed work metrics, which were automatically obtained by varying the number of resources available for elastic computing. FIG. 14 lists all speedups as compared to a single-threaded baseline on the Elastic system. Bars 300 correspond to threads. Bars 302 correspond to threads plus an FPGA. Bars 304 correspond to threads plus four GPUs. Bars 306 correspond to threads plus an FPGA plus four GPUs. Note that the additional resources provide more of a performance benefit as the work metric gets larger and that the performance benefit of the GPU dominates over the FPGA, which is expected due to four GPUs being available on Elastic and the GPUs higher bandwidth connection with main memory.

Figure 15:
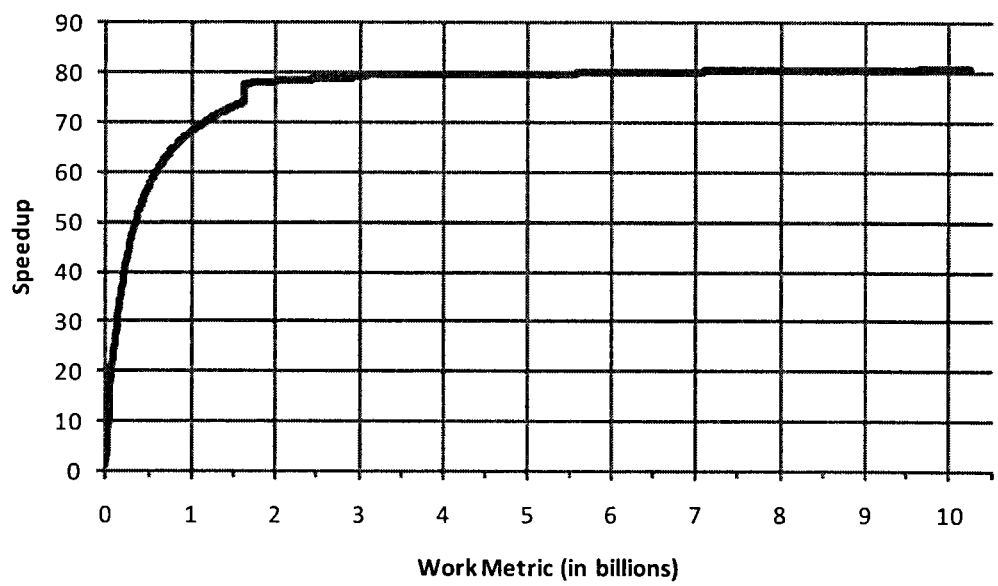
FIG. 15 is a graph illustrating one example of the speedup versus work metrics when using all of the resources of one system according to one embodiment.

FIG. 15 illustrates the speedup versus work metric when using all of the resources on the Elastic system. The speedup is measured relative to a single-threaded baseline executing on the Elastic system. Note that initially there is no speedup, but quickly increases as the work metric reaches 2,000,000,000 and then levels out approaching a speedup of 81×. The leveling out occurs as all of the computational resources reach full utilization.

Figure 16:
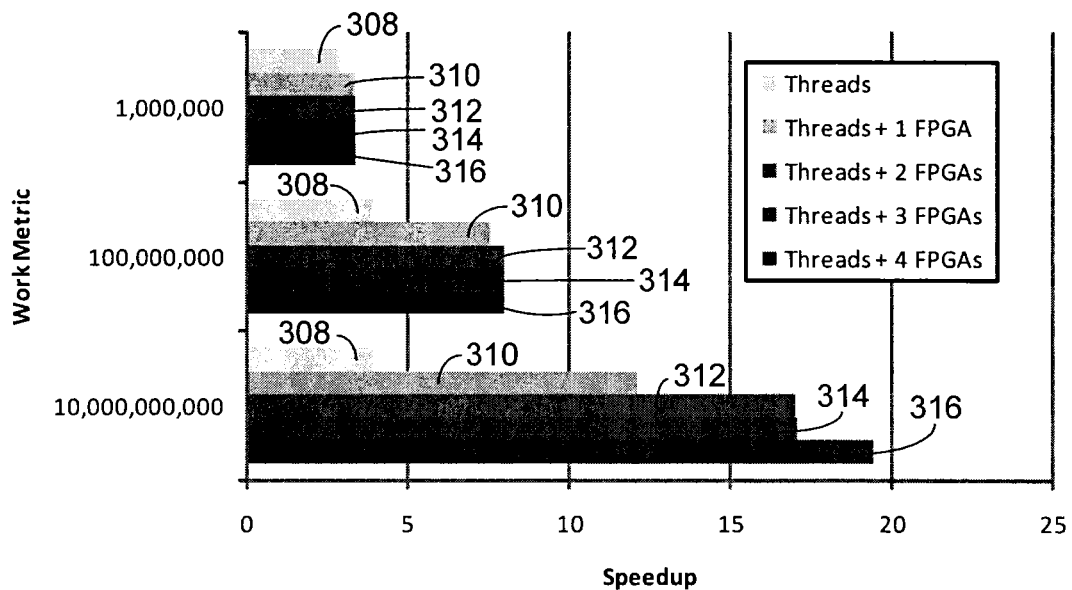
FIG. 16 is a bar graph illustrating one example of the speedups of using additional resources for fixed work metrics according to one embodiment.
Figure 17:
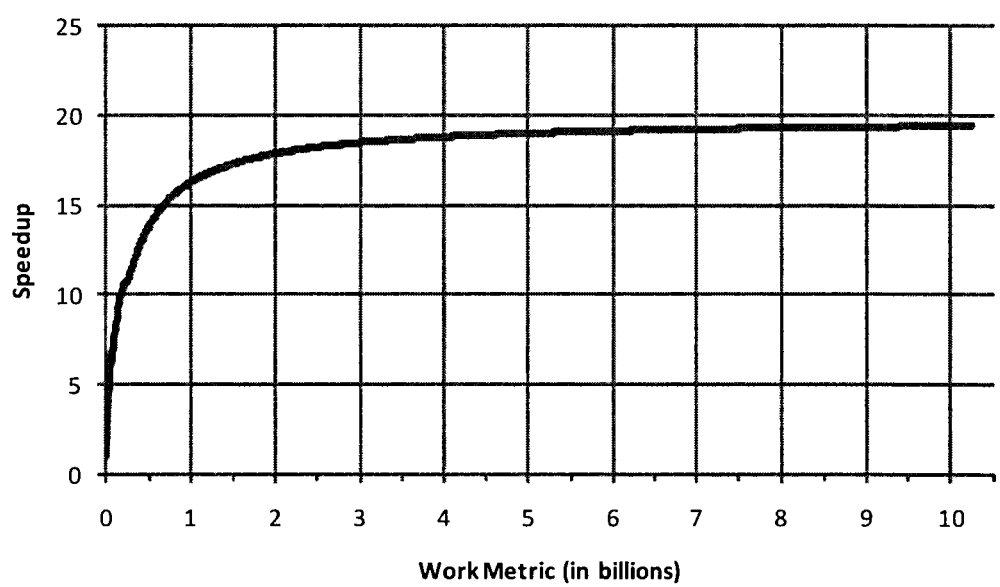
FIG. 17 is a graph illustrating one example of the speedup versus work metrics when using all of the resources of one node of another system according to one embodiment.

Similar results were collected on a single node of NOVO-G. Note that the NOVO-G cluster does not have GPUs, but instead has four FPGAs. FIG. 16 illustrates the speedups of using additional resources for fixed work metrics. Bars 308 correspond to threads. Bars 310 correspond to threads plus one FPGA. Bars 312 correspond to threads plus two FPGAs. Bars 314 correspond to threads plus three FPGAs. Bars 316 correspond to threads plus four FPGAs. Note that using more FPGAs initially provides a large speedup but with diminishing returns as the shared PCIe x8 bus becomes saturated. FIG. 17 illustrates the speedup versus work metric when using all of the resources on a NOVO-G node. All of the results were calculated identically as on the Elastic system, but with speedup comparisons made to a single-threaded baseline executing on a NOVO-G node.

To evaluate elastic computing in a cluster environment, results were also collected of elastic computing executing on multiple nodes of the NOVO-G cluster. An MPI application was developed to evenly distribute several convolutions among several instances of elastic computing running on the nodes of the cluster. For the application, the root instance (indexed 0) created the convolution problems, evenly distributed the convolutions across the remaining nodes in the cluster, and then collected results from the nodes once they were complete. On each non-root node, the application waited to receive its subset of the convolution problems from the root node, invoked elastic computing to perform the convolutions, and then returned the results to the root node. As each compute node in NOVO-G may be identical, the installation steps of the elastic function occurred once on a single node and were then replicated to the remaining nodes. The results from a single node are previously described.

Figure 18:
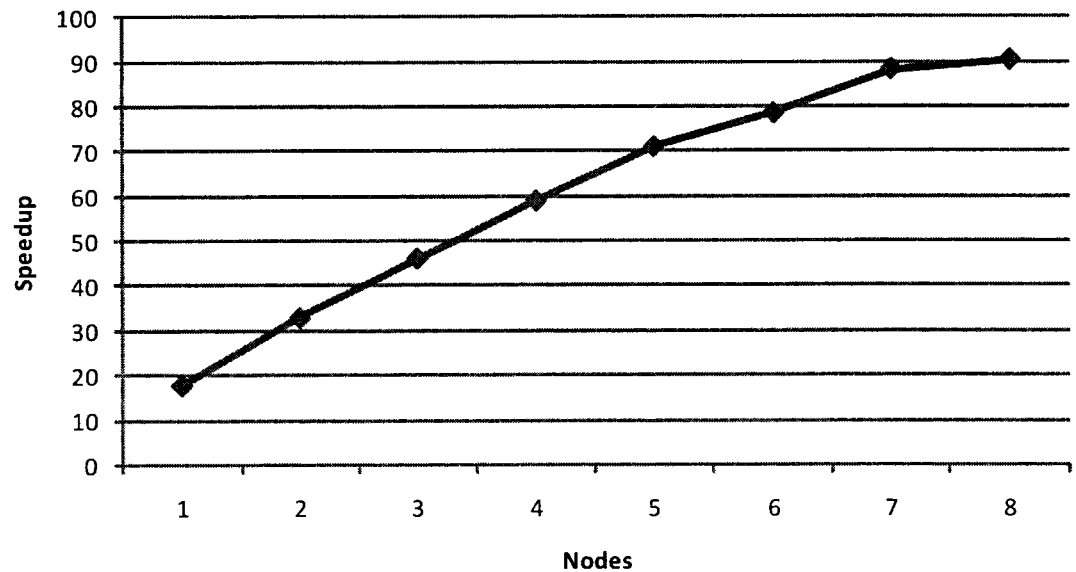
FIG. 18 is a graph illustrating one example of the speedup of using one through eight nodes of the system referenced in FIG. 17.

FIG. 18 illustrates the speedup of using one through eight nodes, in addition to the root node which distributes the convolutions and collects the results, on the NOVO-G cluster. The speedup is measured relative to a single-threaded implementation executing on a NOVO-G node. Note that as the application uses more nodes the speedup initially increases linearly but levels out due to the communication bottleneck of the root node.

Turning now to another case study, numerous image processing applications attempt to find the most likely location of an image of interest, which we will refer to as a feature, within another image or set of images. For example, optical flow on an unmanned-aerial vehicle (UAV) may rapidly search for features in each frame of a video to avoid obstacles. Content-based image retrieval techniques are used to find a feature within a large database of images for purposes of medical diagnosis, crime prevention, etc. Elastic computing is abstractly evaluated on these types of applications using an algorithm that identifies the most likely location of a feature in an image by computing the sum of absolute differences for every possible position of a feature on an image. Although numerous other techniques may be used within specific domains, the sum of absolute differences is employed as it has been widely applied to many applications.

Six implementations 120 (FIG. 2) of the elastic function 102 (FIG. 1). For simplicity, 16-bit grayscale images are assumed that may range in size up to 1024×768 and fixed feature sizes of 40×40 pixels. The first implementation 120 is single-threaded and "slides" the feature across every possible location of the image and calculates the sum of absolute differences. The second implementation 120 is a multi-threaded version and evenly distributes features across the available threads, each thread executing identically to the first implementation 120. The third through six implementations 120 are similar FPGA implementations 120 designed to use between one and four FPGAs, respectively, which enables usage of all NOVO-G FPGAs. The FPGA implementations 120 configure the FPGA with a custom circuit designed in VHDL, which uses a specialized buffer to efficiently transfer feature-sized windows of an image into the FPGA every cycle. Such efficiency enables the circuit to compute the sum of absolute differences for an entire feature position on an image every cycle, which may employ thousands of parallel additions and subtractions. For this study, NOVO-G is considered.

The elastic function 102 also comprises one dependent implementation 120 used to parallelize work across resources. As the elastic function 102 interface 122 (FIG. 2) allows the specification of multiple features, the dependent implementation 120 partitions work by splitting up the features across the resources. The dependent implementation 120 provides a work summing function that sums the two work metrics to create the result and uses work parallelization planning to pre-determine the partitioning of work and resources.

As the dimensions of the image can significantly affect the execution time of the elastic function 102, the interface 122 provides different usage assumptions 124 (FIG. 2) for different common image sizes. Usage assumptions 124 specify image sizes of 320×240, 640×480, and 1024×768. The adapter 126 (FIG. 2) uses the image sizes to determine the size of the image used to collect samples during implementation assessment.

The adapter 126 for the elastic function 102 maps the work metric to the number of features. The reverse mapping creates a randomly populated image, with dimensions specified by the usage assumption 124, and multiple random features, with the size currently fixed to 40×40 and the number of features specified by the work metric.

Figure 19:
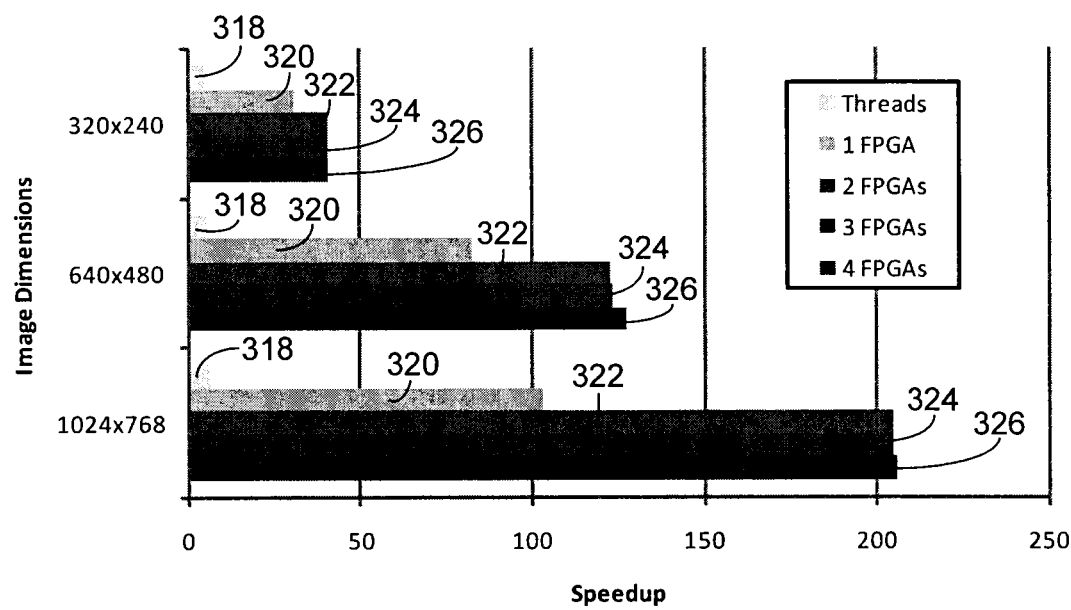
FIG. 19 is a bar graph illustrating one example of the speedup of using additional resources for different usage assumptions on a node of the system referenced in FIG. 17.

FIG. 19 illustrates the speedup of using additional resources for different usage assumptions 124 on a NOVO-G node. The speedup is measured relative to a single-threaded implementation 120, with the same usage assumption 124, executing on a NOVO-G node. Bars 318 correspond to threads. Bars 320 correspond to one FPGA. Bars 322 correspond to two FPGAs. Bars 324 correspond to three FPGAs. Bars 326 correspond to four FPGAs. Note that as more FPGAs are available, the speedup improves but with diminishing returns, which is expected due to the communication bottleneck of all four FPGAs being on the same PCIe x8 bus. The ratio of communication to computation is reduced by increasing the size of the image, which partially alleviates the communication bottleneck and is illustrated by the speedup increasing for larger image sizes.

In addition to the two case studies, data describing the speedup of elastic computing working with a variety of other elastic functions 102 on the Delta and Alpha systems have been collected. The functions were selected from a variety of problem domains to demonstrate the applicability of elastic computing in these non-limiting examples.

Figure 20:
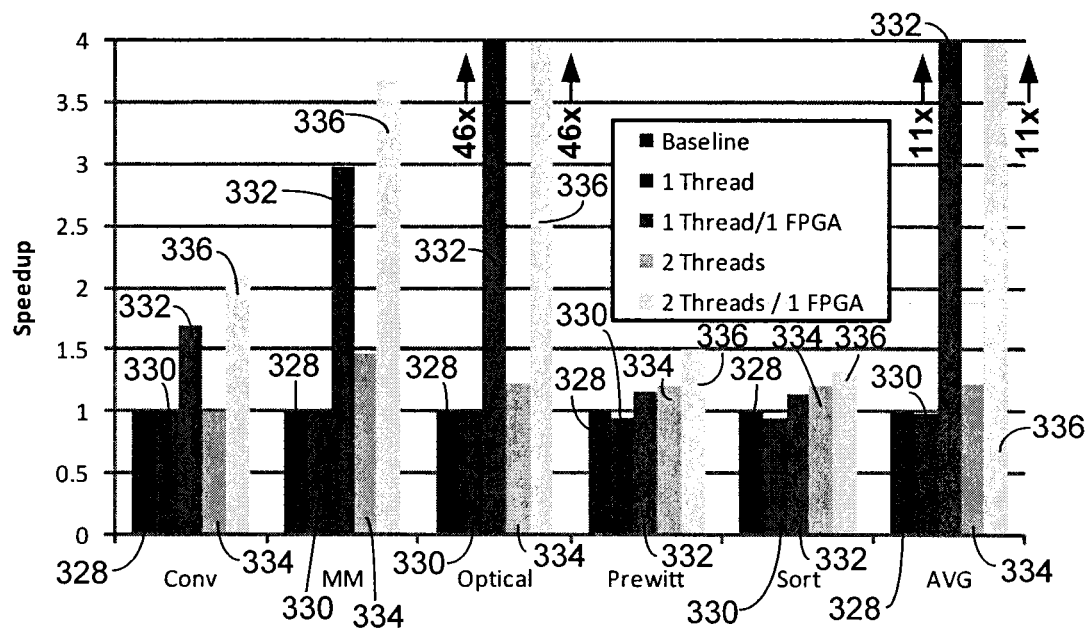
FIG. 20 is bar graph illustrating one example of the speedup of several elastic functions executing on a varying number of resources on another system according to one embodiment.

FIG. 20 illustrates the speedup of several elastic functions 102 (FIG. 1) executing on a varying number of resources on the Delta system. Each elastic function 102 consisted of a multi-threaded implementation 120 (FIG. 2) and an FPGA implementation 120. Cony (convolution) convolves a 1,000,000 length vector with a 256 length vector. MM (matrix multiply) multiplies two 1024×1024 matrices. Optical (optical flow) creates a two-dimensional match statistic map for a 17×17 template in a 640×480 image. Prewitt performs Prewitt edge detection on a 640×480 image. Sort sorts 4,194,204 elements. All speedup numbers are relative to a single-threaded version of the function executing on the Delta system. Bars 328 correspond to the baseline. Bars 330 correspond to one thread. Bars 332 correspond to one thread and one FPGA. Bars 334 correspond to two threads. Bars 336 correspond to two threads and one FPGA.

As expected, the speedup mostly increases as more resources are available. A slight performance decline is present in some of the functions for the 1 CPU/1 FPGA case, which is due to the slightly larger overhead of using multiple resources. The large 46× speedup of the Optical elastic function is due to the FPGA exploiting the large amount of parallelism inherent in the algorithm, which is similar to the sum of absolute differences image retrieval case study. The lesser speedup of the convolution example on Delta is due to a different FPGA implementation 120 that is necessary due to a much smaller FPGA than on NOVO-G or Elastic. The average speedup of all functions using all resources was 10.9×, which is largely due to the Optical example. The other examples had speedup ranging from 1.3× to 3.7×.

Figure 21:
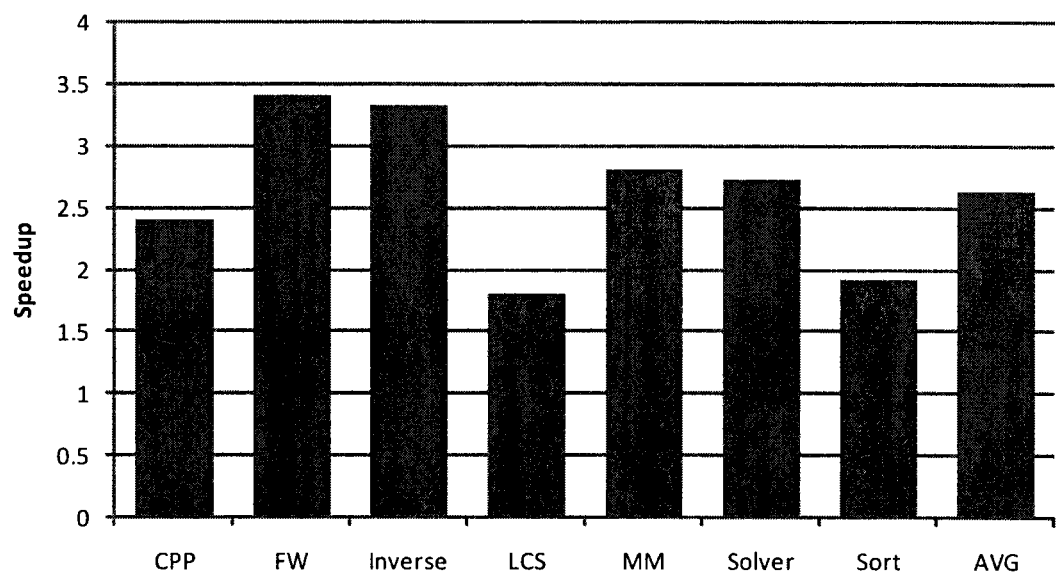
FIG. 21 is a bar graph illustrating one example of the speedup of several elastic functions executing on all of the resources of another system according to one embodiment.

FIG. 21 illustrates the speedup of several elastic functions 102 (FIG. 1) executing on all of the resources of the Alpha system. Each elastic function consisted of only a single multi-threaded implementation 120 (FIG. 2). CPP (closest-point pair) finds the closest pair of points in a two-dimensional space with 1,000,000 points. FW (Floyd-Warshall) finds the shortest path between 1,000 vertices in a weighted directed graph. Inverse inverts a 1000×1000 matrix. LCS (longest common subsequence) finds the longest subsequence in common between two 2,500 character strings. MM (matrix multiply) multiplies two 1000×1000 matrices. Solver solves a system of 1,000 linear equations. Sort sorts 4,194,304 elements. All speedup numbers are relative to a single-threaded version of the function executing on the Alpha system. In all cases, elastic computing achieved speedup ranging from 1.8× for LCS to 3.4× for FW, achieving an average speedup of 2.6×.

The stage of implementation planning will now be further discussed in detail respecting additional embodiments. To effectively optimize applications for multi-core heterogeneous systems, compilation tools may rapidly select the best implementation for a given function call. Due to potentially large numbers of function calls, implementations, and input possibilities, it may be impractical for a compiler to evaluate all implementation possibilities at compile-time. Therefore, compilation tools may plan ahead what implementations to use for different resource combinations and input parameters, which we define as the implementation planning problem. Compilers can then use planning results to quickly select an efficient implementation for each function call at compile-time, which is critical for meeting constraints in real-time multimedia systems.

One challenge in implementation planning is dealing with scalability issues that result from numerous combinations of implementations, resources, and input parameters. A heuristic will be discussed that repeatedly selects statistically significant invocation parameters, measures actual execution time, and then statistically analyzes results to predict execution time for all combinations of input parameters. The goal of the heuristic is to minimize implementation planning execution time by executing as few input combinations as possible, while attempting to meet specified accuracy and confidence levels. For twelve case studies, the presented heuristic achieved an average error of 6.2% and a root-mean-squared error of 7.4% on three significantly different systems that included 16 microprocessor cores and an FPGA, while executing an average of only 463 input combinations out of a parameter space with millions of combinations. Total planning time averaged 51 seconds.

Due to the large exploration space of implementation planning, an exhaustive solution may not be feasible. To solve implementation planning in a reasonable amount of time, performance prediction may be used to estimate a large percentage of the exploration space. Implementation planning largely automates this process by executing and measuring actual execution time on different devices using different inputs, allowing the effective prediction of performance for any possible implementation written in any language, for any resource combination provided by the target system, and for all invocation parameters. For brevity, the following sections discuss a single implementation and resource combination. Extending the heuristic for all implementations and resource combinations can be appreciated with a loop around the presented heuristic.

For simplicity, the heuristic is initially described for implementations whose execution time depends on a single-dimensional parameter space, such as a function whose execution time depends on the input size. Although input size is used for the descriptions initially, the heuristic is capable of handling multi-dimensional parameter spaces.

One possibility for an implementation planning heuristic would involve selecting random input parameters, measuring the actual execution time (referred to as sampling), and then interpolating the results for all inputs. Although straightforward, such an approach is not adaptive and may collect too few samples in regions of high variance and too many samples in regions where interpolation would suffice. This approach additionally raises questions such as how many samples to collect. Another approach would be to select input parameters at fixed intervals (e.g., every 100th input size) with interpolation used in between. While this approach answers the question of how many samples to collect, it raises other questions such as what spacing to use between samples and still does not adapt to the variance in the profile. Because a performance prediction heuristic invokes the implementation and measure its execution time for each sample collected, it may be important for a heuristic to minimize the total number of samples while not sacrificing accuracy.

Figures 22, 23:
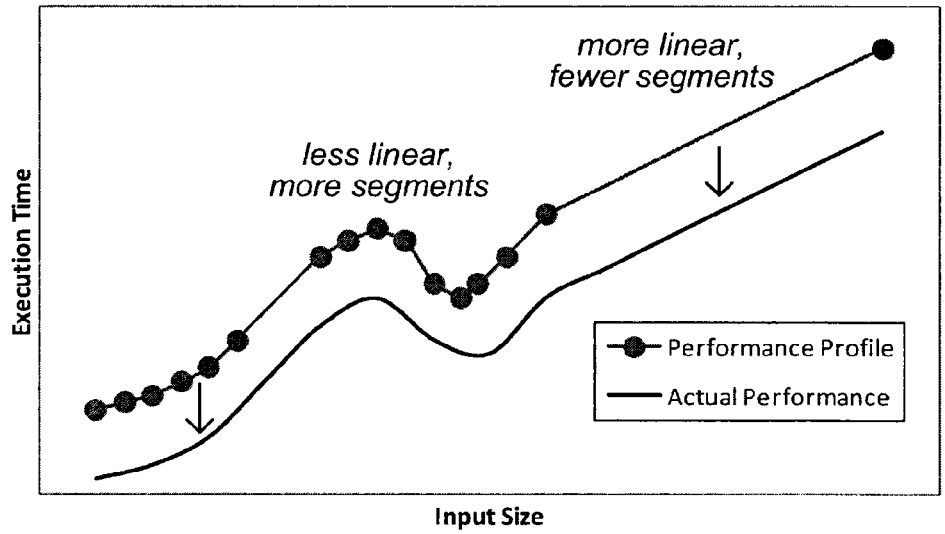
FIG. 22 illustrates one example of a performance profile compared to actual performance according to one embodiment.
FIG. 23 depicts one example of code for an adapter for an insertion sort implementation according to one embodiment.

To address these problems, an adaptive heuristic, referred to as the planner, is presented. Given an implementation and a set of prediction parameters that specify the input sizes, accuracy, and confidence levels, the planner generates a two-dimensional piecewise linear function (e.g., FIG. 22), referred to as a performance profile, with input size on the x-axis and estimated execution time on the y-axis. The performance profile may be stored as the ordered set of points describing each piecewise linear segment, allowing for compilation tools to estimate execution time for any input size by interpolating the nearest points. The adaptive capabilities of the planner are demonstrated in FIG. 22, where the profile uses more linear segments for input ranges with rapid changes in execution time. FIG. 22 depicts a comparison of actual implementation performance and the performance profile output of the planner (shifted up for visualization), which determines maximum-sized regions that can be linearly approximated.

The planner comprises of two iterative steps—segment generation and profile generation—that focus on predicting performance for a small region of input sizes, referred to as the interval of interest (IOI), which gradually shifts across the entire input parameter space starting from the smallest sizes in order to create the resulting performance profile.

Segment generation identifies groups of samples that can be approximated by a segment of a linear regression. When high accuracy is requested, such segments may represent only several, closely located samples. When accuracy requirements are lowered, segments may represent distant samples. Segment generation works by sampling an input size within the IOI, measuring the execution time of the implementation at that input size, and then statistically analyzing intervals of samples to find linear trends that meet specified accuracy requirements.

Profile generation selects the best subset of these segments to create the performance profile. Profile generation starts at a segment with a point at the lowest input size and proceeds to connect segments that progress the performance profile towards the largest input size, all the while attempting to minimize the number of segments and the total number of samples with large error. As a result, the performance profile "grows" from the smallest to the largest input size as more samples are added and sufficiently linear segments are found. After expanding the performance profile, profile generation adjusts the IOI and the planner repeats segment generation. The planner completes once profile generation finds a set of segments that span the entire specified input range.

Segment generation is responsible for sampling the relationship between input size and execution time, and then inferring the most-likely linear trends, represented as segments, from those samples. For each iteration of the planner, segment generation starts by randomly selecting an input size within the current IOI, and then measuring the execution time of the implementation at that input size to form a new sample data point. Although segment generation could potentially use any form of time measurement, time-stamp counters on the processor are used in one embodiment to ensure high-precision. Segment generation then generates new segments, and corrects previously generated segments, by considering the new sample collectively with all previous iterations.

Segment generation may infer the linear trends from the samples by performing a linear regression analysis. Linear regression analysis is a statistical tool that calculates the line that minimizes the mean-squared distance between the line and the samples. Segment generation then shortens the line to a segment by bounding its input size to have the same range as the samples used for the analysis. In addition to the segment, the regression analysis also allows determination of the confidence in the linear trend by calculating the corresponding confidence interval. A confidence interval is another statistical tool that specifies how accurately the segment can specify the execution time at any particular input size. For example, the confidence interval might specify that at an input size of 100, the generated segment is 95% confident that the average execution time is within 95-105 ms. The results of the linear regression analyses, and the samples themselves, are all stored within a data structure referred to as the sample matrix.

Segment generation performs a linear regression analysis on all possible intervals of sequential samples, and stores the corresponding results as cells within the sample matrix data structure. The sample matrix is an upper-right triangular matrix with the number of rows and columns equal to the number of collected samples that have unique input sizes (segment generation combines samples with identical input sizes). Each cell within the sample matrix stores the output of a single linear regression analysis (in addition to other information) performed on a subset of the samples collected. The coordinates of each cell specifies the interval of samples used for that analysis, with the row index equaling the index of the starting sample and the column index equaling the index of the ending sample. As sample generation indexes all of the samples in ascending input size order, an interval of samples corresponds to all of the samples collected within a range of input sizes.

For example, the linear regression analysis of the samples indexed between 10 and 20 would be found in the matrix in the cell located at row 10, column 20. If the input size of the sample at index 10 was 35 and the input size of the sample at index 20 was 110, the linear regression analysis would then similarly correspond to any linear trend inferred for the input size range of 35 through 110. As a linear regression analysis requires only the accumulation of data-point statistics for its calculations, sample generation significantly reduces the processing time required to populate the sample matrix by using a dynamic programming algorithm that calculates the linear regression of larger segments from the intermediate results saved from smaller sub-segments. As a result, sample generation can perform the linear regression analysis on one interval of samples by partitioning the interval into two sub-intervals and simply accumulating the intermediate results stored in the corresponding cells of the two sub-intervals. The cells located along the matrix's diagonal represent intervals of only a single sample (or multiple samples that all have the same input size). Segment generation populates the diagonal cells with the statistics of the collected samples directly, which in turn form the base cases for generating segments of larger intervals using the dynamic programming algorithm.

When populating each cell of the sample matrix, segment generation performs several checks to gauge the appropriateness of the segment approximation. The first check is to verify that the current interval contains at least three samples so that the linear regression result is non-trivial. The second check is to see if the segment approximation is sufficiently accurate by excluding segments with too wide of a confidence interval. The variance and spread of the samples determines the width of the confidence interval. Likewise, the wider the confidence interval, the less accurately the segment predicts the execution time. A prediction parameter, referred to as the segment error threshold, specifies the maximum percent width (e.g., the width of the confidence interval relative to its execution time) allowed by a segment's confidence interval. If any of these checks fail, segment generation flags the corresponding cell as not containing a valid segment. If the segment does pass all the checks, segment generation calculates one last metric, referred to as the sample out-of-range count, to use for the profile generation step. Sample generation calculates the sample out-of-range count by counting the number of samples within the interval that have a "large" percent error when compared to the value estimated by the segment. A prediction parameter, referred to as the sample error threshold, determines the threshold of what constitutes a "large" percent error. The sample out-of-range count provides a fair comparison between alternate segments in the sample matrix as it lessens the impact of any anomalous samples. Profile generation will then attempt to minimize this count when finding the best set of connected segments to use to form the resulting performance profile.

As illustrated in FIG. 6 (and described in pseudo-code in FIG. 7), each iteration of sample generation requires collecting a new sample, finding the sorted index of the new sample, inserting a new row and column into the sample matrix (assuming the sample has a unique input size), and then reprocessing the cells whose results may change as a result of the new sample. Any cells located at a column less than the newly inserted column or with a row greater than the newly inserted row correspond to intervals of samples located entirely before or after the newly inserted sample, and therefore do not need regeneration. The remaining cells are located in a rectangular region bordered by the newly inserted row and column inclusively. Segment generation populates the newly created diagonal cell with the statistics of the new sample and then processes the remaining cells in decreasing row and increasing column order. Processing the cells in this order allows for the reuse of intermediate calculations for the linear regression analysis, as discussed previously.

Profile generation determines the longest set of segments from the sample matrix that can be connected together to form the performance profile that minimizes the total sample out-of-range count. Profile generation may use a dynamic programming algorithm that "grows" the performance profile from the smallest input size towards the largest. The algorithm operates by traversing the sample matrix in increasing row and increasing column order. As the algorithm reaches each cell, it determines and saves in the cell the best candidate segment to precede the current segment, such that the resulting connected set of segments, referred to as a chain, has the lowest sample out-of-range count (or the least number of total segments in the event of a tie). A candidate segment is any segment which starts prior and ends during the interval of the current segment (e.g., the segments overlap and the endpoint is progressing forward).

After the algorithm completes, the best chain of segments is the one that ends at the largest input size, with the lowest sample out-of-range count, and with the fewest number of segments (evaluated in that order). The endpoint of the best chain of segments corresponds to how much of the performance profile the planner has sufficiently determined so far. The planner is complete when the best chain of segments extends all the way to the last valid input size. Upon completion, the planner returns the performance profile as the intersection points between the segments as well as the endpoints for the first and last valid input size values.

Profile generation is also responsible for locating the IOI to encourage the picking of samples that will promote the growth of the best chain of segments in the subsequent iteration. In the first few iterations when the sample matrix contains no segments, the planner locates the IOI at the lower bound of the input size to pick samples that will help establish the first segments. In later iterations, profile generation centers the IOI at the input size of the last endpoint of the best chain of segments. Centering the IOI at the last endpoint extends the interval beyond the end of the chain, promoting the generation of new segments that will further lengthen the chain. Additionally, the interval extends prior to the last endpoint to allow for the reinforcement or correction of segments recently generated. The width of the IOI is adaptive and set proportionally to the product of execution time and the inverse of the slope of the last endpoint. A prediction parameter, referred to as the interval growth factor, specifies the proportionality factor.

As illustrated in FIG. 8 and FIG. 9, each iteration of profile generation may involve the reconsideration of some of the cells in the matrix as segments in the best possible chain. Any cell with a column less than the index of the newly inserted sample (for the current iteration), would not have any of its predecessors affected by the sample insertion, and therefore would still be valid. However, any cells with a column greater-than or equal to the newly inserted sample could either itself have changed and/or might have a different selection of predecessors, possibly invalidating any previous predecessor decisions. Profile generation loops through the cells that require reconsideration in increasing row and increasing column order, so that all of the possible predecessors are already valid. To reduce the time complexity, the algorithm keeps track of the best predecessor segment as it traverses the cells (omitted from the figures for simplicity), as opposed to searching for the best predecessor candidate for each cell individually. The algorithm searches the sample matrix and returns the best chain (omitted for brevity). Implementation assessment is complete if the chain extends to the last valid work metric value, or alternatively uses the chain to determine the next iteration's IOI.

Abstraction is required to keep the planner independent of the implementation. For example, each implementation expects specific invocation syntax and semantics to execute. Software implementations may expect valid initializations of input parameters, some of which may require the further allocation and population of data arrays (e.g., invoking a sorting subroutine requires the population of an input array with data to sort). Similarly, heterogeneous implementations may expect device-specific code to initialize resources and initiate execution. Since the goal of the planner is to predict performance for implementations running on any resource in a multi-core heterogeneous system, these details may be kept out of the planner in various embodiments.

To achieve these goals, the planner uses an implementation-specialized abstraction layer between the planner and the implementation, which we refer to as the adapter. The main responsibility of the adapter is to adapt (e.g., map) the abstract interface of the planner to the specific interface required by the implementation. The planner defines an abstract quantity called the work metric that it passes into the adapter during sample execution. The adapter internally maps the work metric to input parameters for the implementation, executes the implementation with those parameters, and then returns the implementation's execution time to the planner. The adapter additionally performs any necessary initialization and tear-down required by the implementation, which is excluded from the returned execution time. The previous discussion of the planner assumed that the adapter used the input size as the work metric.

Note that although it may be possible in some situations to automatically create an appropriate adapter for a given implementation, we currently assume that the adapter is designer specified. One envisioned usage case is that designers of a specialized function library with multiple implementations of each function would also provide an appropriate adapter for each implementation. Adapters may be automatically generated in some embodiments.

Automatically adapting the work metric to an implementation's input parameters is used for the effective operation of the planner. As far as the planner is considered, the sampled collection of work metric and execution time pairs is the information the planner collects from an implementation. As the number of samples increases, the underlying trend of how the work metric affects execution time is used in the statistical analyses steps. As a result, making these trends identifiable should be a design goal of the adapter's designer.

In many cases the adapter can directly map work metrics to input parameters. FIG. 23 demonstrates a non-limiting example of an adapter for an insertion-sort implementation that maps the work metric to the size of the input array to sort. Internally, the adapter allocates and populates an array with random values before actually invoking the insertion-sort subroutine. The adapter measures the execution time of the insertion-sort subroutine, which is then returned to the planner. For this sorting example, the points on a work metric versus execution time graph will show an underlying trend of quadratic execution time growth with increasing work metric (as insertion-sort is an $O(n^2)$ algorithm where n is the number of items to sort).

Similar techniques work for implementations whose execution time is dependent on input values as opposed to size. For example, an adapter for a Fibonacci function implementation could map the work metric to the particular input value. In many cases, a particular implementation's execution time may depend on both input size and input values. For example, a sorting implementation may perform differently depending on whether the data is mostly sorted or randomly distributed. To deal with these situations, multiple adapters could potentially be used to create multiple performance profiles, which a user could select based on characteristics of their targeted application.

Creating an adapter for multiple-parameter implementations may involve a bit of ingenuity on behalf of the adapter designer, but can typically be done by taking advantage of knowledge of the underlying algorithm. As an example, consider discrete circular convolution that convolves two input arrays. Unlike the sorting example, whose input size mapped easily to the work metric, convolution has two input parameters whose sizes both significantly affect the execution time of the implementation. The adapter in this case can be written by taking advantage of the asymptotic performance analysis of the circular convolution algorithm. For example, if the designer knows that the asymptotic performance of the implementation is $\Theta(|x|*|h|)$, that is the execution time is proportional to the product of the sizes of the two operands, then a simplification can be made by noting that the proportionality factor in the asymptotic analysis should be approximately constant for all lengths of x and h. In other words, the execution time of convolving a 20-element array with a 30-element array is likely to be similar to convolving a 10-element array with a 60-element array, due to the product of both being 600.

As a result, the adapter can be written as shown in FIG. 24, which maps the work metric to the size of one of the input operands and fixes the size of the second to a constant value (16 in this example). The resulting performance profile can then be used to predict the performances of any invocation by simply finding the product of the sizes of the two operands and dividing that product by 16. Similar methods can be applied to create adapters for many other multiple-parameter implementations.

Note that as opposed to being "duct tape" that makes the planner support multiple dimensions, the adapter provides several important advantages. First, by mapping to a single dimension, the adapter enables the planner to complete quickly, as shown by the results. In addition, the adapter also reduces the size of the resulting performance profile, which potentially enables implementation selection at runtime. For example, a runtime optimization framework could implement a function call by first determining available resources and the current input parameter values, and then using the performance profiles to quickly identify the most efficient implementation for the current situation. Lastly, the simplicity of a single dimensional performance profile allows for efficient post-processing, such as overlaying multiple performance profiles and storing only the lowest envelope (e.g., fastest) implementation. In various embodiments, the adapter may natively support multiple dimensions by extending the planner to perform multi-dimensional regressions using multi-dimensional intervals of interest. However, even with support for multiple dimensions, there are likely many situations where mapping to a single dimension will greatly reduce planning time, while still meeting accuracy requirements.

TABLE II

[IMPLEMENTATION DETAILS]

| Implementation | Work Metric Range | Adapter Details |
|---|---|---|
| Single Threaded Implementations | | |
| Heap Sort | [1, 4000000] | Work metric is size of sort. Random data populates input array. |
| Insertion Sort | [1, 65000] | Work metric is size of sort. Random data populates input array. |
| Longest Common Subsequence | [1, 1000000] | Work metric is length of one string, other string is fixed to length 256. |
| Quick Sort | [1, 10000000] | Work metric is size of sort. Random data populates input array. |
| Multi-Threaded Implementations | | |
| 2D Convolution | [1, 10000] | Work metric is number of rows of image, number of columns is fixed to 128. Convolving window is fixed to 8 × 8 |
| Circular Convolution | [1, 2500000] | Work metric is length of one of the operands, other operand is fixed to length 256. |
| Floyd-Warshall | [1, 600] | Work metric is number of vertices. All edges have random weights. |
| Inner Product | [1, 10000000] | Work metric is length of both input operands. |
| Matrix Multiply | [1, 2500000] | Work metric is one dimension's length, other two dimensions are fixed to length 16. |
| Mean Filter | [1, 25000] | Work metric is number of rows of image, number of columns is fixed to 256. |
| Optical Flow | [1, 10000] | Work metric is number of rows of image, number of columns is fixed to 128. Template image is fixed to 8 × 8 |
| Prewitt | [1, 25000] | Work metric is number of rows of image, number of columns is fixed to 256. |
| FPGA Implementations | | |
| Circular Convolution | [1, 1000000] | Work metric is length of one of the operands, other operand is fixed to length 2048. |
| Inner Product | [1, 1048576] | Work metric is length of both input operands. |
| Matrix Multiply | [1, 4096] | Work metric is one dimension's length, other two dimensions are fixed to length 256. |

In addition to mapping the work metric to input parameters, the adapter also provides an inverse mapping to map from input parameters to a corresponding work metric. As the planner deals only with the work metric abstraction, the performance profile output is defined in terms of the work metric, essentially predicting the execution time for a given work metric. As a result, using the performance profile to predict the execution time of a particular invocation requires mapping that invocation's parameters to its corresponding work metric. In most cases, this mapping from the parameters to the work metric is simpler than the reverse. In the insertion-sort example, the inverse mapping would simply use the number of elements of that sort as the work metric (as the adapter used the work metric as the number of elements to sort). In the circular convolution example, the inverse mapping would be to calculate the work metric by multiplying the lengths of the two input operands and dividing by 16.

Table II describes the implementations that were created to evaluate the planner. These implementations were selected in order to represent common functions from different programming and application domains. Implementation describes the function/algorithm used by the implementation. Work Metric Range defines the range of work metrics for which the planner predicted performance. Note that in order to allow the planner to complete in a reasonable amount of time, all work metric ranges were selected such that the worst-case sample execution (usually the largest work metric) took less-than a few seconds to complete. Although these limits exclude portions of the input parameter space, the evaluated ranges are representative of common usage. Adapter Details explains the methodology the adapter uses to map work metrics to input parameters.

The table groups the implementations into three different types. The Single-threaded Implementations group lists the implementations using sequential algorithms. The Multi-threaded Implementations group lists the implementations that can partition work across one or more threads. Lastly, the FPGA Implementations group lists the implementations that perform their processing on an FPGA with basic support from a microprocessor to transfer data. The single-threaded and FPGA implementations can execute on one specific set of resources and therefore use a single performance profile for a system. The multi-threaded implementations, however, have different execution times based on the number of available CPUs and therefore use a different performance profile for different CPU counts.

The planner was evaluated using twelve examples. Insertion Sort, Heap Sort, and Quick Sort are in-place sorting algorithms with different asymptotic complexities. Longest Common Subsequence (LCS) finds the longest, not necessarily contiguous, series of common characters between two strings using a dynamic programming-based $\Theta(|a|*|b|)$ algorithm, where $|a|$ and $|b|$ are the lengths of the two input strings. 2D Convolution, Mean Filter, Optical Flow, and Prewitt apply a sliding window to an image using an $\Theta(x*y)$ algorithm, where x and y are the dimensions of the image. Circular Convolution convolves two vectors using an $\Theta(|x|*|h|)$ algorithm, where $|x|$ and $|h|$ are the sizes of the two input operands. Floyd-Warshall is a dynamic programming-based graph algorithm that finds the shortest path between all pairs of vertices in a directed weighted graph. Inner Product calculates the inner-product on two identically sized vectors using an $\Theta(n)$ algorithm, when n is the length of each vector. Matrix Multiply multiplies two, not necessarily square, matrices using an $\Theta(m*n*p)$ algorithm, where one operand is of dimension m×n and the second operand is of dimensions n×p.

The planner is evaluated on three platforms. Platform #1 has a hyper-threading 3.2 GHz INTEL XEON processor with an attached NALLATECH H101-PCIXM FPGA accelerator board, which has a XILINX VIRTEX IV LX100 FPGA. Hyper-threading makes platform #1 appear as though it has two cores, but the cores must partially contend for the same processing resources, which increases the difficulty of implementation planning. Platform #2 has eight 2.4 GHz dual-core AMD OPTERON processors (16 cores total). Platform #3 has two 2.6 GHz quad-core INTEL XEON processors (8 cores total). These platforms were selected due to their numerous processing resources and differing system architectures. The planner and software implementations were written in C++ and compiled on each platform individually using g++ with highest-level optimizations. The FPGA implementations were written in VHDL and compiled them using XILINX ISE 10.1i.

The planner's prediction error is evaluated by comparing the predicted and actual execution times of 100 executions using random input parameters. For all of the examples, the planner uses prediction parameters specifying that the segment error threshold, sample error threshold, and the interval growth factor are all set to 10%. Additionally, all confidence calculations use a confidence level of 95%.

TABLE III

[SUMMARY OF PLANNER RESULTS]

| Implementation | Planner Time | Samples | Profile Points | Mean Error | RMSE |
| --- | --- | --- | --- | --- | --- |
| 2D Convolution | 36.2 sec | 295 | 11.6 | 5.9% | 8.5% |
| Circular Convolution | 42.4 sec | 534 | 4.4 | 11.0% | 11.5% |
| Floyd-Warshall | 31.9 sec | 382 | 16.4 | 5.7% | 8.2% |
| Heap Sort | 76.8 sec | 633 | 14.7 | 1.8% | 2.2% |
| Inner Product | 20.6 sec | 392 | 7.6 | 1.6% | 2.2% |
| Insertion Sort | 81.4 sec | 582 | 23.0 | 2.5% | 2.8% |
| LCS | 97.4 sec | 578 | 13.7 | 2.1% | 3.7% |
| Matrix Multiply | 64.2 sec | 502 | 9.5 | 38.3% | 41.1% |
| Mean Filter | 24.8 sec | 350 | 6.6 | 2.0% | 3.9% |
| Optical Flow | 42.8 sec | 304 | 8.9 | 0.6% | 1.0% |
| Prewitt | 33.9 sec | 353 | 10.4 | 1.4% | 2.3% |
| Quick Sort | 60.8 sec | 654 | 12.7 | 1.3% | 1.6% |
| Average | 51.1 sec | 463 | 11.6 | 6.2% | 7.4% |

Table III summarizes the results of the profiling process for each implementation. The results are averaged across all platforms and differing resource amounts, for each implementation. Implementation is the name of the implementation. Planner Time is the average time required for the planner to create the performance profile, which includes the time executing each sample. Samples is the average number of samples the planner collected to create the performance profile. Profile Points is the average number of points in the resulting performance profile. Mean Error is the average percentage of prediction error of the performance profile. RMSE is the average percentage of root-mean-squared error of the performance profile.

Figure 25:
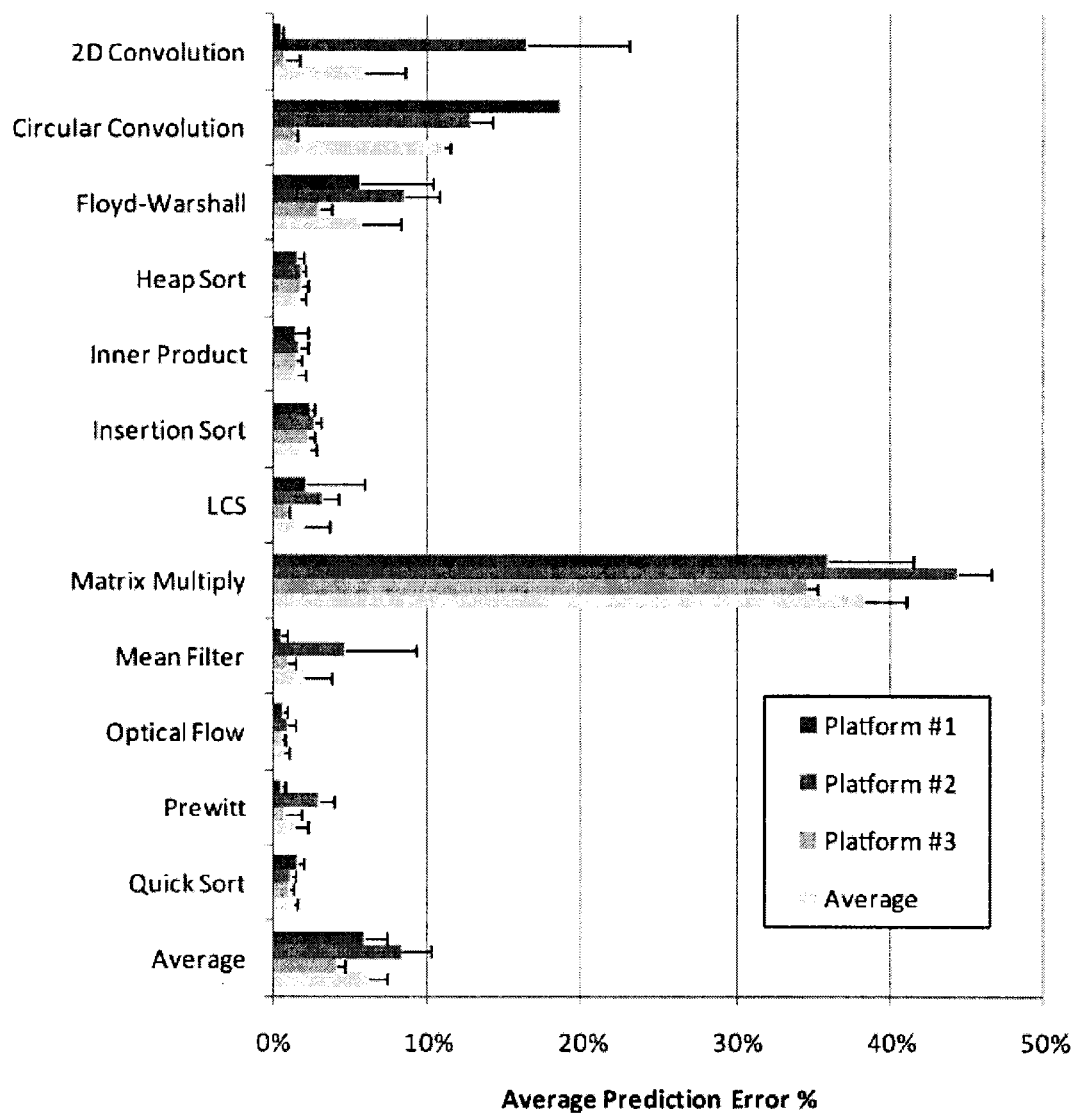
FIG. 25 is a chart that illustrates one example of the average percent prediction error and the root-mean-squared error for each of multiple implementations according to one embodiment.

FIG. 25 shows the average percent prediction error, represented by the bars and the root-mean-squared error, represented by the lines, for each implementation. The results for each implementation were averaged across all resource amounts available on a platform (for multi-threaded and heterogeneous implementations). For example, on platform #2, which has 16 cores, the results represent the average error for all possible resource allocations (e.g., 1 to 16 cores).

On average, the planner collected 463 samples, which took only 51.1 seconds to complete, and generated a performance profile averaging only 11.7 points for each implementation. Although the planning time will increase for longer-running implementations, the small number of samples should enable planning for many commonly used functions. Despite the low number of profile points, the performance profile achieved an average prediction error of less-than 6% and a root-mean-squared error of less-than 9% for all but two of the implementations. The circular convolution implementation achieved a prediction error of 11.0% and matrix multiply achieved an error of 38.3%. The larger prediction error of circular convolution and matrix multiply is largely due to inaccurate assumptions made by their adapters. Both adapters assumed the number of multiply-accumulate operations was a good predictor of processing time for the implementation (e.g., the implementation was computation-bound). Likewise, the adapter assumed that input parameters requiring a similar number of multiply-accumulates would require approximately the same amount of execution time. On the evaluated systems, the implementations were partially data-bound, with their processing time related more to the amount of data read and written by the implementation. Platform #3 showed the least prediction error for both circular convolution and matrix multiply due to its significantly faster memory reducing the data-transfer bottleneck and improving the computation-bound assumption. Results for these examples could potentially be improved by integrating micro-benchmarking results into the adapter to better estimate the effects of data transfer times.

The effects of the prediction parameters on both the planner execution time and average prediction error of the planner are next discussed. For all reported results, the corresponding values were first averaged across all platforms and different resource amounts and then normalized. The confidence level was kept constant at 95%.

Figure 26:
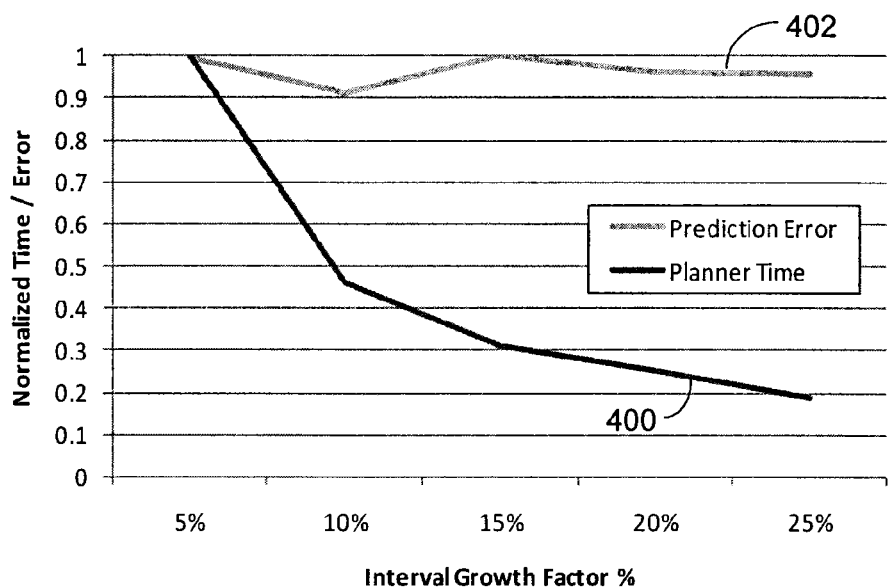
FIG. 26 is a chart illustrating one example of how planner time and prediction error are affected by the interval growth factor prediction parameter according to one embodiment.

FIG. 26 illustrates how planner time 400 and prediction error 402 are affected by the interval growth factor prediction parameter. The segment error threshold and sample error threshold were kept constant at 10%. As shown in FIG. 26, increasing the interval growth factor can significantly improve the planner time 400 without worsening the prediction error 402. The factor is inversely related to the planner's execution time, as demonstrated by the halving of the execution time as the factor is doubled. This makes sense as the width of the IOI, and correspondingly the average space between samples, increases linearly with the interval growth factor. Most interestingly, the prediction error 402 was not significantly affected by changing the factor, which is largely attributed to the segment error threshold still being sufficient for segment generation to determine the appropriateness of segments, despite the increased spacing between samples.

Figure 27:
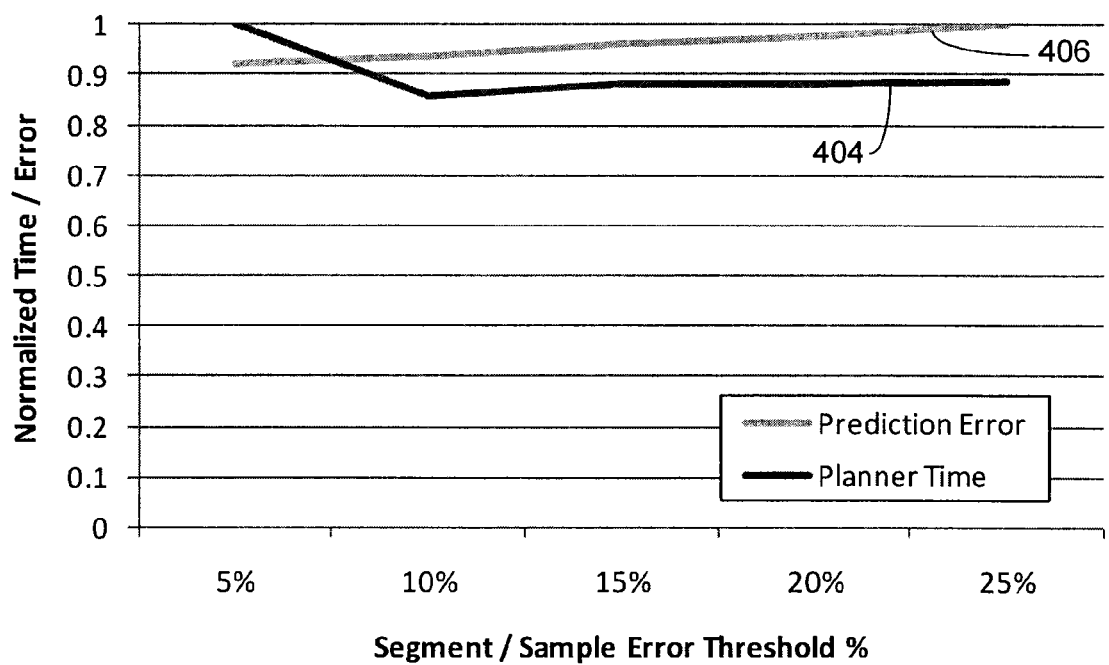
FIG. 27 is a chart illustrating one example of how planner time and prediction error are affected by the segment error threshold and the sample error threshold according to one embodiment.

FIG. 27 illustrates how the planner time 404 and prediction error 406 are affected by the segment error threshold and sample error threshold. Both error thresholds were set to the same value. The interval growth factor was kept constant at 10%. The results show that the error thresholds have only a minor impact on the planner time 404 and prediction error 406. Increasing the error thresholds from 5% to 25% linearly increased the (normalized) average prediction error from 0.92 to 1. An increase in the prediction error 406 is expected as the thresholds for rejecting a segment in the segment generation step are increased. The relatively small change in prediction error 406 is likely due to the out-of-range count still being sufficient for determining the best chain of segments to form the performance profile. The planner time 404 initially decreases as the error threshold sweeps from 5% to 10%, and then increases from 10% to 25%. The initial decrease is due to the lessening number of samples required to meet the segment error threshold. The subsequent increase is due to the greater number of candidate segments in the profile generation step, as more segments meet the segment error threshold.

Figure 28:
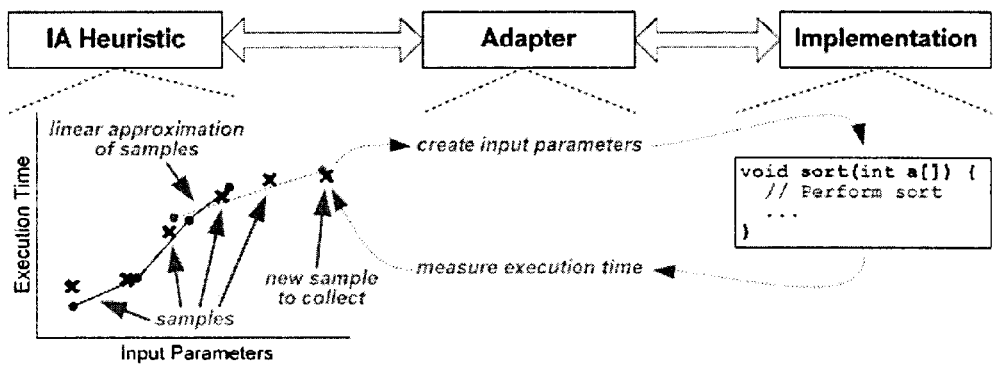
FIG. 28 illustrates a high-level overview of the implementation assessment (IA) heuristic according to one embodiment.

A heuristic for implementation assessment will next be described in further detail. The implementation assessment (IA) heuristic is an efficient and flexible heuristic that analyzes an implementation and creates an IPG to estimate the execution time of the implementation on a particular device from the implementation's invocation parameters. As illustrated in FIG. 28, the IA Heuristic analyzes the implementation through a provided implementation-specific abstraction layer, called an adapter, that abstracts many of the details of the implementation and allows the heuristic to transparently support many different types of implementations.

The IA Heuristic analyzes the implementation, through the adapter, by statistically analyzing the execution time required for the implementation to complete for a variety of different invocation parameters, in a process we refer to as sampling. As the heuristic merely invokes the implementation (as opposed to performing an internal analysis of the implementation's code), the heuristic treats the implementation as a black-box, which allows the heuristic to support nearly any kind of implementation, written in any programming language, and executing on any type of device. During the analysis, the heuristic adapts the sampling process in an attempt to minimize the total number of samples without significantly sacrificing the accuracy of the resulting IPG. When complete, optimization and other analysis tools may then refer to the resulting IPG to estimate the performance of the implementations for different invocation parameters to inform their optimization processes.

The IA Heuristic is specifically designed for the unique needs of estimating the performances of numerous heterogeneous implementations as part of an optimization process. Because the different implementations may have order-of-magnitude differences in execution time (e.g., a CPU matrix multiply versus a GPU matrix multiply), the accuracy of the IPG is not as crucial as being able to create the IPG in a small amount of time. As a result, many design decisions emphasize efficiency over pure accuracy. For example (and as illustrated in the results), it is typical for IPGs to have an estimation accuracy of around 10-20%. While this may not be ideal for all types of analyses, optimization tools comparing alternate heterogeneous implementations may still make very efficient and effective decisions as the estimation error is insignificant relative to the differences in execution times between implementations. The IA Heuristic may provide: estimation of execution time of an implementation for a large range of invocation parameters; support for implementations written in different programming languages, which can execute on potentially any type of device(s); adaptation of the heuristic's sampling and analysis process to create IPGs efficiently without significantly sacrificing accuracy.

The IA Heuristic relies on abstraction to be widely applicable to different types of implementations and to isolate implementation-specific details. One of the main goals of the IA Heuristic is to support any type of implementation; however, the challenge is that different implementations may have significantly different invocation semantics. Invocation details such as the structure of invocation parameters, the procedure to allocate and initialize parameters with valid values before an invocation, and any associated de-allocation of parameters following an invocation are all specific to an implementation and may vary widely between different types of implementations. For example, if the IA Heuristic was analyzing a sorting implementation, the heuristic allocates and populates an input array for the implementation to sort. However, if the function was matrix multiply, then the heuristic would instead create two matrices (of compatible dimensions) for the implementation to multiply.

As a result, the IA Heuristic separates out the implementation-specific details by means of an abstraction layer, called an adapter, which transforms the interface of an implementation into a consistent generic interface. The adapter may be implementation specific. However, the adapter may be created once per implementation, likely by the same developer who initially creates the implementation, and may involve the creation of five short functions to translate between the interfaces.

One feature of an adapter is to abstract away the specifics of the invocation parameters for an implementation. Different implementations may involve significantly different invocation parameters, such as a sorting implementation requiring a single input array to sort as opposed to a matrix multiply implementation requiring two matrices to multiply. Finding a consistent representation for all possible invocation parameters may involve simplifying the parameters, without sacrificing too much accuracy when estimating the performance of an implementation.

Figure 29:
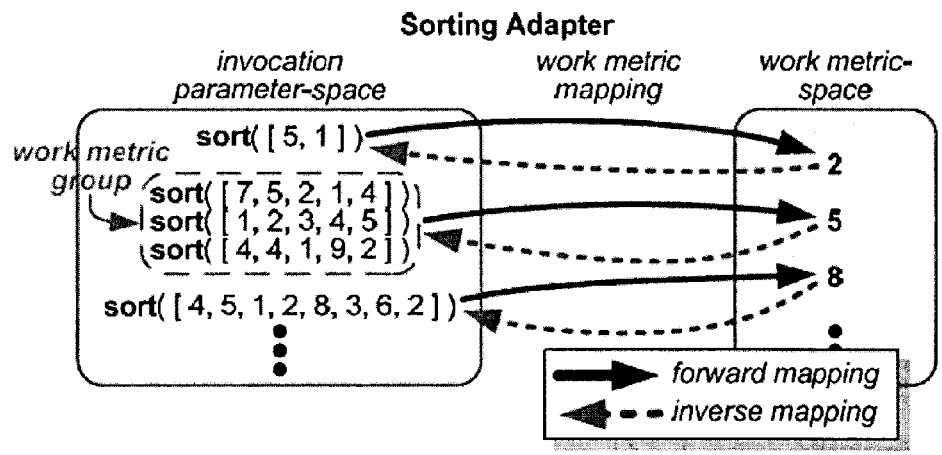
FIG. 29 illustrates one example of a sorting adapter mapping between invocation-parameter space and work-metric space.

Adapters use the abstraction of mapping an implementation's invocation parameters to a numeric value, called the work metric, which approximately measures the amount of computational work used by the implementation to process those parameters. The definition of computational work may be very flexible and chosen by the developer of an adapter to make the mapping from invocation parameters to work metric efficient to calculate. The measure of computational work does not need to be proportional to the execution time but may generally be a monotonically non-decreasing function of the execution time, such that invocation parameters with a higher measure of computational work require a longer execution time. For the sorting example, a possible estimate for the amount of computational work is the number of elements to sort. Thereby, a potential work metric mapping is to set the work metric equal to the number of elements in the input array, as illustrated in FIG. 29. The creation of a work metric mapping for the matrix multiply implementation may not be as straight-forward due to its input parameters using two matrices. However, in this case (and in many cases) an effective work metric mapping may still be determined by analyzing how the execution time relates to the invocation parameters.

There may be two guidelines for effective work metric mappings. First, invocation parameters that map to the same work metric value, called work metric groups, may also use approximately the same execution time, as illustrated in FIG. 29. Second, invocation parameters with larger work metric values may involve longer execution times. For the sorting example, using the number of elements to sort as the work metric value generally adheres to both of these guidelines, as the execution time used to sort an input array is typically not significantly dependent on the values contained within the array (assuming the input is randomly distributed) and sorting more elements typically takes longer. Note that adapters are not required to perfectly adhere to these guidelines, but the resulting accuracy of the IA Heuristic may be dependent upon the quality of the work metric mapping.

The mapping from invocation parameters to work metrics provides numerous practical and performance benefits to the IA Heuristic. First, the mapping reduces the potentially complex combinations of valid invocation parameters, which we refer to as the invocation-parameter space, of an implementation to a single numeric quantity (i.e., the work metric), which simplifies the design and operation of the IA Heuristic. Second, any implementation that has an adapter will support a consistent work metric interface, allowing the heuristic to operate identically regardless of the implementation. Lastly, the mapping effectively reduces the dimensionality of the invocation-parameter space to a single dimension, which greatly reduces the amount of processing required by the IA Heuristic. Note that although this reduction in dimensionality does limit the effectiveness of the heuristic for some functions, a goal of the mapping is to coalesce (i.e., map to the same work metric value) invocation parameters that use approximately the same execution time, thereby eliminating only the insignificant dimensions for purposes of the IA Heuristic. In practice, no work metric mapping is perfect and likely some variance in execution time will exist for coalesced invocation parameters (i.e., work metric groups). However, for many implementations, the variance is not significant percentage-wise.

In addition to the forward mapping from invocation parameters to work metric, the IA Heuristic also may use the adapter to specify the inverse mapping from work metric to invocation parameters. As the forward mapping is typically many-to-one, the inverse mapping may involve the selection of a representative instance out of the invocation parameters within a work metric group. The IA Heuristic uses the inverse mapping in a process called sample collection to establish the execution time of invocation parameters with a specified work metric value. As a result, a representative instance should correspond to invocation parameters that have an execution time typical (i.e., not a corner-case) for that work metric value. For cases where the work metric mapping coalesces only invocation parameters with identical execution times, any instance of invocation parameters within that work metric group would suffice. However, for the more common case of the coalesced invocation parameters having a distribution of execution times, the inverse mapping may return an instance of invocation parameters with an execution time close to the average execution time for the group. For the sorting example, a representative instance of the invocation parameters for a specified work metric value might be to create a randomly initialized input array with length equal to that work metric value (assuming that an input array with randomly distributed values is representative of the typical invocation parameters).

Many forward and inverse mappings use knowledge of what are typical invocation parameters for a function in order for the adapter to remain accurate across the parameter combinations for which the resulting IPG will estimate execution time. For the sorting example, it was implied that a randomly distributed input array was the typical case. However, for some applications the typical case may instead be a mostly sorted input array, resulting in significantly different execution times depending on the implementation. For example, an implementation of the bubble sort algorithm has a data-dependent execution time that grows quadratically (i.e., $O(n^2)$) for a randomly distributed input array but only linearly (i.e., $O(n)$) if the input array is mostly sorted. This discrepancy may lead to a less accurate IPG if the work metric mapping of the adapter selects nonrepresentative invocation parameters as the heuristic will incorrectly determine the average execution time for the different work metric groups. For this reason, it may be important for the user of the IA Heuristic to use an adapter that selects instances of invocation parameters that are representative of the invocation parameters for which the IPG will estimate execution time. Similarly, developers of the adapters may create multiple instances of the adapters to support different assumptions on what are typical invocation parameters.

TABLE IV

[INVOCATION SEMANTICS, ASYMPTOTIC ANALYSIS RESULTS, AND RESULTING WORK METRIC MAPPINGS FOR POSSIBLE CONVOLUTION AND MATRIX MULTIPLY ADAPTERS]

| | Convolution Adapter (for time-domain algorithm) | Matrix Multiply Adapter |
|---|---|---|
| Invocation Semantics | Convolve(Array a, Array b) (convolve array a with array b) | MultiplyMatrices(Matrix a, Matrix b) (multiply matrix a with matrix b) |
| Asymptotic Analysis | time = $\Theta(|a| * |b|)$ (where $|a|$ and $|b|$ are the lengths of arrays a and b, repectively) | time = $\Theta(m * n * p)$ (where m is the number of rows in Matrix a, n is the number of columns in Matrix a, and p is the number of columns in Matrix b) |
| Work-Metric Mapping | work metric = $|a| * |b|$ | work metric = $m * n * p$ |

One technique a developer of an adapter may use to create an effective work metric mapping is to base the mapping on an asymptotic analysis of the implementation. An asymptotic analysis reveals how the invocation parameters of an implementation influence the implementation's execution time. For example (and as described in Table IV), the asymptotic analysis for a convolution implementation, based on the discrete time-domain convolution algorithm, calculates the execution time to equal $\Theta(|a|*|b|)$, where $|a|$ and $|b|$ are the lengths of the two input arrays to convolve. Thereby, the execution time of the implementation is approximately proportional to the product of the lengths of the two input arrays. The proportionality constant is unknown but should remain relatively constant especially for small changes in the lengths of the input arrays. From these details, it is evident that as long as the product of $|a|$ and $|b|$ is the same, the asymptotic analysis will calculate the same estimate for execution time. As a result, an effective work metric mapping is to simply group together the invocation parameters based on the product of their input array lengths, which is possible by setting the work metric value equal to $|a|*|b|$. This work metric mapping meets the two guidelines specified above as it coalesces invocation parameters with approximately the same execution time, and the estimated execution time mostly increases with increasing work metric value.

This asymptotic analysis technique may be applied identically to many different types of implementations. As described in Table I, the asymptotic analysis for a matrix multiply implementation calculates the execution time to equal $\Theta(m*n*p)$, where m, n, and p are the lengths of associated dimensions of the input matrices. As a result, an effective work metric mapping for a matrix multiply implementation is to set the work metric value equal to $m*n*p$.

The asymptotic analysis technique for determining work metric mappings may be effective because it determines how to group invocation parameters with similar execution times, but any technique which adheres to the guidelines would suffice. For the sorting example, the work metric mapping was to set the work metric value equal to the number of elements to sort, but this is not the same as the result returned by the asymptotic analysis. Depending on which sorting algorithm the implementation uses, the asymptotic analysis may calculate the execution time to equal $\Theta(n*\log(n))$ for a quick sort implementation, where n is the number of elements to sort. While setting the work metric value equal to n*log(n) may also be used, the asymptotic analysis reveals that the execution time is a monotonically increasing function of only n, and thereby invocation parameters with the same number of elements to sort will also have approximately the same execution time. As a result, setting the work metric value equal to n alone is also an effective work metric mapping.

TABLE V

[A DESCRIPTION OF THE FUNCTIONS FOR AN ADAPTER ALONG WITH EXAMPLE FUNCTIONS FOR A SORTING ADAPTER]

| Function Name | Description | Example for Sorting Adapter |
|---|---|---|
| RoundMetric | Arbitrary value passed as input and function returns the closest valid work metric value | Round to the nearest non-negative integer |
| NextMetric | Arbitrary value passed as input and function returns the smallest valid work metric value greater than the inputted value | Round to the nearest non-negative integer and add one |
| CalcMetric | Invocation parameters passed as input and function returns the corresponding work metric value | Return the length of the invocation parameter's input array as the work metric value |
| CreateParams | Valid work metric value passed as input and function allocates and initializes invocation parameters representative of that work metric | Allocate a randomly initialized input array with length equal to the inputted work metric value |
| DeleteParams | Invocation parameters created during a prior CreateParams is passed as input, which the function will de-allocate | De-allocate the inputted invocation parameters allocated by CreateParams |

As listed in Table V, the adapter may include five functions that map between the work metric interface and implementation interface. The developer of an adapter may typically create the five functions after determining an appropriate work metric mapping for an implementation. The adapter may be used for a variety of purposes, but the design of the functions is motivated by the needs of the IA Heuristic.

The first two functions specify the valid work metric values for an adapter. Typically, only some of the work metric values correspond to valid invocation parameters depending on the work metric mapping. For the sorting example, the work metric mapping was to set the work metric equal to the number of elements to sort, thereby restricting the valid work metric values to the possible lengths of the invocation parameter's input array, which must be a non-negative integer. The first function, called the RoundMetric function, rounds an arbitrary inputted value to the nearest valid work metric value. The second function, called the NextMetric function, returns the smallest valid work metric value that is greater than an inputted value. The IA Heuristic uses both of these functions, in combination with an overall bound on work metric values, called the work metric range, to determine a list of work metric values for which to analyze an implementation.

The remaining three functions map between the work metric values for an adapter and the corresponding invocation parameters for an implementation. The third function, called the CalcMetric function, maps invocation parameters for the implementation to a work metric value by calculating the corresponding work metric value. For the sorting example, this function would simply return the number of elements in the input array. The fourth function, called the CreateParams function, performs the inverse of the work metric mapping and maps a work metric value to invocation parameters by creating a representative instance of the invocation parameters corresponding to the inputted work metric value. This function typically allocates space for the input and output parameters and then initializes the parameters with valid values for the implementation. For the sorting example, this function might allocate an input array for the sorting implementation with a size specified by the inputted work metric value and then initialize that array with random values. As a consequence of the fourth function allocating space, the last function, called the DeleteParams function, then de-allocates any space for the inputted invocation parameters, assuming they were created during a previous CreateParams function. The IA Heuristic may use all of the adapter's functions to interface with an implementation.

Another approach that improves the accuracy of the work metric mapping is to use multiple adapters to separate cases that exhibit different execution characteristics. The forward and inverse work metric mappings both use knowledge of the common-case invocation parameters to determine the implementation's correct execution characteristics. For the sorting example, the execution time required to sort an input array may vary significantly depending on whether the input array consists of randomly distributed or mostly sorted input values. Likewise, the inverse work metric mapping may choose a different instance of invocation parameters depending on whether the adapter assumes the common-case consists of randomly distributed or mostly sorted input values. Some implementations have a large complex invocation-parameter space for which it is difficult to create a work metric mapping that remains accurate over all possible invocation parameters, especially if the adapter assumes the common-case characteristics adhere to one pattern of invocation parameters when in fact they adhere to another. One solution to overcome this is to have the developer of the adapter supply multiple adapters for different assumptions on the characteristics of invocation parameters. For the sorting example, separate adapters for the randomly distributed and mostly sorted invocation characteristics would allow the user of the heuristic to select the most appropriate adapter based on their knowledge of the actual characteristics of the invocations. Using multiple adapters has the effect of partitioning the invocation-parameter space such that each adapter only needs to remain accurate for a smaller subset of invocation parameters. The end result is both an easier to create work metric mapping and a more accurate IPG.

The IA Heuristic takes an implementation and its adapter as an input and performs an analysis, consisting of sampling and several other steps discussed later, to create an IPG. The heuristic relies on the adapter to abstract many of the details of an implementation and to transform the implementation's interface to an abstract work metric interface. The heuristic may operate internally only with work metric values, which the adapter then maps to and from the implementation's interface. Through a combination of measuring the execution time at different work metric values and statistical analyses, the IA Heuristic establishes a relationship between work metric and execution time, which it then uses to create an IPG. Lastly, the IA Heuristic saves the IPG for use by optimization tools (or other users) to estimate the execution time of an implementation for future invocations.

The IA Heuristic creates an IPG for an implementation by iterating over several steps that incrementally grow the IPG from the smallest to the largest work metric value, with the bounds specified by the work metric range. The heuristic grows an IPG by incrementally adding segments that effectively approximate the relationship between work metric and execution time for the duration of that segment. The point located at the right endpoint of the right-most currently established segment (or the lower bound of the work metric range if there are no known segments) is referred to as the frontier point. As the heuristic adds segments to the IPG, the frontier point incrementally progresses to the right until it reaches the upper bound of the work metric range, at which point the IA Heuristic is complete.

Figure 30:
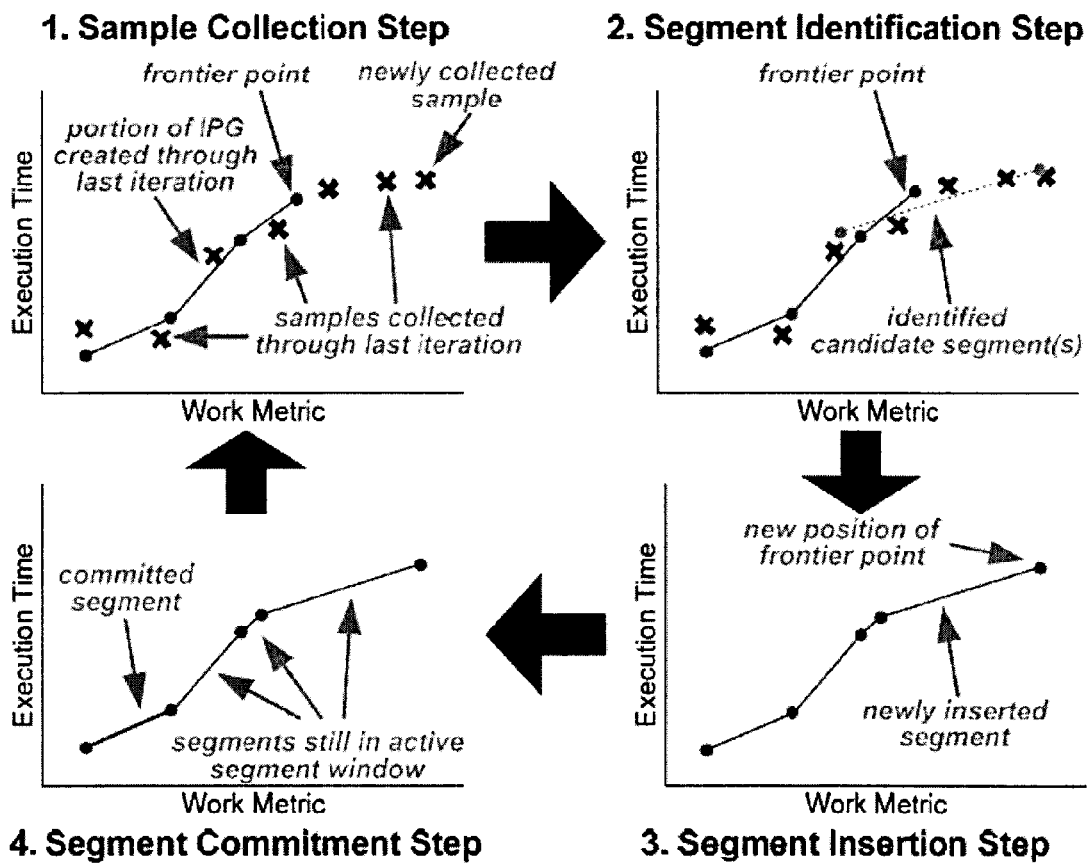
FIG. 30 illustrates one example of the four steps of the IA heuristic according to one embodiment.

The IA Heuristic includes four steps, as illustrated in FIG. 30. The first step, called sample collection, measures the actual execution time of the implementation invoked with invocation parameters at a determined work metric value. The heuristic collects samples to ascertain the relationship between work metric and execution time, which the heuristic uses in later steps when identifying new segments. The second step, called segment identification, collectively analyzes the samples collected during the current and previous iterations to identify linear regions which may be approximated by a segment. The heuristic uses a statistical analysis of the samples in conjunction with a set of rules to establish whether a set of samples are sufficiently linear. Typically, the heuristic may identify several candidate segments during the segment identification step, which the third step, called segment insertion, will then compare to determine which segment to actually insert into the IPG. The heuristic uses a set of criteria to compare the candidate segments and determine which is the best addition to the IPG overall. When the heuristic inserts a segment into the IPG, the new segment may possibly intersect or overlap a previously inserted segment, leading the heuristic to accordingly adjust those segments. A heuristic parameter, called the active segment window, specifies how many of the right-most segments allow adjustments. The fourth step, called segment commitment, prevents further adjustments to segments once they are no longer within the active segment window. All four steps may be repeated in each iteration until the heuristic completes.

TABLE VI

[A DESCRIPTION OF THE IA HEURISTIC'S TUNABLE PARAMETERS FOR CONTROLLING TRADEOFFS BETWEEN PERFORMANCE AND ACCURACY]

| Parameter Name | Description |
| --- | --- |
| Active Segment Window | The number of right-most segments that allow adjustments when creating an IPG. Once a segment leaves the active segment window, it becomes committed. |
| Sampling Execution Time Spacing | The desired execution time spacing between samples expressed as both a percentage increase and with optional absolute bounds on the minimum and maximum increase. The IA Heuristic uses the portion of the IPG generated so far to extrapolate the work metric to sample next based on this parameter. |
| Maximum Execution Time Spacing | The maximum execution time spacing allowed between samples expressed as both a percentage increase and with optional bounds on the minimum and maximum increase. Only segments which meet this parameter will become candidate segments for the IA Heuristic to insert into the IPG. |
| Segment Confidence Threshold | The maximum allowed width of the confidence interval calculated at the segment's endpoints. A wider confidence interval reflects a larger variance of the samples around the linear regression result. |
| Maximum Point Samples | The maximum number of samples the IA Heuristic may collect at a single work metric value before it automatically becomes a candidate segment despite the variance of the samples. |
| Sample Error Threshold | The maximum allowed error between a sample's measured execution time and the execution time estimated by the IPG before the IA Heuristic includes the sample as part of the comparison criteria during segment insertion. |

The IA Heuristic incorporates several tunable parameters for controlling tradeoffs between performance and accuracy. These parameters, listed in Table VI, will typically be hard-coded by the user of the heuristic with values appropriate for the accuracy requirements of the resulting IPG.

The design of the IA Heuristic balances two competing goals. On one hand, the heuristic should collect as few samples as possible because each sample results in the execution of an implementation and correspondingly lengthens the time required for the heuristic to complete. On the other hand, each sample the heuristic collects reveals more information about the relationship between work metric and execution time, leading the heuristic to collect more samples to improve the accuracy of the IPG. As the IA Heuristic desires to both complete in a reasonable amount of time and result in an IPG of useable accuracy, the heuristic relies on an adaptive approach.

The IA Heuristic adapts to an implementation by having the user of the heuristic specify the desired accuracy of the resulting IPG. The accuracy of an IPG is measured as the maximum amount of discrepancy between the actual execution time of an implementation and the execution time estimated by the IPG. As execution times may have a large range (e.g., from microseconds to days), the desired accuracy level is specified as an allowable error percentage in addition to optional bounds on the minimum and maximum absolute error. For example, a user may specify the IPG should be accurate within 5% with a lower bound of 10 ms and an upper bound of 1 minute. The minimum error bound is useful as small execution times (e.g., sorting five elements takes only microseconds) might otherwise have impractically small error percentages that are less than the variance or noise of the time measurements. The maximum error bound may be useful if the user configures the IPG to have a bounded maximum error.

The first guideline specifies that invocation parameters that map to the same work metric value are to have approximately the same execution time. As an IPG maps work metric values to execution times, the applicability of the IPG to the various possible invocation parameters may be dependent on how well the adapter adheres to this guideline. The second guideline is that the execution time should be non-decreasing for increasing work metric values. This guideline allows for the heuristic to make assumptions on the range of execution times for work metric values between collected samples, and thereby allows the opportunity for the heuristic to collect fewer samples while still meeting accuracy requirements.

From the assumption that execution time does not decrease as work metric increases, the IA Heuristic can establish bounds on the maximum error of estimated execution times between samples. For example, if the execution time at work metric $w_1$ is $e_1$ and the execution time at work metric $w_2$ is $e_2$, then all of the execution times for work metrics between $w_1$ and $w_2$ are bounded by $e_1$ and $e_2$ (because otherwise the execution time would have had to decrease at some point). Likewise, if the heuristic relies on linear interpolation to approximate the execution time between the work metrics $w_1$ and $w_2$, the maximum error between the actual and estimated (i.e., interpolated) execution time would be less-than $e_2-e_1$ and with a percentage less-than $(e_2-e_1)/e_1$. From this reasoning, as long as the IA Heuristic ensures all pairs of sequential samples have a maximum execution time spacing (METS) within the percentage (and absolute bounds) of the desired accuracy, the entire IPG will meet the accuracy specifications. We refer to this as the METS technique.

The IA Heuristic may employ a combination of the METS technique and statistical analysis to efficiently create an IPG with a desired level of accuracy. The heuristic uses the METS technique, as discussed previously, to determine the maximum spacing allowed between sequential samples for a desired level of accuracy. The statistical analysis is responsible for removing noise from the samples and determining when sets of sequential samples are sufficiently linear to form segments for the IPG.

The sample collection step of the IA Heuristic occurs first in every iteration and collects a single sample for the latter steps of the iteration to analyze. While segment collection does not, itself, analyze the samples, it directly interacts with the implementation (through the adapter) and therefore has a goal to collect samples which enable the latter steps to progress the frontier point and create more of the IPG.

Sample collection operates by performing several substeps. First, sample collection selects a work metric value using the procedure discussed later. Second, sample collection uses the adapter's RoundMetric function to round the selected work metric value to the nearest valid value. Third, sample collection uses the adapter's CreateParams function to create an instance of invocation parameters representative of the selected work metric value. Fourth, sample collection executes the implementation using the created invocation parameters and measures the execution time required for the implementation to complete. Lastly, once the implementation completes, sample collection uses the adapter's DeleteParams function to de-allocate the created invocation parameters. The combination of selected work metric value and resulting execution time is then the newest sample for the latter steps of the current iteration of the heuristic to process.

One way for sample collection to select a new work metric value is to extrapolate based on the previously collected samples. For this purpose, sample collection analyzes the portion of the IPG created up through the end of the preceding iteration. Specifically, sample collection takes into account the current location of the frontier point and the slope of the right-most segment. Note that sample collection may base the selection of the new work metric value on the IPG and not directly on the previously collected samples. As the segment identification step creates segments in the IPG only when sets of sequential samples meet the set of criteria previously described, not every collected sample will immediately result in a segment in the next iteration's IPG.

The procedure to select a new work metric value is based on how many points and segments are in the IPG. For the first few iterations when no points are in the IPG, sample collection selects the work metric value corresponding to the lower bound of the work metric range to establish the left-most point of the IPG. Once the IPG comprises of only a single point (which must be at the lower bound of the work metric range), no slope information is yet available, so sample collection uses the adapter's NextMetric function to select the work metric value immediately adjacent to the lower bound of the work metric range. Once the IPG comprises of at least two points, slope information for the right-most segment is available and sample collection can extrapolate the location of work metric values based on a desired execution time spacing, allowing for usage of the METS technique.

Figure 31:
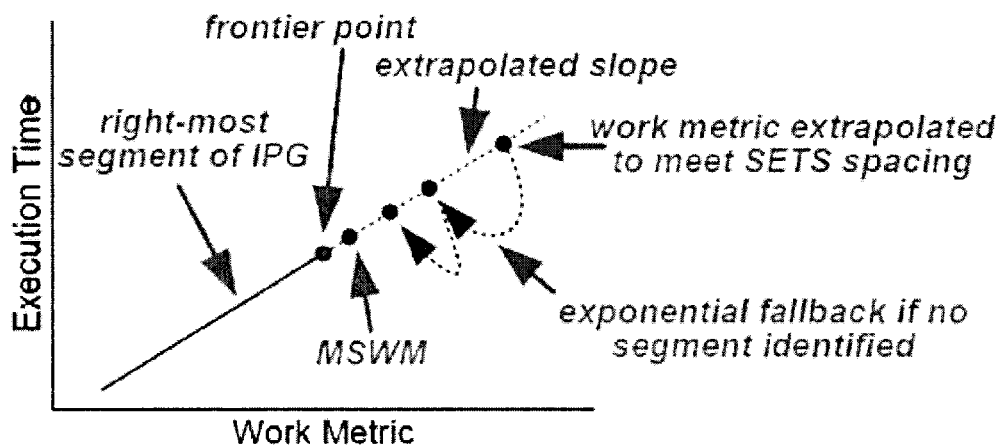
FIG. 31 illustrates sample collection determining a work metric to sample according to one embodiment.

Following the rationale of the METS technique, sample collection attempts to extrapolate the location of the work metric value with an execution time spacing specified by a heuristic parameter called the sampling execution time spacing (SETS) parameter. As illustrated in FIG. 31, sample collection assumes the slope of the right-most segment remains approximately consistent through the yet to be collected sample. Sample collection then takes the inverse slope of the right-most segment (i.e., change in work metric divided by change in execution time) and multiplies it by the desired increase in execution time to calculate how much to increase the work metric value beyond the frontier point, which then becomes the work metric value for the next sample. The SETS parameter specifies the execution time spacing both as a percentage increase and with optional absolute bounds on the minimum and maximum spacing. Regardless of whether or not the new sample's execution time is within the spacing (i.e., the slope is not consistent through the collected sample), sample collection will still collect the sample and give the remaining steps in the iteration the opportunity to utilize the new sample (in conjunction with the previously collected samples) to identify new segments. As one of the criteria for identifying a segment is to verify that the actual execution time spacing between samples is within the accuracy requirements, the remaining steps may not identify a new segment and, likewise, the frontier point will not progress. Following which, the next iteration will start again without any change to the IPG.

When the sample collection step starts without any progression of the frontier point since the previous iteration, sample collection uses an exponential fallback technique to select work metric values closer and closer to the frontier point. As illustrated in FIG. 31, the exponential fallback technique sets the new work metric value equal to the value halfway between the work metric value sampled during the previous iteration and the minimum sampling work metric (MSWM) value, which is the smallest valid work metric value greater than the work metric value of the frontier point as calculated by the adapter's NextMetric function. The exponential fallback technique specifies that when the IPG does not progress, the next iteration will collect a sample with a closer work metric spacing with the frontier point to encourage the identification of new segments. While not all of the samples may immediately result in the identification of a new segment, it may be none of the samples go unused. All collected samples will eventually form the basis of a segment, whether for the current or a later iteration.

In addition to the previous technique to select a new work metric value, sample collection also performs several validity checks to prevent potential complications. First, sample collection clips the work metric value to be within the bounds of the work metric range. Second, sample collection clips the work metric value such that the work metric spacing between the sample to collect and the frontier point is no greater than the work metric spacing between the frontier point and the lower bound of the work metric range, essentially limiting the growth of the IPG so that it cannot more than double in size each iteration. This restriction may be employed to prevent the problem of a few closely spaced noisy samples in the first few iterations from resulting in a nearly horizontal segment, and therefore forcing sample collection to sample at a work metric value equal to the upper bound of the work metric range (because a nearly horizontal segment may involve a large work metric increase to accomplish even a small increase in execution time). Lastly, sample collection verifies that the exponential fallback technique always selects a work metric value closer to the frontier point than the previous iteration, until it reaches the MSWM value. Without this check, rounding issues (i.e., with the RoundMetric function) may result in the exponential fallback technique never reaching back to the MSWM value.

The segment identification step of the IA Heuristic may occur second in every iteration and analyzes the latest sample, in conjunction with the samples collected from previous iterations, to identify when sets of sequential samples may be represented as a segment in the IPG. Segment identification uses a statistical analysis and a set of criteria to determine if a set of samples are sufficiently linear to be represented as a segment. Typically, the step will identify several candidate segments from which the latter steps will then compare to determine which to insert into the IPG.

Segment identification analyzes sets of samples using a linear regression analysis. A linear regression analysis is a statistical technique that processes a set of samples and calculates the line that minimizes the mean-squared distance between the samples and the line. The analysis also quantifies how accurately the line approximates the samples by calculating a confidence interval, which is another statistical technique based on the variances of the samples around the line.

Figure 32:
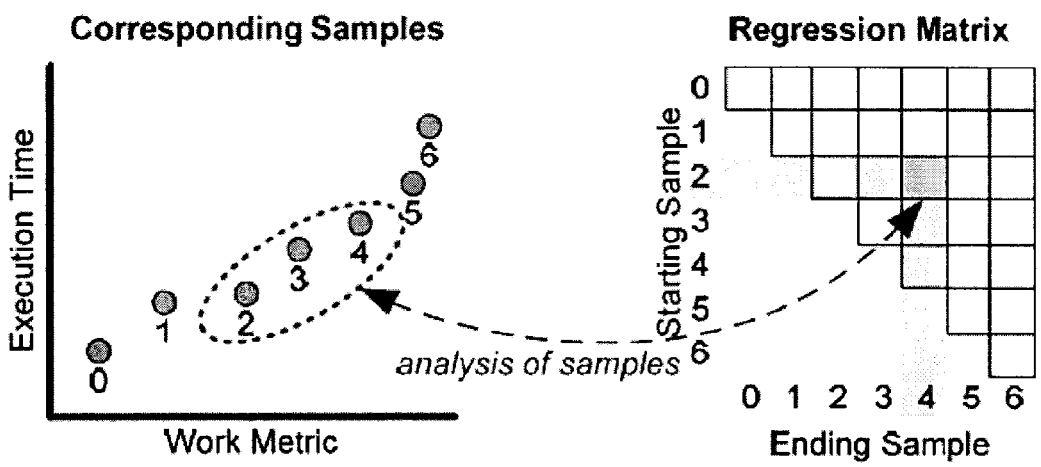
FIG. 32 illustrates a relationship between cells in a regression matrix and their corresponding samples according to one embodiment.

As neither the starting nor ending points of the segments may be known beforehand, the segment identification step performs a linear regression analysis on all sequential subsets of the samples. For this purpose, segment identification relies on a data structure, as illustrated in FIG. 32, called the regression matrix. The regression matrix may be visualized as an upper-right triangular matrix whose rows correspond to different starting samples for the linear regression analysis and columns correspond to different ending samples. Indexes in the matrix refer to the indexes of the samples in increasing work metric order. Likewise, every cell in the matrix stores the result of a linear regression analysis performed on a distinct subset of the sequential samples. The work metric values of the first and last samples of the subset correspond to the interval of work metric values for which the analysis is pertinent. For example, the result of the linear regression analysis on the subset of sequential samples indexed two through four (in increasing work metric order) would be located at the cell in row two, column four. Likewise, if the corresponding work metric value of sample two was 35 and sample four was 110, the corresponding linear regression analysis would pertain to the work metric interval of 35 through 110. The matrix is upper-right triangular in shape as the starting index cannot be greater than the ending index.

Figure 33:
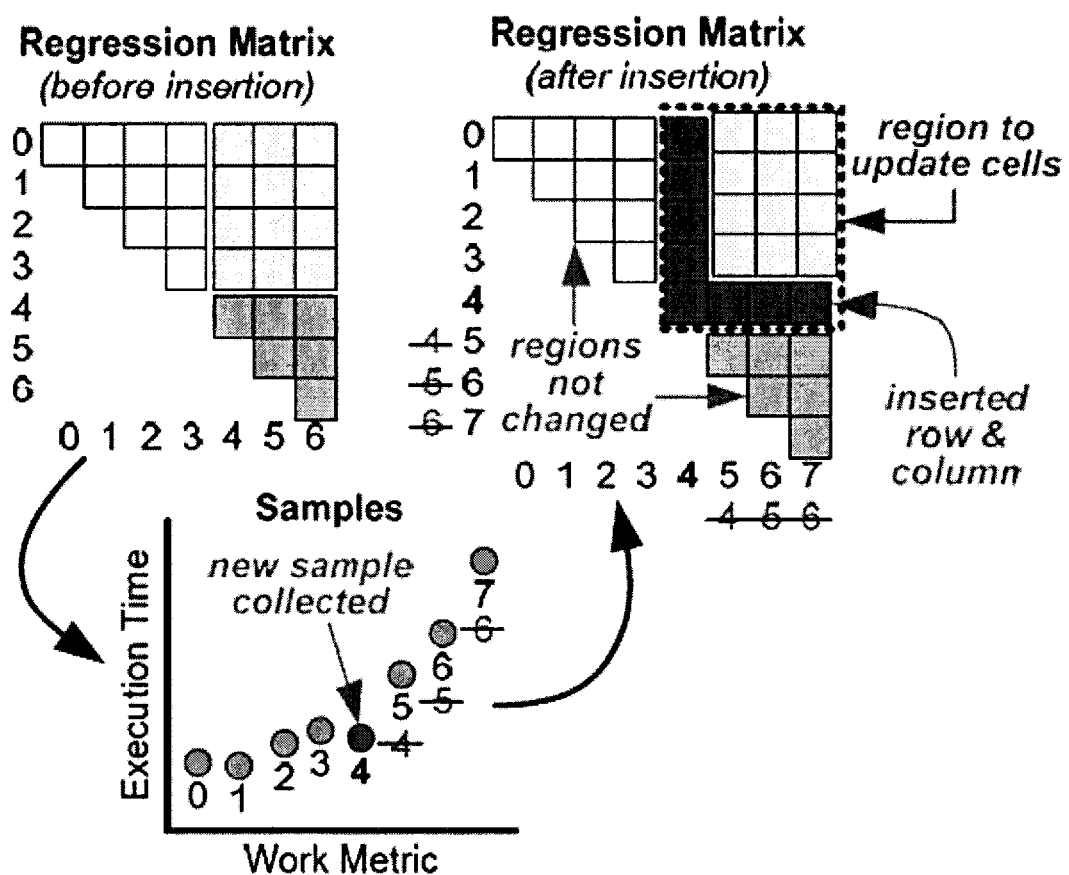
FIG. 33 illustrates inserting a new sample into a regression matrix according to one embodiment.

When the segment identification step starts, it first incorporates the newly collected sample for the current iteration into the regression matrix. As illustrated in FIG. 33, incorporating a sample starts by finding the sorted index (in increasing work metric order) of the new sample among the previously collected samples. If the new sample's work metric value is unique (i.e., this is the first sample with this work metric value), segment identification will then insert a new row and column into the regression matrix at the position corresponding to the index of the new sample. If the new sample's work metric value is not unique (which is possible due to the exponential fallback technique in sample collection), the step will instead accumulate the statistics of the new sample with the previous samples of the same work metric value at their corresponding cell.

Segment identification then performs a linear regression analysis on all intervals that include the new sample. In order for an interval to include the new sample, its starting index (i.e., its row) is less than or equal to the index of the new sample and its ending index (i.e., its column) is greater than or equal to the index of the new sample, which corresponds to a rectangular region of cells in the upper-right portion of the regression matrix. Segment identification may simply copy over the cells outside of this region as their subsets of samples may not include the new sample and thereby their linear regressions analyses may not have changed from the previous iteration.

The segment identification step populates the cells in the regression matrix efficiently by using a dynamic programming algorithm. Performing a linear regression analysis uses the accumulation of simple calculations on the coordinates of the samples (i.e., accumulating the x, $x^2$, y, $y^2$, and x·y values, where x is the work metric of the sample and y is the execution time). As a result, a linear regression analysis on a large number of samples may be performed instead by first dividing the samples into subsets, calculating the partial accumulations for each subset individually, and then accumulating the partial sums when performing the overall linear regression analysis. Equivalently, segment identification performs the linear regression analyses in sorted order of increasing length and saves the partial accumulations for each analysis. As a result, populating a cell in the regression matrix uses only accumulating the saved partial sums from two prior analyses on two halves of the samples. Segment identification populates all cells in the regression matrix in this manner with the exception of the cells along the regression matrix's diagonal, which correspond to linear regression analyses at a single work metric value. Segment identification instead populates these cells directly by performing a linear regression analysis on the samples themselves, which then form the base cases for populating the remaining cells.

Figure 34:
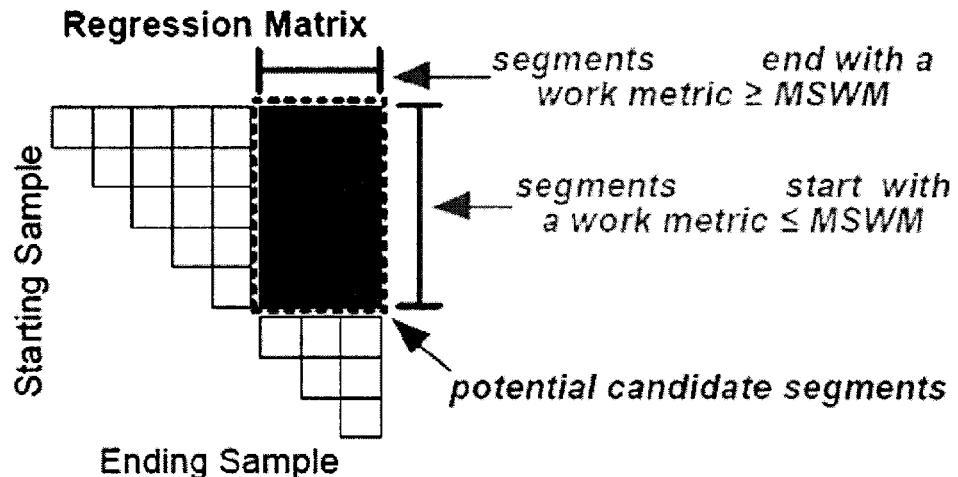
FIG. 34 illustrates one example of a region of cells to be analyzed as potential candidate segments according to one embodiment.

After populating the cells of the regression matrix with linear regression results, the segment identification step analyzes the cells to identify candidate segments. Segment identification creates a segment for a cell by taking the linear regression result in the cell (which corresponds to a line) and clipping it to the interval of work metric values pertaining to the cell (i.e., the starting and ending work metric values for the analysis' subset of samples). Segment identification considers segments that will progress the frontier point and not leave any work metric discontinuities in the IPG, which corresponds to cells with a starting work metric (i.e., row) of less than or equal to the MSWM value and an ending work metric (i.e., column) of greater than or equal to the MSWM value. Note that even a segment which starts at the MSWM value will not create a discontinuity as there are no valid work metric values between the MSWM value and the work metric of the frontier point. In the regression matrix, this region to analyze corresponds to a rectangular region of cells, as illustrated in FIG. 34.

Segment identification then analyzes the potential candidate segment cells and relies on several requirements to determine whether or not the samples are sufficiently linear to become a candidate segment. First, the linear regression analysis uses at least three samples so that the confidence interval results are meaningful. Second, the two end-points of the segment have positive execution time values. Third, the density of samples over the work metric interval of the segment is sufficient to guarantee the accuracy of the analysis along the entire interval. Following the rationale of the METS technique, segment identification assumes that the samples are within a maximum spacing specified by a heuristic parameter called the maximum execution time spacing (METS) parameter. Specifically, segment identification takes the inverse slope of the segment (i.e., change in work metric divided by change in execution time) and multiplies it by the maximum allowable increase in execution time to calculate the maximum allowable work metric spacing between sequential samples. The METS parameter specifies the maximum execution time spacing both as a percentage increase and with optional absolute bounds on the minimum and maximum spacing. Lastly, segment identification calculates the confidence interval for the two endpoints of the segment to verify that the segment accurately approximates the samples. A larger confidence interval corresponds to the samples having more variance around the segment. Another heuristic parameter, called the segment confidence threshold parameter, specifies the maximum allowed width of the confidence interval. If the segment meets all of these criteria, it then becomes a candidate segment.

In addition to the previous requirements, the segment identification step also supports two corner-cases to prevent deadlock in certain situations. First, segment identification guarantees that the spacing required to meet the METS parameter is attainable by the current adapter. If it cannot make this guarantee, it rounds up the maximum spacing to the next valid work metric value using the adapter's Next-Metric function. Second, segment identification ignores the confidence interval requirement when the segment is zero-length (i.e., is a point) and consists of more than a certain number of samples, as specified by a heuristic parameter called the maximum point samples parameter. Otherwise, an implementation with a large variance around a specific work metric value may never meet the confidence interval requirement resulting in deadlock of the heuristic.

The segment insertion step of the IA Heuristic occurs third in every iteration and compares the candidate segments to determine which is the best overall addition to the IPG. The checks performed by the segment identification step have already verified that the candidate segments accurately estimate the samples for different intervals of work metric values, but the segment insertion step further checks which segment results in a smooth and accurate IPG of minimum number of segments. Segment insertion relies on a set of comparison criteria to analyze each candidate segment and determine which to insert. As part of inserting a new segment, the segment insertion step may also resize or remove segments previously inserted into the IPG to accommodate the new segment.

Figure 35:
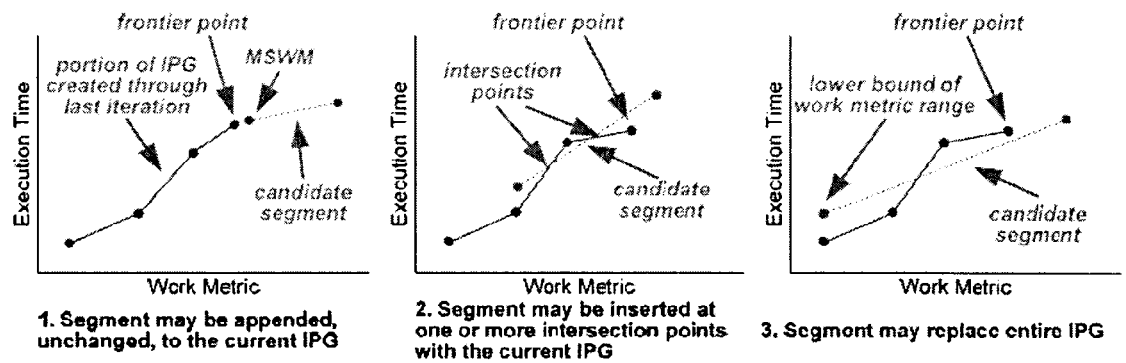
FIG. 35 depicts one example of three possible insertion locations for a segment according to one embodiment.

Each candidate segment may have up to three types of insertion locations into the IPG based on the locations of segments already in the IPG, as illustrated in FIG. 35. First, if the candidate segment starts at the MSWM value, then the only possible insertion location is to append the segment (unchanged) into the IPG. Second, if the candidate segment starts prior to the MSWM value and intersects one or more of the already present segments of the IPG, then each intersection point is another possible insertion location. Inserting a segment at an intersection point also results in accordingly resizing the candidate segment to start at the intersection point and resizing/removing the already present segments to end at the intersection point. Third, if the candidate segment starts at the lower bound of the work metric range, then another possible insertion location is to remove all of the existing segments and replace the entire IPG with the candidate segment. Note that segment insertion considers only these insertion locations to guarantee that the IPG will have a segment for every valid work metric value and to minimize the number of discontinuities (i.e., jumps in execution time between segments). Note that inserting a segment that starts at the MSWM value may result in a jump in execution time in the IPG, but does not leave any work metric values without a corresponding segment as no valid work metric values exist between the MSWM value and the work metric value of the frontier point.

Segment insertion individually compares the IPGs that would result from inserting each candidate segment at each of its possible insertion locations to determine which segment and insertion location is the overall best, as determined by the set of criteria below. First, the IPG that results in the fewest number of samples with significant error is better. Segment insertion considers a sample to have significant error if the difference between the sample's execution time and the execution time estimated by the IPG is larger than a threshold specified by a heuristic parameter called the sample error threshold (SET) parameter. The SET parameter is specified both as an error percentage and with optional absolute bounds on the minimum and maximum allowed error. Second, for IPGs with equal number of samples with significant error, the IPG that ends at a larger work metric value is better. Third, the IPG with the least number of segments is better. Lastly, for IPGs that are equal for all of the previous criteria, the IPG with the lowest mean-squared-error percentage between the samples' execution times and the execution time estimated by the IPG is better. Segment insertion then inserts the winning segment into the IPG for the next step of the IA Heuristic.

The segment commitment step occurs last in every iteration and commits segments once they move a specified number of segments to the left of the frontier point. Once a segment is committed, segment insertion may no longer resize of remove the segment as part of the process of inserting a new candidate segment into the IPG. Additionally, segment commitment removes the segment's corresponding samples from the regression matrix, reducing memory overhead and improving efficiency for later iterations.

Figure 36:
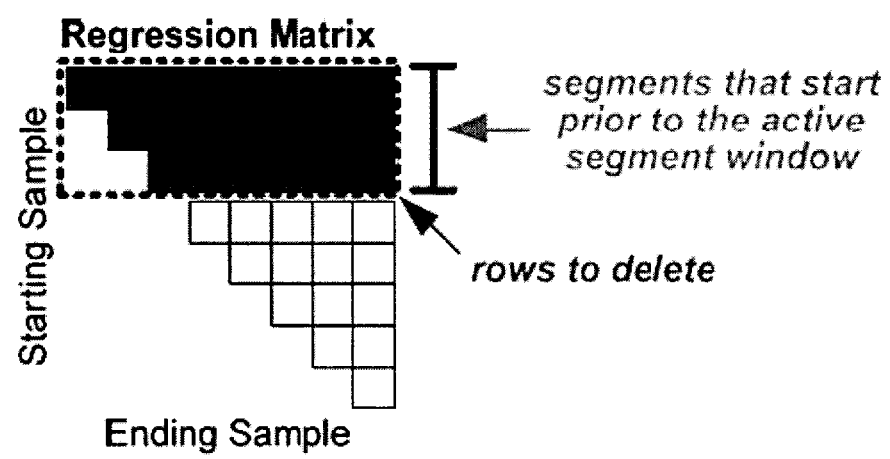
FIG. 36 illustrates removing top rows of a regression matrix during segment commitment according to one embodiment.

After several iterations, the number of samples in the regression matrix may get large. Correspondingly, the segment identification step, which analyzes the cells in the regression matrix to identify candidate segments, may involve more processing overhead to analyze the greater number of potential starting and ending locations for the candidate segments. To prevent this overhead from becoming prohibitive, the segment commitment step may gradually remove rows from the top of the regression matrix corresponding to starting locations far to the left of the frontier point. As the row index of the regression matrix corresponds to the starting sample of the corresponding linear regression analysis (indexed in increasing work metric order), removing an entire row from the top of the regression matrix is equivalent to preventing segment identification from considering segments which start at the corresponding sample's work metric value. As illustrated in FIG. 36, segment commitment removes all of the top rows corresponding to starting locations within the work metric interval of any segment that moves more than a certain number of segments to the left of the frontier point, with the number of segments specified by a parameter called the active segment window parameter. In other words, only the segments within the active segment window allow changes because segment identification can consider starting locations that correspond to cells in the regression matrix, and segment commitment removes all of the cells corresponding to starting location that would overlap segments not in the active segment window.

All four steps of the IA Heuristic repeat and continue to progress the frontier point—with sample collection collecting samples after the frontier point, segment identification identifying candidate segments that may connect with the segments in the active segment window, segment insertion inserting only the best candidate segment into the IPG, and segment commitment eventually preventing further changes to segments far to the left of the frontier point—until the frontier point finally progresses to the upper-bound of the work metric range. At this point, a segment of the IPG will exist to estimate the execution time for any valid work metric value within the work metric range of the IPG and the IA Heuristic is complete.

To assess the IA Heuristic, the heuristic was implemented as described herein and 33 different implementations were created to use as inputs. The heuristic and CPU-based implementations were written in C++ and compiled using g++ (version 4.4.3 on Delta, 4.1.2 on Elastic, and 4.3.3 on Marvel) with -O3 optimizations. The FPGA-based implementations were written in VHDL and compiled using ALTERA QUARTUS II version 9.1 (when targeting Elastic's FPGA) or XILINX ISE 9.1 (when targeting Delta's FPGA). Lastly, the GPU-based implementations were written in CUDA using compute capability 1.3 and compiled using nvcc release 4.0 (version 0.2.1221).

The IA Heuristic was evaluated on three diverse systems. The first system, named Delta, consists of a hyper-threading 3.2 GHz INTEL XEON CPU, 2 GB of RAM, and a XILINX VIRTEX IV LX100 FPGA located on a NALLATECH H101-PCIXM board. Hyperthreading makes Delta appear as though it has two cores, but the cores must partially contend for the same processing resources. The second system, named Elastic, consists of a 2.8 GHz quad-core INTEL XEON W3520 CPU, 12 GB of RAM, an ALTERA STRATIX-III L340 FPGA located on a GIDEL PROCE III board, and two dual-chip NVIDIA GTX-295 graphics cards (totaling four GPUs). The third system, named Marvel, consists of eight 2.4 GHz dual-core AMD OPTERON 880 CPUs (16 cores total) and 32 GB of RAM.

TABLE VII

[DESCRIPTIONS OF THE FUNCTIONS AND THEIR ADAPTERS]

| Function Name | Function Description | Adapter's Work Metric Mapping |
|---|---|---|
| 2D Convolution | Convolves two fixed-point matrices, both of arbitrary dimensions. | Work metric equals product of dimensions of output matrix and dimensions of second input matrix (i.e., the sliding window). |
| Circular Convolution | Circularly convolves two floating-point arrays of arbitrary length. | Work metric equals product of lengths of two input arrays. |
| Convolution | Convolves two floating-point arrays of arbitrary length. | Work metric equals product of lengths of two input arrays. |
| Inner Product | Calculates the inner product of two floating-point arrays of the same length. | Work metric equals length of either input array. |
| Matrix Multiply | Multiplies two floating-point matrices of arbitrary (but compatible) dimensions. | Work metric equals product of dimensions of first matrix and number of columns of second matrix. |
| Mean Filter | Applies an averaging filter to a floating-point matrix, both with the filter and matrix of arbitrary dimensions. | Work metric equals product of dimensions of output matrix and dimensions of filter. |
| Optical Flow | Calculates the sliding-window average difference between two fixed-point matrices and returns the two most significant points, | Work metric equals product of dimensions of output matrix and dimensions of second input matrix (i.e., the sliding window). |

TABLE VII-continued

[DESCRIPTIONS OF THE FUNCTIONS AND THEIR ADAPTERS]

| Function Name | Function Description | Adapter's Work Metric Mapping |
|---|---|---|
| Prewitt | both of arbitrary dimensions. Applies a 3 × 3 Prewitt edge detection filter to a matrix of 24-bit RGB pixels of arbitrary dimensions. | Work metric equals product dimensions of output matrix. |
| Sort (Heap Sort, Insertion Sort, Quick Sort) | Sorts a floating-point array of arbitrary length. | Work metric equals length of input array. |
| Sum of Absolute Differences (SAD) | Calculates the sliding-window average difference between two fixed-point matrices, both of arbitrary dimensions. | Work metric equals product of dimensions of output matrix and dimensions of second input matrix (i.e., the sliding window). |

The 33 implementations implement 10 different functions, listed in Table VII. The table includes a description of each function and a description of the work metric mapping used to create the adapter. The functions were selected from diverse problem domains, including linear algebra, image processing, and graph analysis, to stress the IA Heuristic with implementations requiring different types of invocation parameters and algorithms of different time complexities. Note that each function consists of between two and five implementations.

The 33 implementations were provided as inputs to the IA Heuristic and the IPG creation time and estimation accuracy were measured. To differentiate the implementations, the naming convention of starting with the name of the function (except for sort which instead specifies the algorithm) and adding a designation specifying the execution device was employed. All non-heterogeneous implementations are single-threaded unless they end with (MT) which specifies they are multi-threaded. The heterogeneous implementations specify the particular heterogeneous device on which they execute.

TABLE VIII

[WORK METRIC RANGE AND RESULTING IPG CREATION TIME FOR EACH IMPLEMENTATION]

| Implementation Name | Work Metric Range | IPG Creation Time (seconds) Delta | Elastic | Marvel |
|---|---|---|---|---|
| Non-Heterogeneous Implementations ||||| 
| 2D Convolution | [0, 4.864e8] | 29.2 | 23.1 | 28.6 |
| 2D Convolution (MT) | [0, 4.864e8] | 40.4 | 7.1 | 2.4 |
| Circular Convolution | [1, 1.536e9] | 129.6 | 61.2 | 55.2 |
| Circular Convolution (MT) | [0, 1.536e9] | 100.1 | 12.2 | 4.1 |
| Convolution | [0, 2.048e9] | 100.3 | 48.3 | 74.7 |
| Convolution (MT) | [0, 2.048e9] | 112.6 | 12.7 | 5.4 |
| Heap Sort | [0, 5.000e6] | 69.0 | 25.2 | 62.6 |
| Inner Product | [0, 1.000e7] | 18.7 | 5.4 | 10.4 |
| Inner Product (MT) | [0, 1.000e7] | 39.0 | 7.8 | 9.3 |
| Insertion Sort | [0, 6.500e4] | 63.1 | 33.8 | 42.8 |
| Matrix Multiply | [1, 1.638e9] | 83.9 | 42.9 | 65.1 |
| Matrix Multiply (MT) | [1. 1.638e9] | 78.5 | 12.6 | 7.1 |
| Mean Filter | [0, 1.600e9] | 105.3 | 45.9 | 97.7 |
| Mean Filter (MT) | [0, 1.600e9] | 107.2 | 9.6 | 9.0 |
| Optical Flow | [0, 9.366e8] | 74.0 | 38.8 | 45.9 |
| Optical Flow (MT) | [0, 3.746e9] | 361.1 | 43.0 | 13.4 |
| Prewitt | [0, 1.000e8] | 322.5 | 107.0 | 223.6 |
| Prewitt (MT) | [0, 1.000e8] | 504.9 | 114.7 | 123.8 |
| Quick Sort | [0, 1.000e7] | 59.3 | 25.4 | 27.8 |
| SAD | [0, 9.366e8] | 71.3 | 38.2 | 49.4 |
| SAD (MT) | [0, 3.746e9] | 344.7 | 64.7 | 13.0 |
| Heterogeneous Implementations ||||| 
| 2D Convolution (Elastic GPU) | [0, 4.864e8] | | 2.0 | |
| Circular Convolution (Delta FPGA) | [0, 1.536e9] | 35.1 | | |
| Circular Convolution (Elastic GPU) | [0, 1.536e9] | | 2.1 | |
| Convolution (Delta FPGA) | [0, 1.843e9] | 41.4 | | |
| Convolution (Elastic FPGA) | [0, 2.048e9] | | 1.2 | |
| Convolution (Elastic GPU) | [0, 2.048e9] | | 1.7 | |
| Inner Product (Delta FPGA) | [0, 1.049e6] | 2.4 | | |
| Matrix Multiply (Delta FPGA) | [1, 1.638e9] | 134.2 | | |
| Matrix Multiply (Elastic GPU) | [1, 1.638e9] | | 24.4 | |
| Mean Filter (Elastic GPU) | [0, 1.600e9] | | 4.0 | |
| Optical Flow (Elastic GPU) | [0, 3.746e9] | | 12.0 | |
| SAD (Elastic GPU) | [0, 3.746e9] | | 13.5 | |
| Overall Average | | 121.1 | 29.0 | 46.3 |

Table VIII lists the work metric range and IPG creation time for each implementation. The table divides the implementations depending on whether they are non-heterogeneous or heterogeneous. Note that the heterogeneous implementations are executable on the specific system they support, while the non-heterogeneous implementations (e.g., C++ code) are executable on all systems. The work metric range was determined such that each implementation took around 3 seconds to complete when executing on a single-thread at the largest work metric value. The IPG creation time is measured as the total time used for the heuristic to analyze the implementation and create the IPG, including the time spent repeatedly executing the implementation during sample collection.

As illustrated in the table, the IPG creation time is quick for most implementations and systems. Despite the implementations taking a few seconds to execute at larger work metric values, the maximum IPG creation time was less-than 10 minutes. Additionally, 48 out of the 75 IPGs (64%) took less than 1 minute for the heuristic to create. The fastest IPG creation time required only 1.2 seconds.

The large variance in the IPG creation time is primarily due to the differing speeds of the systems. A faster system requires less time to execute the implementation, even for the same invocation parameters. The Elastic system, which is the fastest system, required an average of only 29 seconds to create an IPG. The slowest system, Delta, averaged around 121 seconds. The Marvel system was in the middle and averaged 46 seconds.

Figure 37:
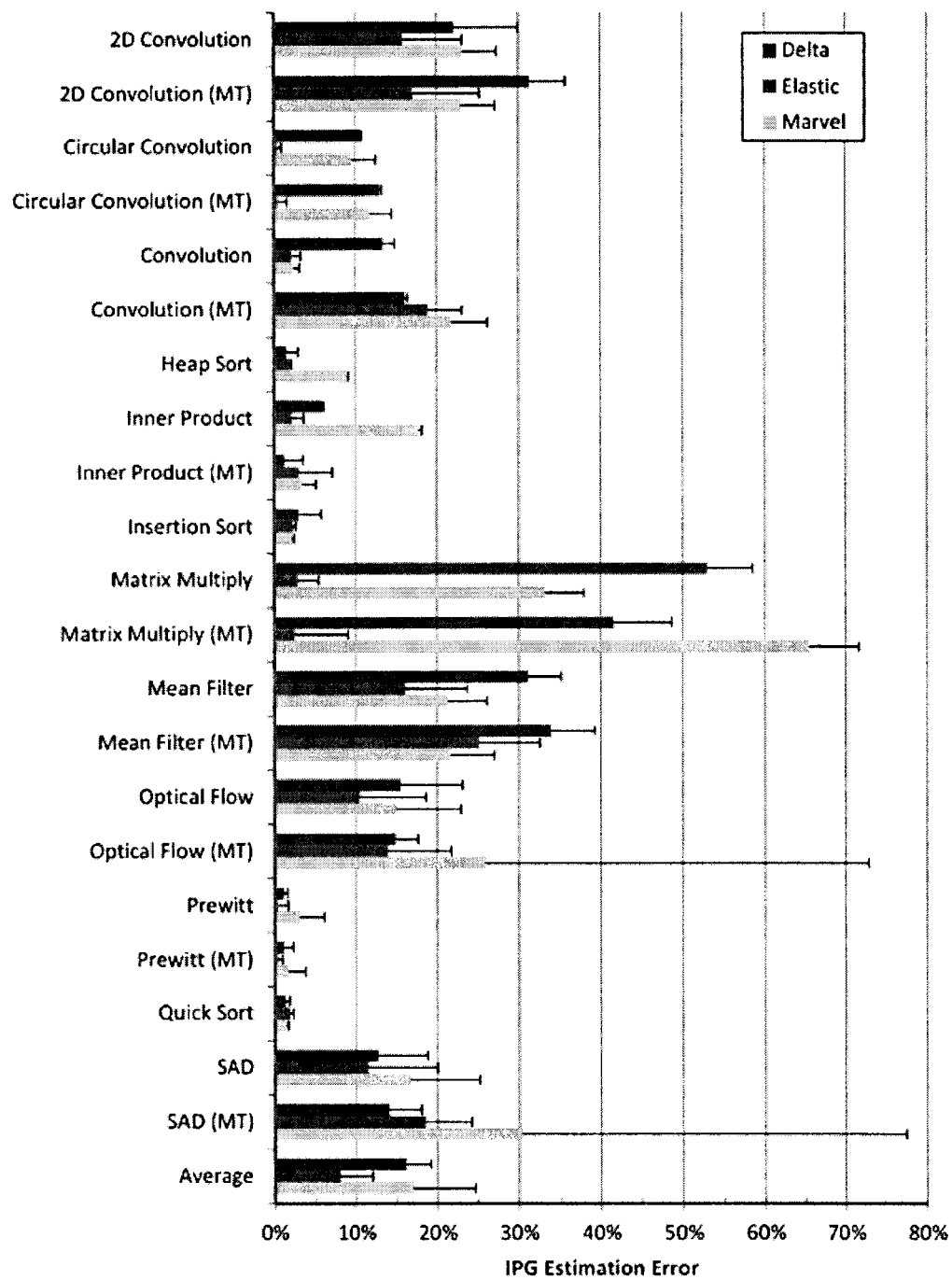
FIG. 37 is a bar graph depicting one example of estimation error for an implementation performance graph for 250 random invocations of each of multiple non-heterogeneous implementations according to one embodiment.
Figure 38:
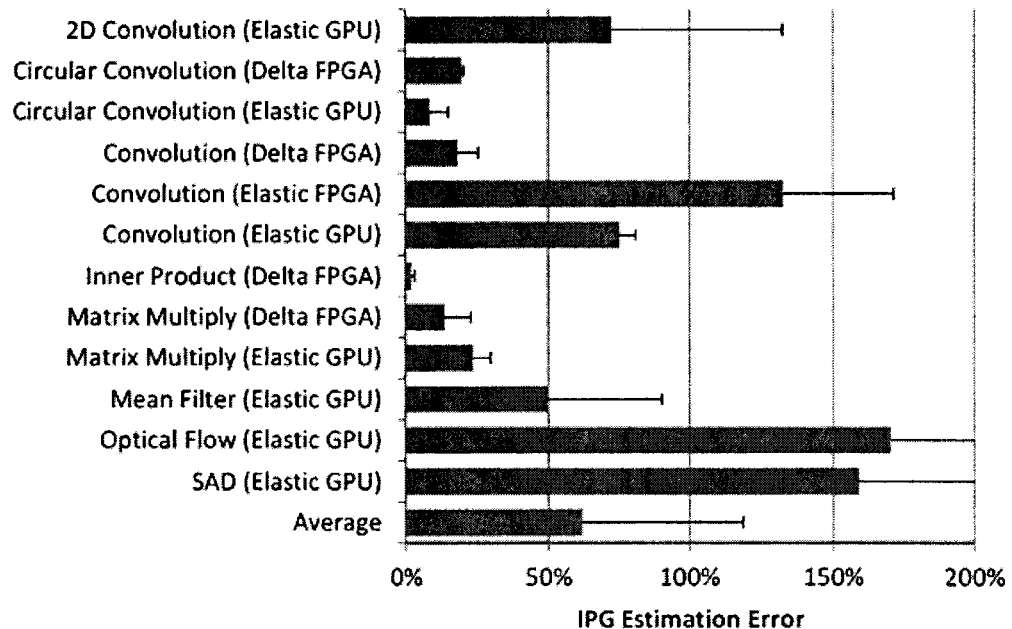
FIG. 38 is a bar graph depicting one example of estimation error for an implementation performance graph for 250 random invocations of each of multiple heterogeneous implementations according to one embodiment.

FIG. 37 and FIG. 38 illustrate the average percentage of estimation error for each implementation's IPG. The estimation error was calculated by averaging the percent difference between the measured and estimated execution time for 250 invocations of the implementations with random invocation parameters, generated by a Gibbs sampler. For all random invocations, we stress all degrees of freedom of the invocation parameters, such as using arrays with random lengths, matrices with random dimensions, and initializing all data structures with random values.

As illustrated in FIG. 37, the IPG estimation error for the non-heterogeneous implementations varied widely between the different implementations and systems. 12 out of the 21 implementations (57%) had an IPG with an error of less-than 5% on at least one system, and only the matrix multiply implementations had IPGs with error larger than 35%. The largest error percentage for any IPG was 65%. In most cases, the single-threaded versions of implementations produced an IPG of lesser error than their multi-threaded counterparts, due to the increased variability when executing on multiple cores.

The IPG estimation error for the non-heterogeneous implementations was strongly dependent on the executing system. The fastest system, Elastic, achieved an average estimation error of only 8%, while the slower systems of Delta and Marvel had average errors of 16% and 17% respectively. This discrepancy between the systems is due to the older systems having a larger penalty for a cache miss, resulting in a larger variance of execution time.

As illustrated in FIG. 38, the IPG estimation error for the heterogeneous implementations varied even more significantly than the non-heterogeneous implementations. The IPG with the least error was for the Inner Product (Delta FPGA) implementation, which achieved an error of only 2%. The IPG with the largest error was for the Optical Flow (Elastic GPU) implementation having an error of 171%. 6 out of the 12 IPGs achieved an error of less-than 25% and only three IPGs had an error of over 100%. The variance varied significantly even in different implementations of the same function with the three convolution IPGs having errors of 18%, 75%, and 133%. Note that while these error percentages may be too large for some types of analyses, different heterogeneous implementations typically have order-of-magnitude differences in execution time, making even a 133% discrepancy in execution time for an implementation relatively small.

The reason for the large IPG estimation error is due to two main reasons. The first reason, which is especially evident for the non-heterogeneous implementations, is that some of the implementations have larger invocation-parameter spaces, which increases the difficulty of the work metric mapping to remain consistent over all possible invocation parameters. As illustrated in FIG. 37, the implementations that accept two matrices for their inputs, (i.e., 2D Convolution, Matrix Multiply, Optical Flow, and SAD) all tended to exhibit larger errors than those that only accepted two input arrays (i.e., Circular Convolution, Convolution, and Inner Product). The larger invocation-parameter space results in the work metric mapping needing to coalesce more invocation parameters to the same work metric value, thereby resulting in a larger variance for the execution time.

The second reason for the large IPG estimation error is that heterogeneous devices have numerous design and system factors that can significantly influence their execution time. Design factors include how efficient the heterogeneous implementation executes over the full range of invocation parameters. For example, some GPU implementations, which internally rely on partitioning computation over possibly hundreds of light-weight threads, may not execute as efficiently unless certain dimensions of the input parameters are multiples of the number of threads (e.g., the image for a 2D convolution implementation having a width that is a multiple of the number of threads). System factors include the overhead of communicating and synchronizing with the heterogeneous device, which at times can require more time than the computation itself. As listed in Table VII, the work metric mappings of all the implementation adapters were based on the asymptotic analysis technique, which assumes the execution time of an implementation is largely dependent on the amount of computation it requires.

Assumptions are implemented on the invocation parameters by changing the adapters to set some of the input parameters for the implementation to a fixed value. Partially fixing the parameters reduces the number of possible parameter combinations for which the IPG estimates execution time and accordingly reduces the size of the invocation-parameter space.

To analyze the effect of this mitigation technique, IPG accuracy results for the six heterogeneous implementations executable on the Elastic system were recollected, and one of the input parameters for each implementation were partially restricted to a value typical for that function. For the 2D convolution implementation one of the matrices was fixed to be of size 16×16. For the convolution implementations, one of the input parameters was fixed to be of length 2048. For the mean filter implementation, the filter size was fixed to be of size 16×16. Lastly, for the optical flow and SAD implementations, one of the matrices was fixed to be of size 45×45. Note that the user of the heuristic may employ this technique by fixing the input parameters in the adapter to any values which are representative of their usage of that function.

Figure 39:
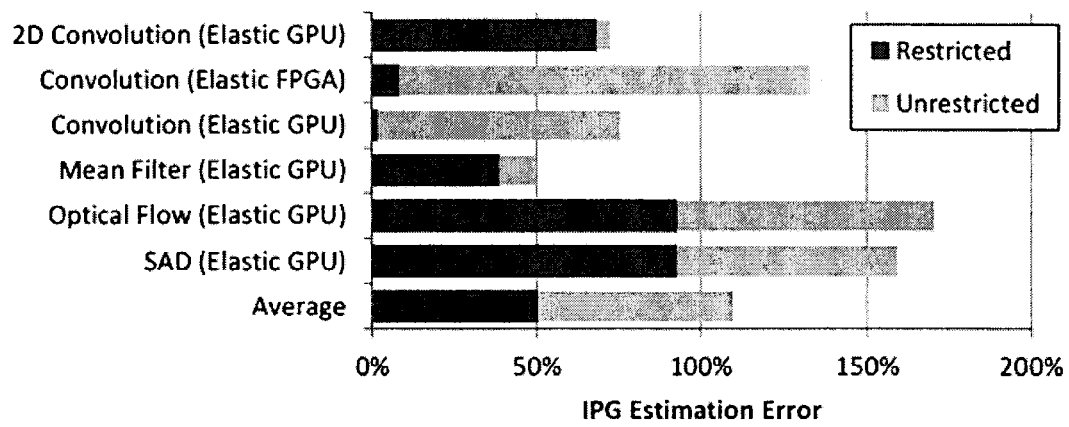
FIG. 39 is a bar graph depicting one example of estimation error for an implementation performance graph for 250 restricted and unrestricted invocations according to one embodiment.

FIG. 39 compares the restricted and unrestricted IPG estimation error for the six implementations. In all cases, the restricted implementation resulted in a more accurate IPG. The greatest reduction in error was for the IPG for the Convolution (Elastic FPGA) implementation which reduced the IPG estimation error from 133% to 8% (a 16× reduction). The least reduction in error occurred for the IPG for the 2D Convolution (Elastic GPU) implementation which reduced the error from 72% to 68%. On average, the estimation error reduced from 110% to 50%.

As demonstrated in the figure, reducing the size of the invocation-parameter space significantly reduces the IPG estimation error. This result occurs due to two main reasons. First, reducing the size of the invocation-parameter space reduces the number of invocation parameters the work metric mapping coalesces. Second, those invocation parameters which are coalesced tend to be more similar as they come from a smaller subset of the total invocation-parameter space. As a result, the variance in execution time reduces for coalesced invocation parameters, which improves the effectiveness of the work metric mapping.

While the IA Heuristic incorporates several tunable parameters, the most likely parameter a user would customize is the SETS and METS parameter values, which jointly determine the average spacing between samples. The sample collection step uses the SETS parameter when extrapolating which work metric value it should collect a sample for next. The segment identification step then uses the METS parameter to specify the maximum execution time spacing between any two sequential samples. The METS and SETS parameter values are jointly referred to as the execution-time spacing (ETS) parameters.

To analyze the effect of the ETS parameters, IPG timing and accuracy results were recollected for all of the non-heterogeneous implementations while sweeping the METS and SETS parameters. The SETS parameter value was swept from 5% to 25% and the METS parameter value was set to double the value of the SETS parameter. This technique is used to promote the sample collection step (which uses the spacing specified by the SETS parameter) to collect samples with a close enough spacing to pass the checks of the segment identification step (which uses the larger spacing specified by the METS parameter) despite any incorrect assumptions made during extrapolation.

Figure 40:
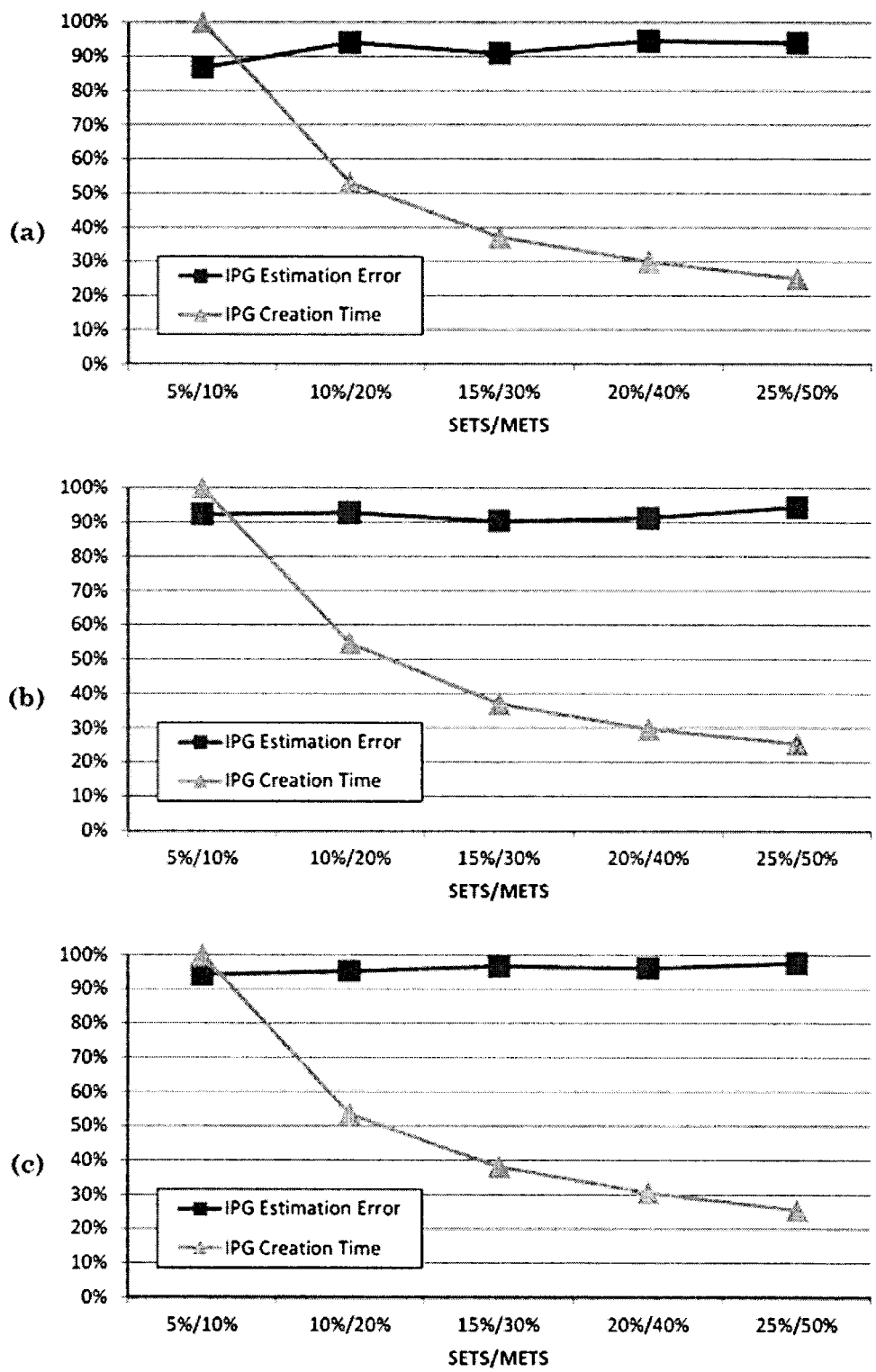
FIG. 40 illustrates examples of the normalized change in implementation performance graph estimation error and creation times for different values on three exemplary systems according to one embodiment.

FIG. 40 illustrates the effect of the different SETS/METS parameter values on the average IPG estimation error and creation time. The results were calculated by first normalizing the values across the different IPGs for each implementation and then by averaging across all of the IPGs on a system. As illustrated in the figure, the ETS parameters have only a small effect on the estimation error of the IPG. While increasing the parameters, the estimation error changed an average of less-than 8%. On all three systems, the fluctuations in estimation error were not linear, but a general increasing of error is noticeable as the SETS/METS values are increased. The lack of a more significant increase in error may be due to the confidence interval checks in the segment identification step still providing a good measure of whether or not to accept a segment, regardless of the spacing between samples. While the ETS parameters had only a small effect on the IPG estimation error, the parameters did have a significant effect on the IPG creation time. As illustrated in the figure, the IPG creation time dropped nearly exponentially as the ETS parameters were increased. This decrease in creation time may be due to the increased spacing between the samples at larger SETS/METS values requiring fewer samples to create the IPG. Fewer samples use fewer executions of the implementations and thereby can significantly reduce IPG creation time.

Next, another embodiment of an optimization planning tool 106 (FIG. 1) will be described. RACECAR is a heuristic for multi-core, heterogeneous function specialization. The inputs to the heuristic are a set of implementations, parallelizing implementations, and additional information describing the function and resources available on a system. Note that the heuristic is not required to know the specific input parameters to the function beforehand, as the heuristic instead determines efficient ways to execute the function for all possible input parameters. The operation of the heuristic, discussed later, then analyzes the performances of the different implementations and iteratively builds data structures that specify how to efficiently execute the function for any set of parameters. The heuristic saves the resulting data structures for use by compiler or runtime tools to make efficient implementation decisions for any specific call to the function.

Figure 41:
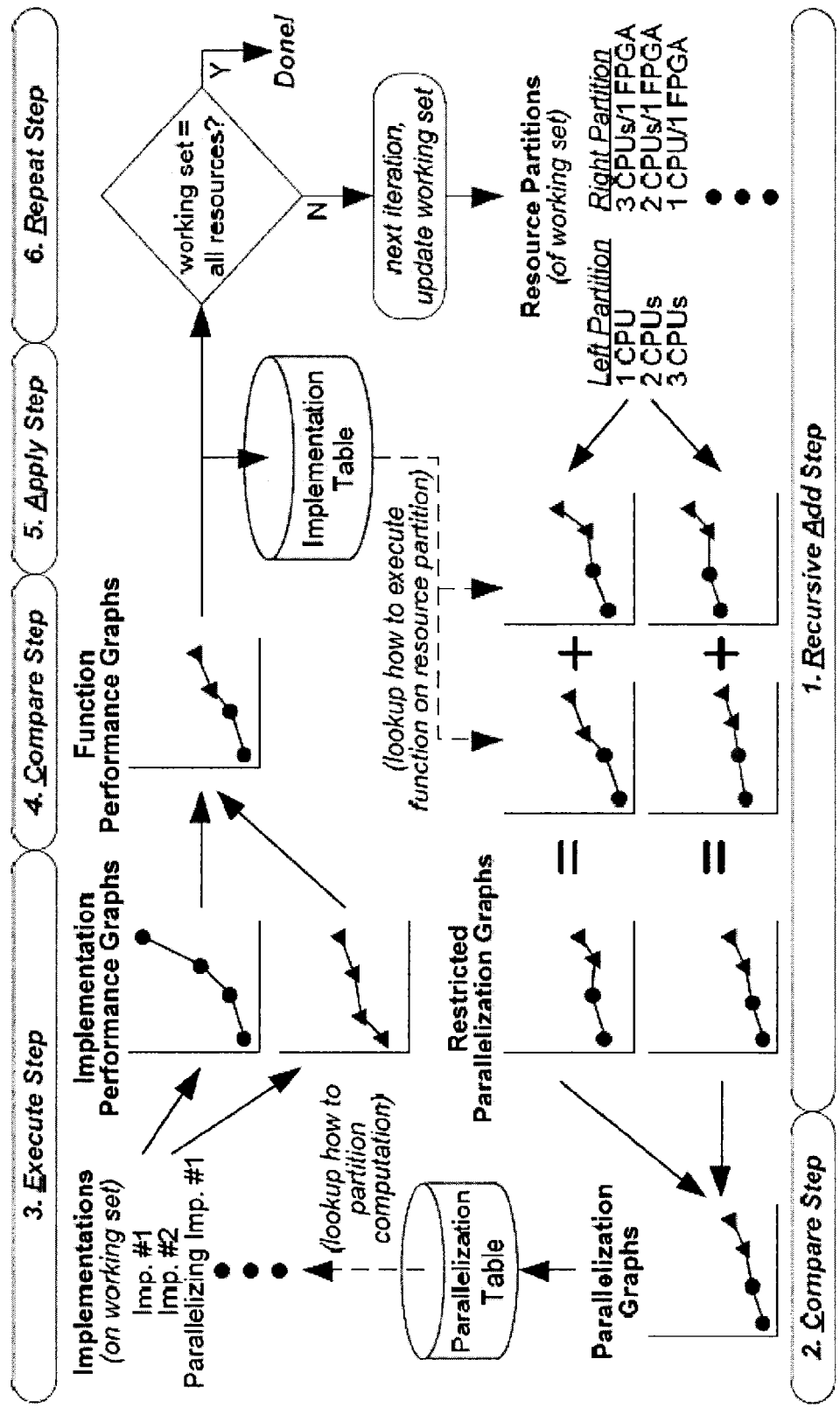
FIG. 41 illustrates an example of the high-level steps of the RACECAR heuristic according to one embodiment.

The output of RACECAR is not an explicit implementation tree, but instead two data structures called the implementation table and the parallelization table. The implementation table, when provided with input parameters and an optional restriction on available system resources, returns the implementation that RACECAR estimates to provide the best performance. Any executing parallelizing implementations may then use the parallelization table to determine how to efficiently partition their computation. Note that an implementation tree could be generated from these data structures for known input parameters. RACECAR consists of six iterative steps, illustrated in FIG. 41, that correspond to letters in the RACECAR acronym—Recursive Add, Compare, Execute, Compare, Apply, and Repeat. These steps are listed in order, but the first two steps occur after the first iteration, and therefore are not described until later.

For each iteration, the heuristic optimizes for a specified subset of the system's resources, called the iteration's working set. Initially, the working set is a single CPU, but at the end of each iteration, the heuristic gradually grows the working set until it comprises of all system resources. The "execute" step considers all implementations that may execute on the current working set and measures their execution times, which it uses to generate a performance-estimation data structure called an implementation performance graph. Following which, the "compare" step combines the created implementation performance graphs into a function performance graph, which stores information on only the most efficient implementations of the function. The "apply" step then saves the function performance graph into the implementation table. If the working set does not comprise of all system resources, then all six steps will "repeat" using a larger working set. Using the new working set, the "recursive add" step then considers all possible ways to partition the resources for the current working set, looks up the corresponding function performance graphs, and performs an "adding" operation to generate a restricted parallelization graph, which specifies how to partition computation for that division of resources. Following which, the "compare" step then combines the restricted parallelization graphs into a parallelization graph, which may inform a parallelizing implementation of how to efficiently partition resources and computation. All six steps iterate until RACECAR evaluates a working set comprising of all resources.

The "execute" step of RACECAR determines the performances of each implementation executable in the current working set by generating an implementation performance graph. Each implementation performance graph specifies the estimated execution time of an implementation invoked with different work metrics, which are abstractions of the function's input parameters.

RACECAR is, by design, not specific for any type of function, and therefore can make no assumptions about the structure of the input/output parameters or the performance characteristics of the implementations. As a result, abstraction is required to represent and interpret the function's input parameters.

The work metric is an abstraction of the input parameters that maps the potentially complex input parameter-space of a function into a single numeric value. The mapping also allows for a comparative measure of the amount of work required to process the parameters and, likewise, effectively groups together collections of parameters that exhibit similar performances. For example, most sorting implementations have an execution time that is related to the number of elements to sort (i.e., sorting more elements requires more time). As a result, an effective mapping is to set the work metric equal to the number of elements to sort. Note that the mapping only requires the work metric to be related, but not necessarily proportional, to the execution time.

In some cases, functions may use more complicated work metric mappings. For example, a matrix multiply function uses two input matrices, both of which significantly affect execution time. However, even in these cases, an asymptotic analysis of the performance of the function typically allows for the creation of an effective work metric. For matrix multiply, the asymptotic analysis reveals that the execution time is proportional to the product of specific dimensions of the input matrices, allowing for the calculated product to be a work metric. Although work metrics have been found for many complex scenarios, there may be situations where an effective work metric does not exist.

To create an implementation performance graph for an implementation, RACECAR utilizes the planner heuristic, which relies on sampling the execution time of the implementation at different work metrics to extrapolate the relationship between work metric and execution time. Note that by relying on actual execution time measurements, the planner heuristic captures both the computation and communication times in the estimated execution time.

An implementation performance graph may be visualized as a two-dimensional piece-wise linear graph that maps work metric to execution time. Estimating the execution time of an implementation using this graph simply involves calculating the work metric associated with the input parameters and looking up the corresponding execution time for that work metric. The simplistic structure of the graph allows for very efficient lookups by performing a binary search, and supports the performing of further analyses, such as those in RACECAR.

The "compare" step of RACECAR compares the implementation performance graphs of the implementations that are executable within the current iteration's working set, and then combines them to create a function performance graph, which stores information about only the most efficient implementation for executing the function at different work metrics. Any implementation performance graph created during the current iteration's "execute" step is considered, as well as any previously generated implementation performance graphs that correspond to implementations executing within proper subsets of the working set's resources. The order in which the working set is incremented guarantees that RACECAR would have already iterated through all subsets of the resources beforehand, allowing the heuristic to simply retrieve those implementation performance graphs.

Figure 42:
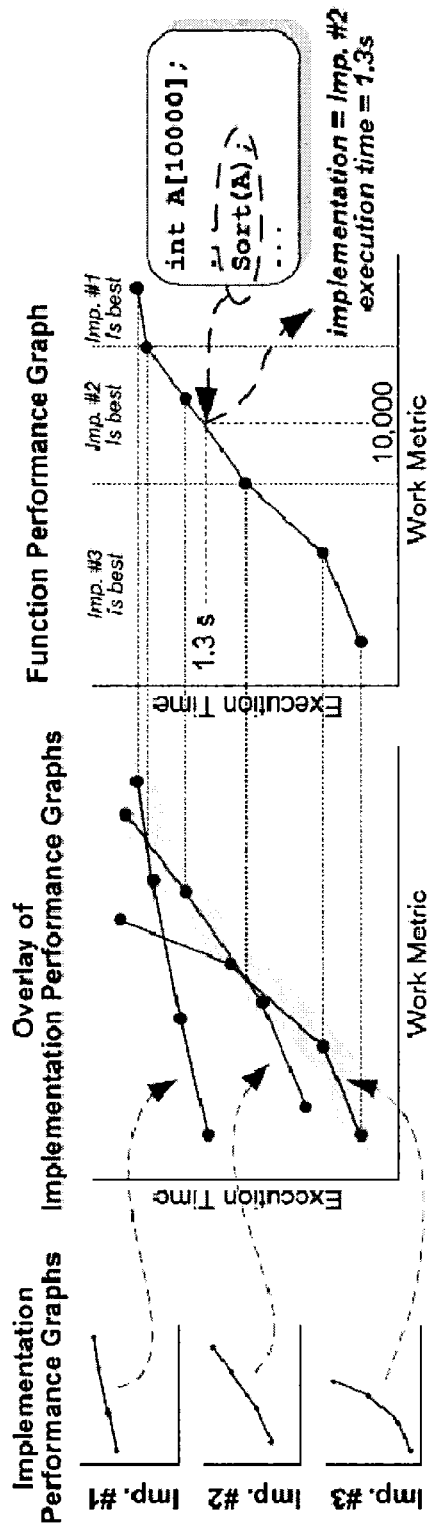
FIG. 42 illustrates one example of creating a function performance graph according to one embodiment.

Creating a function performance graph from a set of implementation performance graphs is a straight-forward process due to the simplicity of the graphs. As the mapping from input parameters to work metric is consistent for all of the graphs, the interpretation of the x-axis is also consistent, and locating the best performing implementation involves locating the graph with the lowest execution time at a work metric. As illustrated by FIG. 42, RACECAR performs this process for all work metric values by overlaying the implementation performance graphs and saving only the collection of segments and intersection points that trace the lowest boundary, which is called the lowest envelope of the graph. To perform this process, RACECAR uses a modified Bentley-Ottmann computational geometry algorithm that starts at the lowest work metric value, determines which implementation performance graph is the best performing, and then proceeds with a sweep-line that checks for when another graph might outperform the current best by locating intersection points between the segments of the graphs. In addition to the lowest envelope, the algorithm also saves information about which implementation sourced the corresponding segment.

Unlike the implementation performance graphs, which are associated with individual implementations, a function performance graph is associated with the function. A lookup of a work metric within the function performance graph returns the most efficient implementation of the function, using any of the provided implementations executing within the associated resources. The heuristic then saves the function performance graph in the "apply" step as part of the implementation table.

The "recursive add" and "compare" steps of RACECAR inform the parallelizing implementations of how to efficiently partition their computation across different resources by generating a parallelization graph. The parallelization graph informs the parallelizing implementations of what resources to use and how much computation to apportion for each of their recursive function calls. RACECAR creates the parallelization graph in two steps. First, the "recursive add" step creates a restricted parallelization graph, which answers how much computation to apportion for a fixed partitioning of resources. Second, the "compare" step then combines the restricted parallelization graphs to form the parallelization graph.

Figure 43:
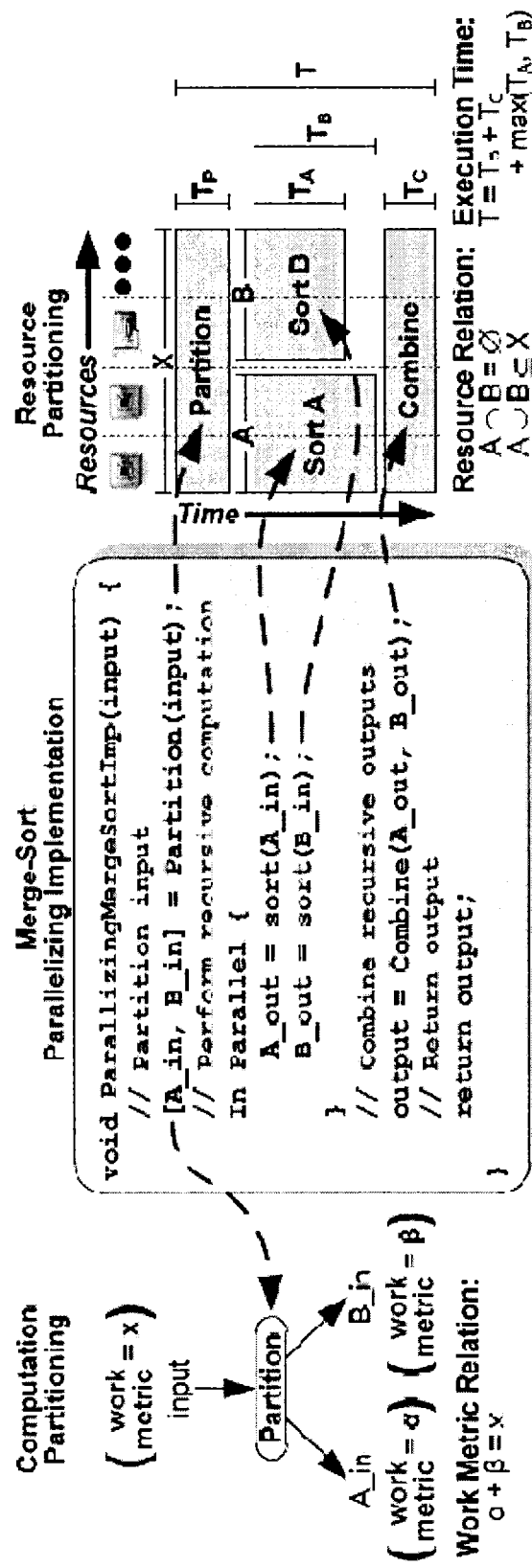
FIG. 43 depicts one example of a merge-sort parallelizing implementation demonstrating computation partitioning, resource partitioning, and calculation of the overall execution time according to one embodiment.

All parallelizing implementations may be assumed to adhere to the following parallelization strategy, as illustrated with a merge-sort example in FIG. 43. The implementation partitions the input into two subsets and then performs two parallel recursive sub-executions of the function to independently process those subsets. After the sub-executions complete, the implementation then combines the outputs to form the overall result. Divide-and-conquer, data-parallel, and other algorithms all support structuring their computation in this way. Determining the best partitioning of computation for a parallelizing implementation requires first specifying a computation's permitted partitionings. For most types of parallelizing implementations, a valid partitioning of the computation may be specified by relating the input parameters of the two recursive function calls to the overall invocation parameters of the parallelizing implementation. As RACECAR uses the abstraction of a work metric, this partitioning specification can be represented as an equation, called a work metric relation, relating the work metrics of the two recursive calls to the work metric of the invocation parameters. For example, a merge-sort parallelizing implementation assumes that the sum of the input sizes for its recursive sorts equal the overall input size of the sort. Likewise, the corresponding work metric relation would equivalently state that the sum of the recursive function call work metrics must equal the work metric of the invocation parameters, as illustrated in FIG. 43. In fact, any parallelizing implementations that sets the work metric proportional to the amount of computation and follows the structure of dividing computation (without overlap) between the two recursive function calls, would also adhere to this work metric relation, making it very prevalent in common parallelizing implementations. As a result, we refer to this as the standard work metric relation and assume that the parallelizing implementations support this relation for the upcoming discussion.

In addition to restricting the partitioning of computation, a restriction may be placed on the partitioning of the resources in various embodiments. RACECAR may specify that the apportioning of resources to the recursive calls may be from the same subset of resources allocated for the overall parallelizing implementation. As the recursive calls also execute in parallel, the two calls use distinct proper subsets of the parallelizing implementation's resources. This is referred to the resource relation.

As illustrated in FIG. 43, the execution time of a parallelizing implementation equals the time required by the partitioning and combining steps plus the maximum of the execution times of the two recursive calls. If it is assumed that the execution times of the partitioning and combining steps are relatively constant regardless of how the computation is apportioned, then minimizing the overall execution time is equivalent to minimizing the maximum execution time of the two recursive calls. Additionally, as the recursive calls execute within a proper subset of the resources in the working set, function performance graphs already exist from previous iterations to estimate the execution time of the calls. As a result, determining efficient parallelizing decisions is an optimization problem, which we call the parallelizing optimization problem (POP):

Given a work metric relation and resource relation for a parallelizing implementation, the set of execution resources allocated for that parallelizing implementation, function performance graphs for all proper subsets of the allocated resources, and the work metric of the input parameters, determine the apportioning of work metric and resources that adheres to the relations and minimizes the maximum estimated execution time of the recursive function calls.

RACECAR may not solve the POP problem for individual work metrics, but may instead create the parallelization graph to inform parallelizing implementations of how to partition computation for any work metric. Specifically, a parallelizing implementation may perform a lookup within the parallelization graph based on the invocation parameter's work metric to determine how to efficiently apportion the computation and resources between the implementation's recursive function calls.

As mentioned previously, RACECAR simplifies the creation of the parallelization graph by answering the questions of how to apportion resources and computation in two steps. The first step answers the question of how to partition the computation for a fixed partitioning of resources by creating a restricted parallelization graph. The heuristic creates a separate restricted parallelization graph for every possible resource partitioning. For example, if the working set of the current iteration was 4 CPUs/FPGA, then the heuristic would create restricted parallelization graphs for 1 CPU in parallel with 3 CPUs/FPGA, 2 CPUs in parallel with 2 CPUs/FPGA, etc. After creating all of the restricted parallelization graphs, the second step then combines the restricted parallelization graphs to form the overall parallelization graph.

Figure 44:
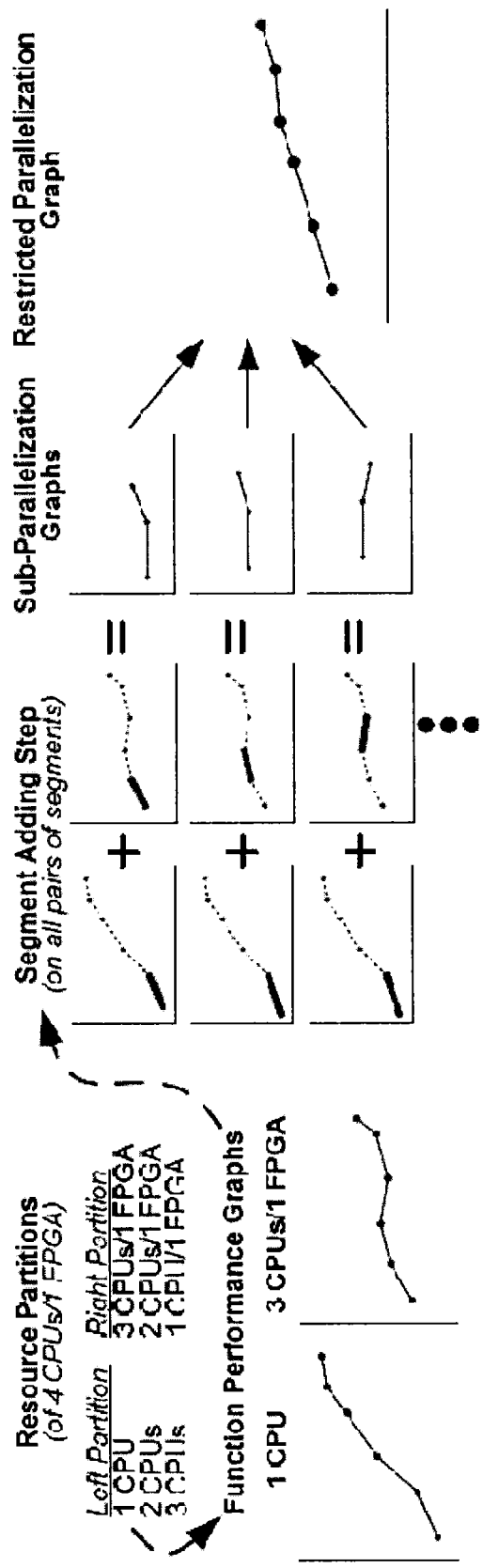
FIG. 44 depicts exemplary steps to create a restricted parallelization graph from function performance graphs according to one embodiment.

For each specific partitioning of resources, RACECAR creates the restricted parallelization graph by performing several steps, as illustrated in FIG. 44. First, the heuristic retrieves the function performance graphs corresponding to the two partitions of the specified partitioning of resources. Second, the heuristic breaks up the function performance graphs into their constituent segments. Third, the heuristic processes all possible pairings of the segments from the two graphs individually in a process called segment adding. The output of segment adding is a sub-parallelization graph, which is identical in purpose to the restricted parallelization graph, but represents the optimal solution to the POP problem given only the information provided by the pair of segments. Lastly, the heuristic then combines all of the sub-parallelization graphs to form the restricted parallelization graph, which is the globally optimal solution for the POP problem given all of the information provided by the two function performance graphs. Note that optimality is defined here only in terms of the POP problem, which specifies minimizing the maximum execution time as estimated by the function performance graphs.

TABLE IX

[THE POINTER MOVEMENT RULES USED BY SEGMENT ADDING]

| Priority | Rule |
| --- | --- |
| 1 | If both pointers are at their right endpoints, then segment adding is complete. |
| 2 | If only one pointer is not at its right endpoint, then move that pointer to the right. |
| 3 | If both pointers have negative slopes and equal y's, the move both pointers to the right. |
| 4 | If the pointer with the larger y has negative slope, then move that pointer to the right. |
| 5 | If the pointers have unequal y's, then the pointer with the larger y has a positive slope, so move pointer with the smaller y to the right. |
| 6 | The remaining case would be if both pointers have positive slopes and equal y's, so move both pointers to the right |

Figure 45:
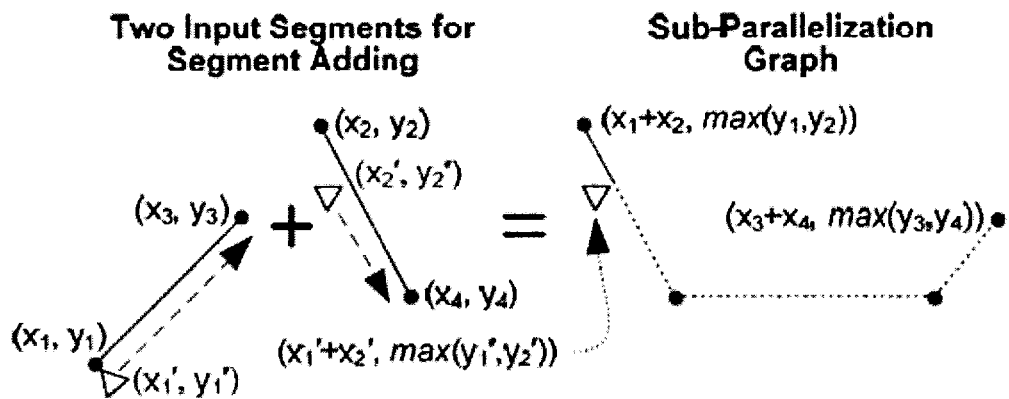
FIG. 45 illustrates one example of segment adding creating a sub-parallelization graph according to one embodiment.

Segment adding generates a sub-parallelization graph by determining the optimal way to partition computation given only the information provided by two segments. To understand the operation of segment adding, first assume that $x_1$, $y_1$, $x_2$, $y_2$, etc. correspond to the coordinates of the endpoints of the two segments, as specified by FIG. 45. By applying the standard work metric relation, those two segments can only create valid partitions for computation with work metrics ranging from $x_1+x_2$ to $x_3+x_4$. Likewise, an optimal way to partition the computation with a work metric of $x_1+x_2$ would be to partition the computation into recursive calls with work metrics of $x_1$ and $x_2$ respectively, resulting in an estimated execution time of $\max(y_1, y_2)$. Similarly, this same fact applies at the two opposite endpoints of the segments with an execution time of $\max(y_3, y_4)$ and work metrics of $x_3$ and $x_4$ being the optimal way to partition computation that has a work metric of $x_3+x_4$. Optimally partitioning the work metrics between the two endpoints may be described by first visualizing two fictitious pointers that initially start at the left endpoints of the two segments and then trace the sub-parallelization graph as the pointers move towards the right endpoints of their segments. Specifically, if the pointers are assumed to have coordinates ($x_1'$, $y_1'$) and ($x_2'$, $y_2'$), then the corresponding point in the sub-parallelization graph would have coordinates with a work metric of $x_1'+x_2'$ and an execution time of $\max(y_1', y_2')$. As the pointers start at the left endpoint of the two segments, they are initially optimal, but then the problem becomes determining which of either (or both) of the pointers to move towards the right at each step in such a way to preserve optimality. As the POP problem involves minimizing the maximum estimated execution time, the pointers undertake movements that first lower the execution time of the subparallelization graph as early as possible and secondly postpone increasing the execution time of the parallelization graph until as late as possible. All possible cases for how to move the pointers are listed in Table IX, with an example illustrated in FIG. 45. Once both pointers reach the right endpoints of their respective segments, this situation also corresponds to the right endpoint of the sub-parallelization graph, and therefore the entire subparallelization graph would have been specified during the movements of the pointers.

An informal proof of optimality may be made by induction by noting that the pointers are initially at an optimal partitioning of the computation and every move of the pointers preserves this optimality, therefore the overall result is also optimal. Note that simply applying the movements described in Table IX on the two function performance graphs themselves would not guarantee optimality, as the process involves the execution time changing consistently with the movement of the pointers.

As segment adding works by moving pointers through two straight segments, the resulting sub-parallelization graph is also a piece-wise linear graph, allowing for efficient storage and processing. Additionally, the movements of the pointers through the segments do not require a complex continuous movement, but may instead be implemented by only considering when the movements of the pointers should change. Likewise, each individual movement would correspond to the creation of a new segment in the sub-parallelization graph, and allows for an efficient implementation of the segment adding process.

The sub-parallelization graphs may be visualized as a two-dimensional graph relating the work metric of the invocation parameters to the maximum execution time of the recursive calls. Additional information about the work metrics of the recursive calls, the execution time of each call, and the implementations to use for each call is also saved in the graph. As the x-axes are consistent for all of the sub-parallelization graphs, the graphs may be combined in a process identical to the "compare" step. As each sub-parallelization graph specifies the optimal partitioning of computation restricted to the information of only two segments, and the heuristic combines sub-parallelization graphs for all possible pairings of the segments, the resulting graph, called the restricted parallelization graph, specifies how to optimally partition computation given all of the information in the two function performance graphs.

The previous discussion assumes that the standard work metric relation applies to the parallelizing implementations. The more general case of simply a linear relationship between the work metrics of the recursive calls and the invocation parameters could be represented as a work metric relation in the form of $C_1 \alpha + C_1 \beta + C_2 = x$, where $C_1$ and $C_2$ are restricted to being constant for a specified invocation parameter's work metric. Note that this form supports the case where the computation may overlap between the two recursive calls. Even in these cases, creating the restricted parallelization graph using the standard work metric relation is still valid as the parallelizing implementations can instead integrate the constants into their lookups, corresponding to a lookup of $y=(x-C_2)/C_1$.

The "compare" step of RACECAR may consider all of the restricted parallelization graphs, corresponding to the optimal parallelization with different fixed partitionings of resources, and then combine them to create the parallelization graph. As the x-axes are consistent for all of the restricted parallelization graphs, the graphs may be combined in a process identical or similar to the "compare" step. As each restricted parallelization graph specifies the optimal partitioning for a specific partitioning of resources, and the heuristic combines restricted parallelization graphs corresponding to all possible resource partitionings, the resulting graph, called the parallelization graph, specifies how to optimally partition computation and resources given all of the information in all of the supplied function performance graphs.

Figure 46:
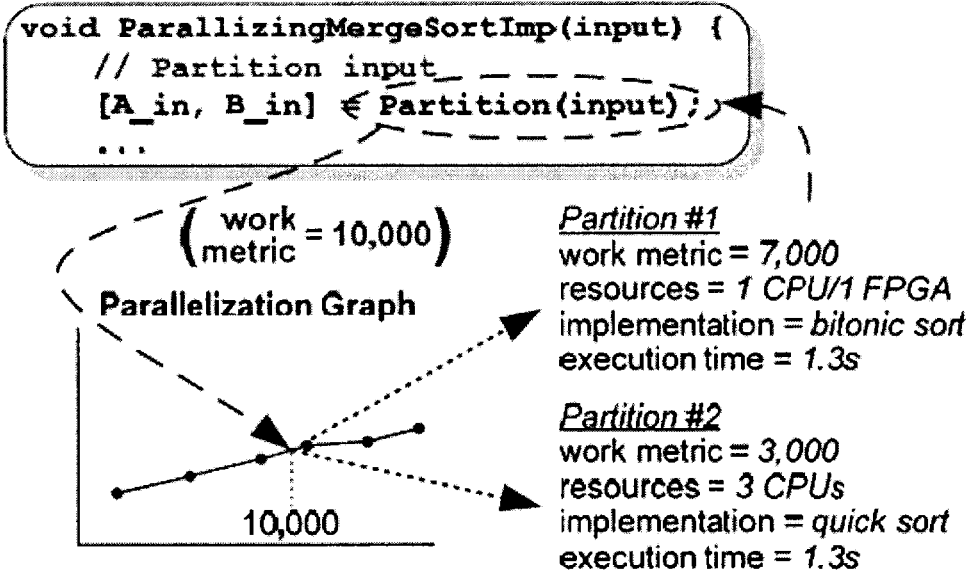
FIG. 46 illustrates one example of a merge-sort parallelizing implementation performing a lookup in a parallelization graph according to one embodiment.

When a parallelizing implementation is invoked, it performs a lookup within the parallelization graph, based on the work metric of the input parameters, to return the information to efficiently partition the computation and execute the recursive calls. For example, FIG. 46 illustrates a merge-sort parallelizing implementation performing a lookup of 10,000, corresponding to the work metric of the invocation's input parameters. The lookup returns the work metric, resources, and implementation to use for each of the recursive calls, which corresponds to the optimal selection for minimizing the maximum execution time as estimated by the function performance graphs. The parallelizing implementation may then use this information to partition the computation accordingly and invoke the recursive calls using the corresponding resources and implementations.

To assess RACECAR, eleven functions were selected and a total of thirty-three alternate heterogeneous implementations of those functions were created to use as an input for the RACECAR heuristic. Such implementations may be provided as part of a standard function library.

RACECAR and the implementations were created in a variety of programming languages depending on the execution resources. The heuristic itself and all CPU implementations were written in C++ and compiled using g++ 4.1.2. The GPU implementations were written in CUDA and compiled using NVIDIA's CUDA compiler version 3.2. Lastly, the FPGA implementations were written in VHDL and compiled using ALTERA QUARTUS II version 9.1 or XILINX ISE 9.1, depending on the target FPGA. We evaluated RACECAR on four diverse systems, three of which are heterogeneous. The first system, referred to as Gamma, consists of a 2.8 GHz quad-core INTEL XEON W3520, 12 GB of RAM, an ALTERA STRATIX-III L340 FPGA located on a GIDEL PROCE III board, and two dual-chip NVIDIA GTX-295 graphics cards (totaling four GPUs). The second system, referred to as Marvel, consists of eight 2.4 GHz AMD OPETERON 880 dual-core processors and 32 GB of RAM. The third system, referred to as NOVO-G, is a node of the NOVO-G supercomputer and consists of a quad-core INTEL XEON E5520, 6 GB of RAM, and four ALTERA STRATIX-III E260 FPGA's located on a GIDEL PROC-STAR III board. The fourth system, referred to as Delta, consists of a 3.2 GHz INTEL XEON, 2 GB of RAM, and a XILINX VIRTEX IV LX100 FPGA located on a NALLATECH H101-PCIXM board.

In this section, we evaluate RACECAR using convolution for the Gamma system, which combines microprocessors, GPUs, and an FPGA. Convolution is a common mathematical operation used in a variety of scientific and engineering domains, including signal processing, differential equations, and statistics. As convolution is normally applied to very large inputs, accelerating the convolution function is applicable to numerous applications.

To assess RACECAR for accelerating convolution, five convolution implementations were created using both time-domain and frequency-domain algorithms. First, implementations for both single and multi-threaded convolutions were created using the traditional time-domain convolution algorithm. Second, a GPU implementation was created also using the time-domain algorithm. Third, an FPGA implementation was created using the frequency-domain convolution algorithm. Lastly, a parallelizing implementation was created using the overlap-add algorithm to parallelize computation. In addition to the implementations, a work metric mapping was created that sets the work metric equal to the product of the sizes of the two convolution input operands.

Figure 47:
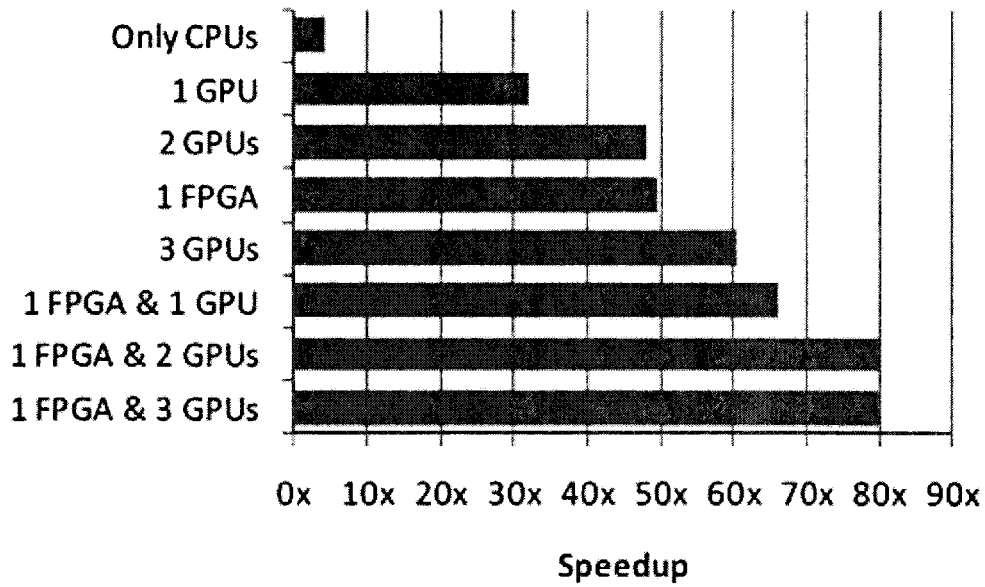
FIG. 47 is a bar graph illustrating one example of speedup of RACECAR-determined convolution implementations for different resource availabilities relative to a single processor according to one embodiment.

FIG. 47 illustrates the measured speedups for performing convolution using RACECAR as more resources are made available. All speedup numbers are relative to the same function using only a single CPU thread. The results demonstrate that RACECAR can effectively divide work across all resources, reaching a speedup of 80× when using 1 FPGA and 2 GPUs.

Figure 48:
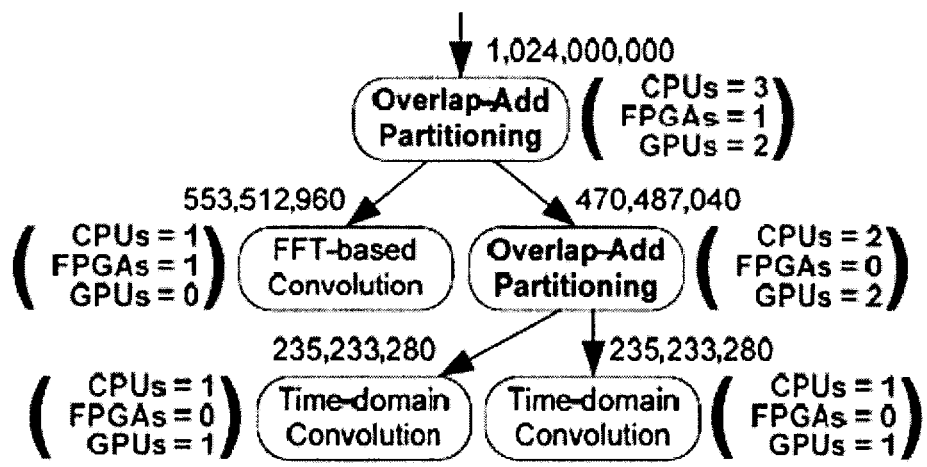
FIG. 48 depicts one example of a RACECAR-determined implementation tree of convolution using all of the resources of an exemplary system according to one embodiment.

FIG. 48 illustrates the resulting implementation tree for an input work metric of 1,024,000,000 (input size=1,000,000 and kernel size=2,048). As shown, RACECAR specifies partitioning the computation across the FPGA and two GPUs. Note that RACECAR elected to not use the remaining GPUs and threads based on its estimation of reduced performance, likely due to increased communication and control overhead.

Sorting is another common operation used for a variety of applications. Marvel contains no heterogeneous resources and instead the speedup demonstrates how RACECAR can effectively divide work between Marvel's 16 homogeneous CPU cores. For this case study, four sorting implementations were created using a variety of algorithms including heapsort, quick-sort, and insertion-sort, in addition to a parallelizing implementation based on the divide-and-conquer merge-sort algorithm. Lastly, a work metric mapping was created that mapped the work metric to the number of elements to sort.

Figure 49:
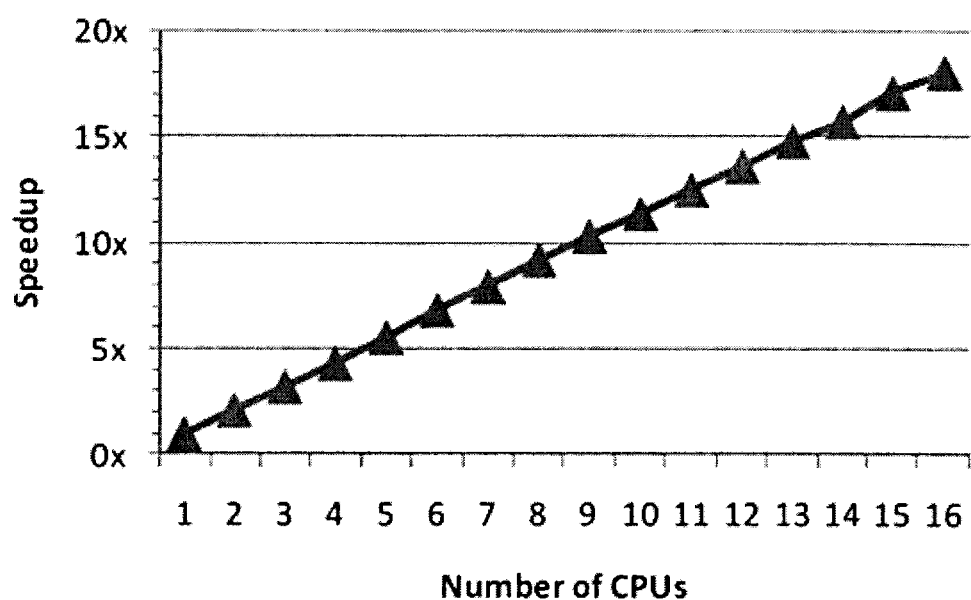
FIG. 49 is a chart illustrating one example of RACECAR-determined speedup of sorting for various processor allocations according to one embodiment.

FIG. 49 illustrates the speedup of RACECAR-specialized sorting implementations when using different numbers of CPUs. As shown, RACECAR achieved a super-linear speedup of 18× when executing on 16 CPUs, likely due to the additional caching capacity of multiple cores.

The implementation tree created by RACECAR for sorting 10,000,000 elements consisted of a nearly even division of work across 16 instances of the quick-sort implementation. Interestingly, as opposed to being a balanced tree with a minimum number of levels, the implementation tree instead showed repeated nesting of parallelizing implementations in a long branch to create the 16 partitions. This tree structure was likely caused by the delay of starting a new thread, resulting in better performance by having fewer threads create all of the partitions.

In addition to the two previous case studies, RACECAR was evaluated using eleven functions on four diverse systems. Widely used functions were selected from a variety of problem domains. 2DConv is a two-dimensional discrete convolution function for which we created a single and multi-threaded implementation. CConv is a discrete circular convolution function for which we created a single-threaded, multi-threaded, and a Delta FPGA implementation. Conv is the previously described discrete convolution function. FW performs the Floyd-Warshall algorithm for which we created a single and multi-threaded implementation. Inner is an inner-product function for which we created a single-threaded, multi-threaded, and Delta FPGA implementation. Mean applies a mean filter to an image for which we created a single and multi-threaded implementation. MM is a matrix multiply function for which we created a single-threaded, multi-threaded, and Delta FPGA implementation. Optical performs an optical flow algorithm on a series of images for which we created a single and multi-threaded implementation. Prewitt applies the Prewitt edge filter to an image for which we created a single and multi-threaded implementation. SAD performs a sum-of-absolute differences image retrieval algorithm for which we created a single-threaded, multi-threaded, NOVO-G FPGA, and a parallelizing implementation. Sort is the previously described sorting function. Heterogeneous implementations were selected based on the most likely candidates for large speedup on each device.

Figure 50:
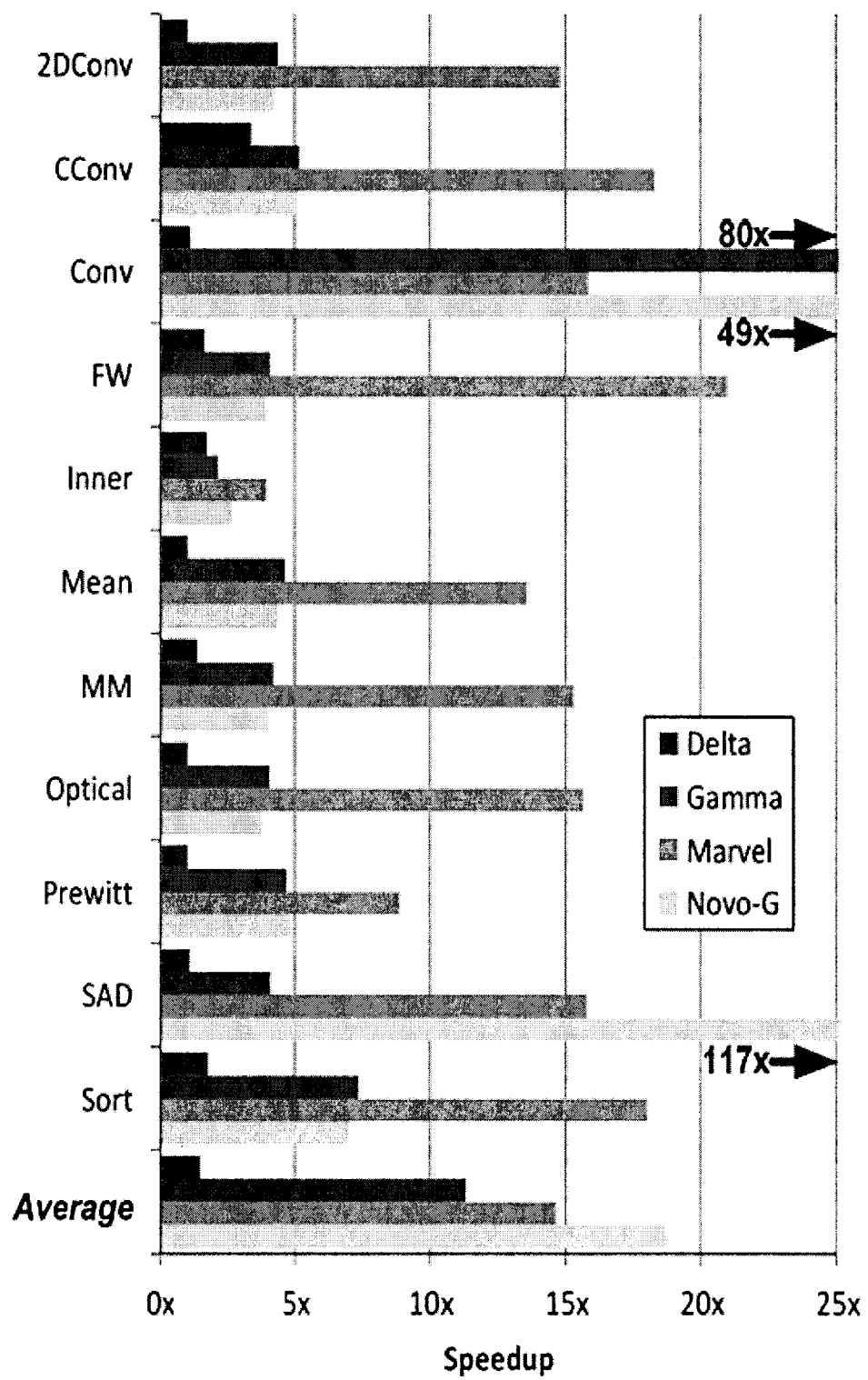
FIG. 50 is a bar graph illustrating one example of speedup of RACECAR-specialized implementations of multiple functions executing on multiple exemplary systems according to one embodiment.

FIG. 50 illustrates the RACECAR-enabled speedups of the eleven functions executing on the Delta, Gamma, Marvel, and NOVO-G systems. Each of the results is grouped with the Delta result on top, then Gamma, then Marvel, and then NOVO-G on the bottom. Additionally, the average speedup on each system is listed in the bottom of the figure. The speedups vary significantly dependent on the capabilities of the implementations and the system. The Delta system has a single hyper-threaded CPU, which limited the performance of both the heterogeneous and microprocessor implementations. However, RACECAR was still able to achieve an average speedup of 2× for functions with heterogeneous implementations and an overall average speedup of 1.45×. The Gamma system has four GPUs and an FPGA, allowing the Conv function to achieve a speedup of 80× due to RACECAR partitioning computation to the heterogeneous resources. The microprocessor implementations on Gamma achieved an average speedup of 4.5×, with an overall average speedup of 11.3×. The Marvel system has no heterogeneous resources but RACECAR still achieved an average speedup of 14.7×. Lastly, the NOVO-G system has four FPGAs, allowing the Conv function to achieve a speedup of 49× and the SAD function to achieve a speedup of 117×. The microprocessor implementations on NOVO-G achieved an average speedup of 4.4×, with an overall average speedup of 18.7×.

Figure 51:
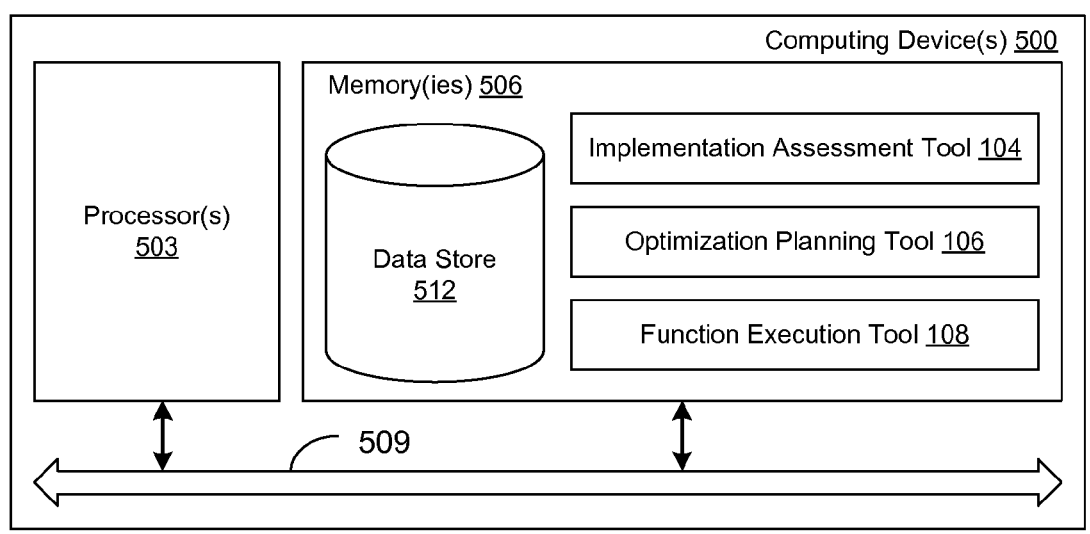
FIG. 51 is a schematic block diagram that provides one exemplary illustration of a computing device employed in the elastic computing system of FIG. 1 according to one embodiment.

With reference to FIG. 51, shown is a schematic block diagram of a computing device 500 according to an embodiment of the present disclosure. The computing device 500 includes at least one processor circuit, for example, having one or more processor 503 and a memory 506, both of which are coupled to a local interface 509. To this end, the computing device 500 may comprise, for example, at least one server computer or like device. The processor 503 may correspond to any combination of a single-core CPU, a multi-core CPU, a GPU, an FPGA, and/or other types of processors. The local interface 509 may comprise, for example, a data bus with an accompanying address/control bus or other bus structure as can be appreciated. In various embodiments, the local interface 509 may include a network such as, for example, the Internet, intranets, extranets, wide area networks (WANs), local area networks (LANs), wired networks, wireless networks, or other suitable networks, etc., or any combination of two or more such networks. Non-limiting examples of technologies employed by the local interface 509 may include Ethernet, asynchronous transfer mode (ATM), token ring, InfiniBand, fibre channel, and so on.

Stored in the memory 506 are both data and several components that are executable by the processor 503. In particular, stored in the memory 506 and executable by the processor 503 are an implementation assessment tool 104, an optimization planning tool 106, a function execution tool 108, and potentially other applications. Also stored in the memory 506 may be a data store 512 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages. Additionally, it is noted that applications that are executed by a processor 503 that is an FPGA may employ hardware description languages such as, for example, very-high-speed integrated circuits hardware description language (VHDL), compute unified device architecture (CUDA), open computing language (OpenCL), and so on.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, a bitfile that may be loaded into a processor 503 that is an FPGA, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the implementation assessment tool 104, the optimization planning tool 106, the function execution tool 108, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the elastic functions 102 (FIG. 1), the implementations 120 (FIG. 2), the implementation assessment tool 104, the optimization planning tool 106, and the function execution tool 108, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Figure 52:
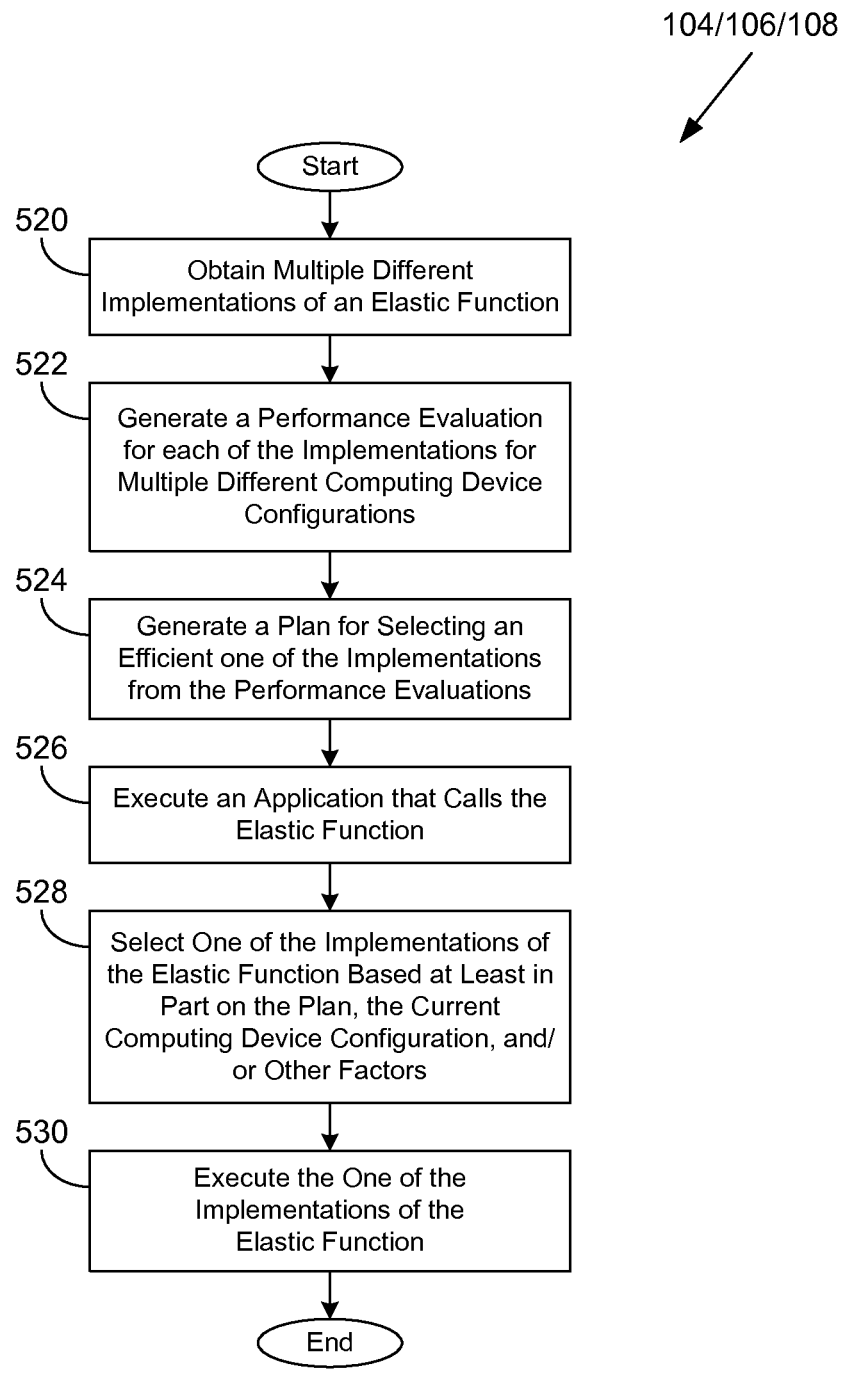
FIG. 52 is a flowchart illustrating one example of functionality implemented in the elastic computing system of FIG. 1 according to one embodiment.

Referring next to FIG. 52, shown is a flowchart that provides one example of the operation of the elastic computing tools, including the implementation assessment tool 104, the optimization planning tool 106, and the function execution tool 108 according to various embodiments. It is understood that the flowchart of FIG. 52 provides merely an example of the many different types of functional arrangements that may be employed to implement the operation of the portion of the elastic computing tools as described herein. As an alternative, the flowchart of FIG. 52 may be viewed as depicting an example of steps of a method implemented in the computing device 500 (FIG. 51) according to one or more embodiments.

Beginning with box 520, the elastic computing tools obtain multiple different implementations 120 (FIG. 2) of an elastic function 102 (FIG. 1). In box 522, the implementation assessment tool 104 generates a performance evaluation for each of the implementations 120 for multiple different computing device configurations. In box 524, the optimization planning tool 106 generates a plan for selecting an efficient one of the implementations 120 from the performance evaluations. In box 526, an application is executed that calls the elastic function 102. In box 528, the function execution tool 108 selects one of the implementations 120 of the elastic function 102 based at least in part on the plan, the current computing device configuration, and/or other factors. In box 530, the function execution tool 108 executes the selected one of the implementations of the elastic function 102.

The flowchart of FIG. 52 shows the functionality and operation of an implementation of portions of the elastic computing tools. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 52 shows a specific order of execution, it is understood that the order of execution may differ from that which is depicted. For example, the order of execution of two or more blocks may be scrambled relative to the order shown. Also, two or more blocks shown in succession in FIG. 52 may be executed concurrently or with partial concurrence. Further, in some embodiments, one or more of the blocks shown in FIG. 52 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

It should be emphasized that the above-described embodiments are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and the present application.

Therefore, at least the following is claimed:

1. A method, comprising:
providing, in at least one computing device, a plurality of different implementations of an elastic function;
obtaining, in the at least one computing device, a plan for selecting an efficient implementation of the elastic function from the plurality of different implementations of the elastic function, the plan being determined based at least in part on a performance evaluation of each of the plurality of different implementations of the elastic function for a plurality of different computing device configurations, each of the plurality of different computing device configurations specifying at least one heterogeneous resource that comprises a combination of at least two different programmable hardware components, each of the at least two different programmable hardware components having a different hardware architecture, the performance evaluation being determined by:
executing one of the plurality of different implementations for a first subset of a plurality of input parameters to generate a plurality of samples, each of the plurality of samples includes a resulting execution time;
generating interpolation data for a second subset of the plurality of input parameters based at least upon the resulting execution time for the plurality of samples and a predefined accuracy requirement associated with the plurality of samples, the interpolation data comprising a plurality of linear trends that satisfy the predefined accuracy requirement;
selecting a subset of the interpolation data to generate an implementation performance graph that provides an estimated execution time for the plurality of input parameters for the one of the plurality of different implementations, wherein the selection of the subset of interpolation is based at least in part on which portion of the interpolation data uses a least number of the plurality of linear trends to represent a range of possible combinations of the plurality of input parameters for the one of the plurality of different implementations;
executing, in the at least one computing device, an application that calls the elastic function; and
selecting, in the at least one computing device, a selected implementation of the different implementations of the elastic function during execution of the application based at least in part on the plan and a current computing device configuration.

2. The method of claim 1, wherein the selected implementation is selected based at least in part on at least one input parameter to the elastic function.

3. The method of claim 1, wherein the application is configured to provide at least one usage assumption to the elastic function, and the selected implementation is selected for execution based at least in part on the at least one usage assumption.

4. The method of claim 1, wherein at least some of the plurality of different implementations relate to different algorithms for performing the elastic function.

5. The method of claim 1, wherein the elastic function performs sorting.

6. The method of claim 1, wherein at least one of the plurality of different implementations of the elastic function is dependent on another elastic function.

7. The method of claim 1, wherein the at least one computing device includes at least one field-programmable gate array (FPGA), and the plan specifies an efficient one of the different implementations of the elastic function for execution in the at least one FPGA.

8. The method of claim 1, wherein the at least one computing device includes at least one graphics processing unit (GPU), and the plan specifies an efficient one of the different implementations of the elastic function for execution in the at least one GPU.

9. The method of claim 1, wherein the at least one computing device includes at least one multi-core central processing unit (CPU), and the plan specifies an efficient one of the different implementations of the elastic function for execution in the at least one multi-core CPU.

10. The method of claim 1, wherein the selecting, in the at least one computing device, of the selected implementation is performed at a run-time of the application.

11. The method of claim 1, further comprising generating, in the at least one computing device, the plan prior to a run-time of the application.

12. The method of claim 1, further comprising executing, in the at least one computing device, the selected implementation one of the different implementations of the elastic function.

13. The method of claim 1, further comprising:
selecting, in the at least one computing device, another one of the plurality of different implementations of the elastic function for use in the execution of the application according to the plan and a changed current computing device configuration; and
executing, in the at least one computing device, the other one of the plurality of different implementations of the elastic function.

14. A non-transitory computer-readable medium embodying at least one program executable in a computing device that, when executed, causes the computing device to:
identify a plurality of different implementations of an elastic function;
generate a performance evaluation of each of the plurality of different implementations of the elastic function for a plurality of different computing device configurations, each of the plurality of different computing device configurations specifying at least one heterogeneous resource that comprises a combination of at least two different programmable hardware components, each of the at least two different programmable hardware components having a different hardware architecture and at least one of the at least two different programmable hardware components comprising at least one of a field-programmable gate array (FPGA) or a graphics processing unit (GPU), the performance evaluation being determined by:
executing one of the plurality of different implementations for a first subset of a plurality of input parameters to generate a plurality of samples, each of the plurality of samples including a resulting execution time;
generating interpolation data for a second subset of the plurality of input parameters based at least in part on the resulting execution time for the plurality of samples and a predefined accuracy requirement associated with the plurality of samples, the interpolation data comprising a plurality of linear trends that satisfy the predefined accuracy requirement;
selecting a subset of the interpolation data to generate an implementation performance graph that provides an estimated execution time for the plurality of input parameters for the one of the plurality of different implementations, wherein the selection of the subset of interpolation data is based at least in part on which portion of the interpolation data uses a least number of the plurality of linear trends to represent a range of possible combinations of the plurality of input parameters for the one of the plurality of different implementations;
generate a plan for selecting an efficient implementation of the elastic function from the plurality of different implementations of the elastic function, the plan being generated based at least in part on an analysis of the performance evaluation generated for each of the plurality of different implementations of the elastic function, the analysis comprising data associated with at least one metric for load balancing and parallelizing the elastic function across the at least one heterogeneous resource;
select a selected implementation one of the plurality of different implementations of the elastic function to execute an application based at least in part on the plan and a current computing device configuration; and
execute the application by implementing the selected implementation, wherein implementing the selected implementation causes work to be distributed within the at least one heterogeneous resource in accordance with the plan.

15. The non-transitory computer-readable medium of claim 1, wherein at least one of the plurality of different implementations of the elastic function is dependent on another elastic function.

16. The non-transitory computer-readable medium of claim 1, wherein the estimated execution time is further determined by mapping a combination of the plurality of input parameters to a work metric, wherein the work metric comprises a floating-point quantity that presents an execution time required to perform the elastic function based on the combination of the plurality of input parameters.

17. The non-transitory computer-readable medium of claim 1, wherein generating the interpolation data further comprises grouping the plurality of samples into a plurality of interval sample segments, wherein one of the plurality of linear trends represents one of the plurality of interval sample segments.

18. A system, comprising:
at least one computing device;
an implementation assessment tool executable by at least one processor in the at least one computing device, the implementation assessment tool, when executed, causes the at least one computing device to:
generate a performance assessment for each of a plurality of different implementations of an elastic function for a plurality of different computing device configurations, each of the plurality of different computing device configurations specifying at least one heterogeneous resource that comprises a combination of at least two different programmable hardware components, each of the at least two different programmable hardware components having a different hardware architecture, the performance assessment being determined by:
executing one of the plurality of different implementations for a first subset of a plurality of input parameters to generate a plurality of samples, each of the plurality of samples includes a resulting execution time:
generating interpolation data for a second subset of the plurality of input parameters based at least upon the resulting execution time for the plurality of samples and a predefined accuracy requirement associated with the plurality of samples, the interpolation data comprising a plurality of linear trends that satisfy the predefined accuracy requirement;
selecting a subset of the interpolation data to generate an implementation performance graph that provides an estimated execution time for the plurality of input parameters for the one of the plurality of different implementations, wherein the selection of the subset is based at least in part on which portion of the interpolation data uses a least number of the plurality of linear trends to represent a range of possible combinations of the plurality of input parameters for the one of the plurality of different implementations;

an optimization planning tool executable by at least one processor in the at least one computing device, the optimization planning tool, when executed, causes the at least one computing device to:

determine a plan for selecting an efficient implementation of the elastic function from the plurality of different implementations of the elastic function based at least in part on an analysis of the performance assessment generated for each of the plurality of different implementations of the elastic function, the analysis comprising data associated with at least one metric for load balancing and parallelizing work associated with the elastic function across the at least one heterogeneous resource; and a function execution tool executable by at least one processor in the at least one computing device, the function execution tool, when executed, causes the at least one computing device to:

select a selected implementation one of the plurality of different implementations of the elastic function during execution of an application based at least in part on the plan and a current computing device configuration.

19. The system of claim 18, wherein a combination of the plurality of input parameters are mapped to one of a plurality of different work metrics wherein at least one work metric among the plurality of different work metrics is a floating-point quantity that generically represents an amount of work required to perform the elastic function.

20. The system of claim 18, wherein the optimization planning tool is configured to perform fastest implementation planning for the elastic function, and the optimization planning tool further causes the at least one computing device to generate a function performance graph based at least in part on a plurality of implementation performance graphs generated by the implementation assessment tool.

21. The system of claim 18, wherein the optimization planning tool is configured to perform work parallelization planning for the elastic function, and the optimization planning tool further causes the at least one computing device to generate a work parallelization graph based at least in part on a plurality of function performance graphs corresponding to a plurality of instances of the elastic function executing on a plurality of parallel resources of the at least one computing device.

* * * * *